(12) United States Patent
Blanchet

(10) Patent No.: US 11,746,427 B2
(45) Date of Patent: Sep. 5, 2023

(54) SCALABLE ELECTROLYSIS CELL AND STACK AND METHOD OF HIGH-SPEED MANUFACTURING THE SAME

(71) Applicant: EvolOH, Inc., Palo Alto, CA (US)

(72) Inventor: Scott Blanchet, Chelmsford, MA (US)

(73) Assignee: EVOLOH, INC., Palo Alto, CA (US)

( * ) Notice: Subject to any disclaimer, the term of this patent is extended or adjusted under 35 U.S.C. 154(b) by 0 days.

(21) Appl. No.: 17/677,490

(22) Filed: Feb. 22, 2022

(65) Prior Publication Data

US 2023/0002920 A1 Jan. 5, 2023

Related U.S. Application Data

(60) Provisional application No. 63/311,773, filed on Feb. 18, 2022, provisional application No. 63/218,446, filed on Jul. 5, 2021.

(51) Int. Cl.
*C25B 9/70* (2021.01)
*C25B 9/17* (2021.01)
*C25B 9/67* (2021.01)

(52) U.S. Cl.
CPC .............. *C25B 9/70* (2021.01); *C25B 9/17* (2021.01); *C25B 9/67* (2021.01)

(58) Field of Classification Search
CPC ....... C25B 9/70–977; C25B 9/17–9/23; C25B 9/60–9/67
See application file for complete search history.

(56) References Cited

U.S. PATENT DOCUMENTS

| 4,252,628 A * | 2/1981 | Boulton ............ C25B 9/73 204/290.13 |
| 4,431,714 A | 2/1984 | Myerhoff |
| 5,789,091 A | 8/1998 | Wozniczka et al. |
| 5,993,987 A | 11/1999 | Wozniczka et al. |
| 6,040,072 A | 3/2000 | Murphy et al. |
| 6,663,996 B2 | 12/2003 | Gibb et al. |

(Continued)

FOREIGN PATENT DOCUMENTS

| CN | 102388496 B | 11/2014 |
| CN | 102282713 B | 8/2015 |

(Continued)

OTHER PUBLICATIONS

Lai et al., "Stack Compression of PEM Fuel Cells", Proceedings of Fuelcell2004, The 2nd International Conference on Fuel Cell Science, Engineering and Technology, Jun. 14-16, 2004, 6 pgs.

*Primary Examiner* — Alexander W Keeling
(74) *Attorney, Agent, or Firm* — Paul D. Strain, Esq.; Strain & Strain PLLC

(57) ABSTRACT

An electrolyzer stack is configured for high-speed manufacturing and assembly of a plurality of scalable electrolysis cells. Each cell comprises a plurality of water windows configured to maintain a pressure loss, temperature rise and/or oxygen outlet volume fraction below predetermined thresholds. Repeating components of the cells are configured based on a desired roll web width for production and a stack compression system is configured to enable a variable quantity and variable area of said repeating cells in a single stack. A high-speed manufacturing system is configured to produce scalable cells and assemble scalable stacks at rates in excess of 1,000 MW-class stacks per year.

32 Claims, 38 Drawing Sheets

(56) References Cited

U.S. PATENT DOCUMENTS

| | | |
|---|---|---|
| 6,862,801 B2 | 3/2005 | Hill et al. |
| 6,872,483 B2 | 3/2005 | Sugiura et al. |
| 7,807,316 B2 | 10/2010 | Andreas-Schott et al. |
| 7,858,224 B2 | 12/2010 | Kim et al. |
| 8,007,951 B2 | 8/2011 | Andreas-Schott et al. |
| 8,012,648 B2 | 9/2011 | Bogumil et al. |
| 8,257,879 B2 | 9/2012 | Andreas-Schott et al. |
| 8,697,312 B2 | 4/2014 | Shibata et al. |
| 8,728,684 B2 | 5/2014 | Reiser et al. |
| 8,871,405 B2 | 10/2014 | Yamamoto |
| 9,034,534 B2 | 5/2015 | Nielsen et al. |
| 9,252,449 B2 | 2/2016 | Shinohara et al. |
| 9,379,408 B2 | 6/2016 | Chinnici et al. |
| 9,413,016 B2 | 8/2016 | Blanchet et al. |
| 9,531,024 B2 | 12/2016 | Pollica et al. |
| 9,567,679 B2 | 2/2017 | Domit et al. |
| 9,583,747 B2 | 2/2017 | Baek et al. |
| 9,590,257 B2 | 3/2017 | Domit et al. |
| 9,803,288 B2 | 10/2017 | Blanchet et al. |
| 9,912,003 B2 | 3/2018 | Morimoto et al. |
| 10,000,856 B2 | 6/2018 | Domit et al. |
| 10,038,211 B2 | 7/2018 | Watanabe |
| 10,056,637 B2 | 8/2018 | Gambini et al. |
| 10,109,880 B2 | 10/2018 | Blanchet et al. |
| 10,141,585 B2 | 11/2018 | Beverage et al. |
| 10,273,588 B2 | 4/2019 | Domit et al. |
| 10,287,695 B2 | 5/2019 | Blanchet et al. |
| 10,727,501 B2 | 7/2020 | Van Boeyen |
| 10,749,203 B2 | 8/2020 | Tingelöf |
| 10,847,815 B2 | 11/2020 | Van Boeyen et al. |
| 10,868,321 B2 | 12/2020 | Gambini et al. |
| 10,892,509 B2 | 1/2021 | Myers et al. |
| 2004/0035696 A1* | 2/2004 | Reinhard ............... B01D 61/50 204/252 |
| 2004/0081881 A1* | 4/2004 | Vyas ..................... C25B 9/23 429/234 |
| 2005/0042493 A1 | 2/2005 | Fujita et al. |
| 2005/0064268 A1 | 3/2005 | Cho et al. |
| 2006/0040166 A1 | 2/2006 | Budinski et al. |
| 2006/0093890 A1 | 5/2006 | Steinbroner |
| 2006/0188771 A1 | 8/2006 | Allen et al. |
| 2011/0132748 A1* | 6/2011 | Haryu ..................... C25B 1/04 204/263 |
| 2014/0051007 A1 | 2/2014 | Blanchet et al. |
| 2014/0255817 A1* | 9/2014 | Blanchet ............ H01M 8/2475 429/535 |
| 2015/0333356 A1 | 11/2015 | Horlock et al. |
| 2015/0376800 A1* | 12/2015 | Lunt ................... H01M 8/0263 204/263 |
| 2015/0380745 A1* | 12/2015 | Bodèn ................. H01M 8/241 429/434 |
| 2020/0161673 A1* | 5/2020 | Stahl ................... H01M 8/0276 |
| 2022/0149393 A1* | 5/2022 | Speidel ..................... C25B 9/75 |

FOREIGN PATENT DOCUMENTS

| | | |
|---|---|---|
| CN | 104064802 B | 2/2017 |
| DE | 10 2006 030 605 A1 | 1/2008 |
| DE | 10 2019 213 788 A1 | 3/2021 |
| EP | 2 885 834 B1 | 10/2020 |
| JP | 4673194 B2 | 1/2011 |
| WO | WO 2008/089977 A1 | 7/2008 |
| WO | WO 2020/161668 A1 | 8/2020 |

* cited by examiner

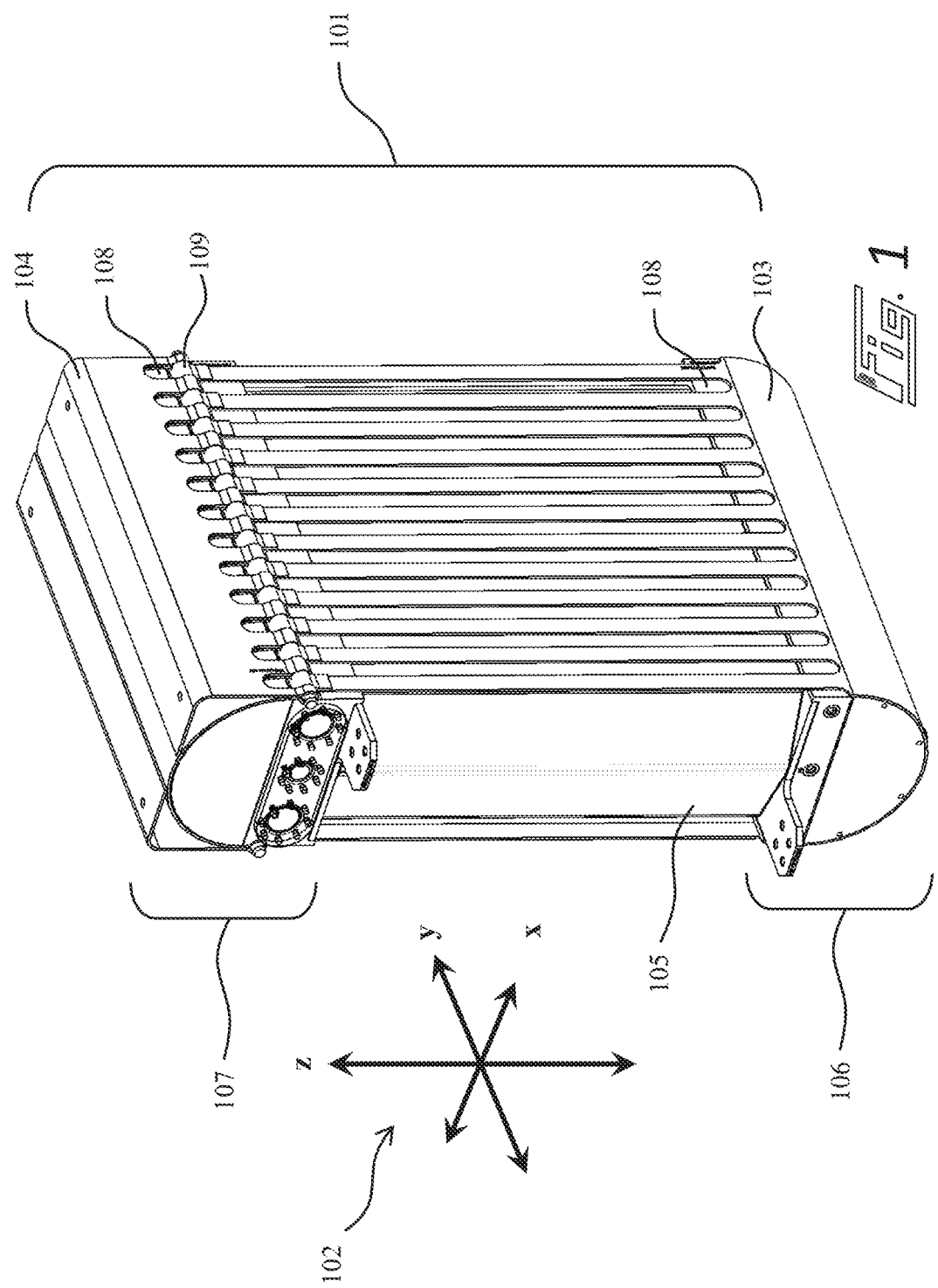

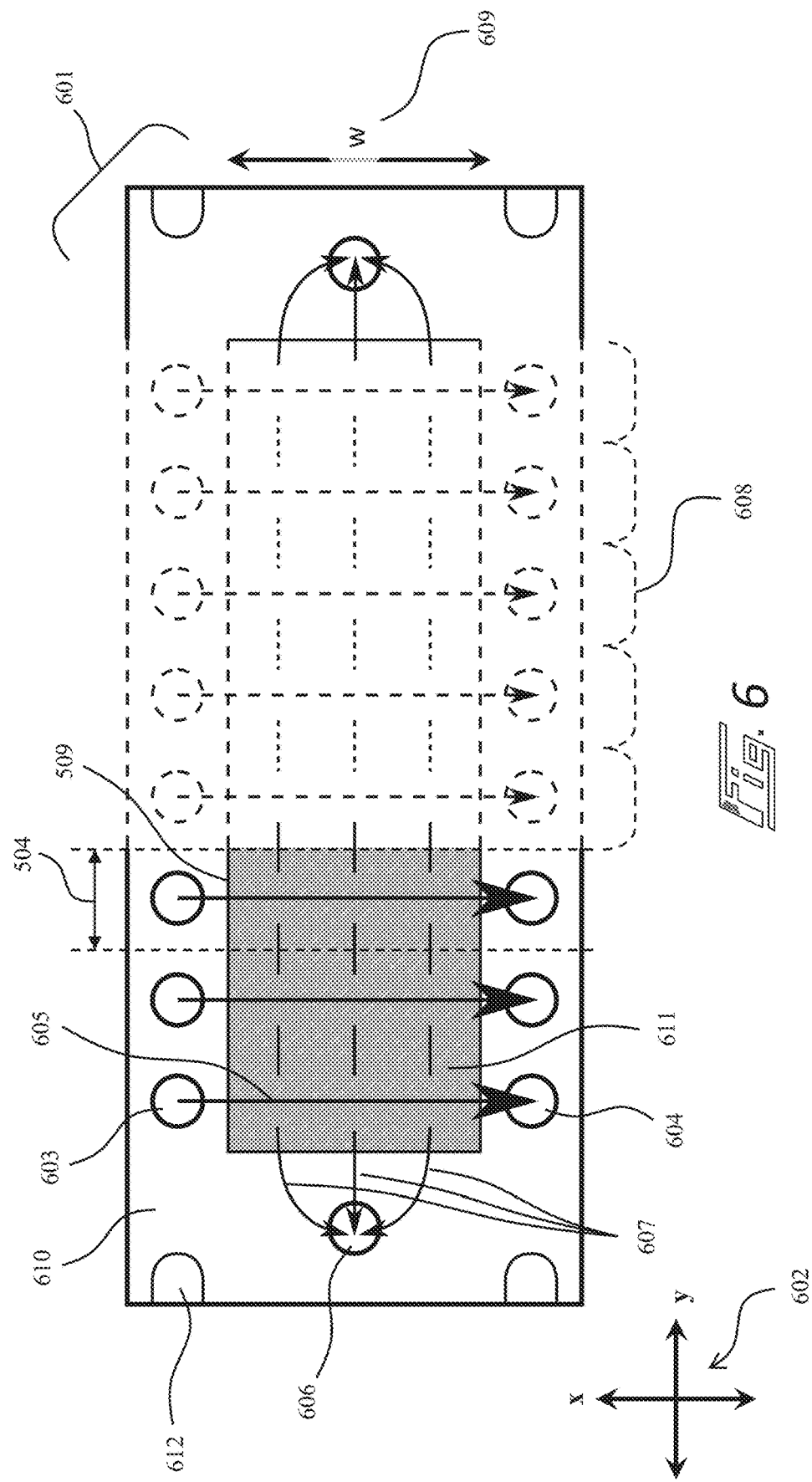

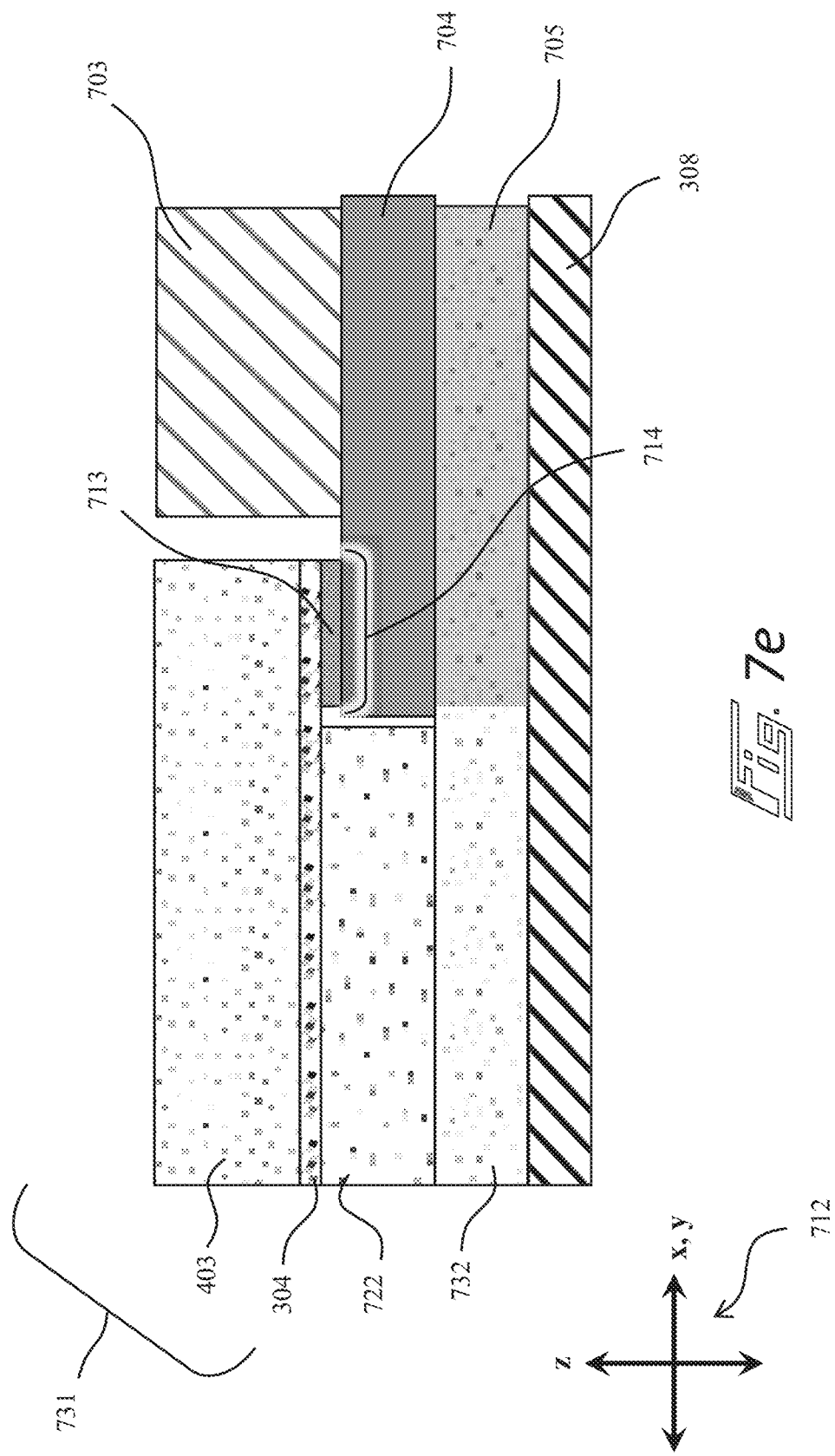

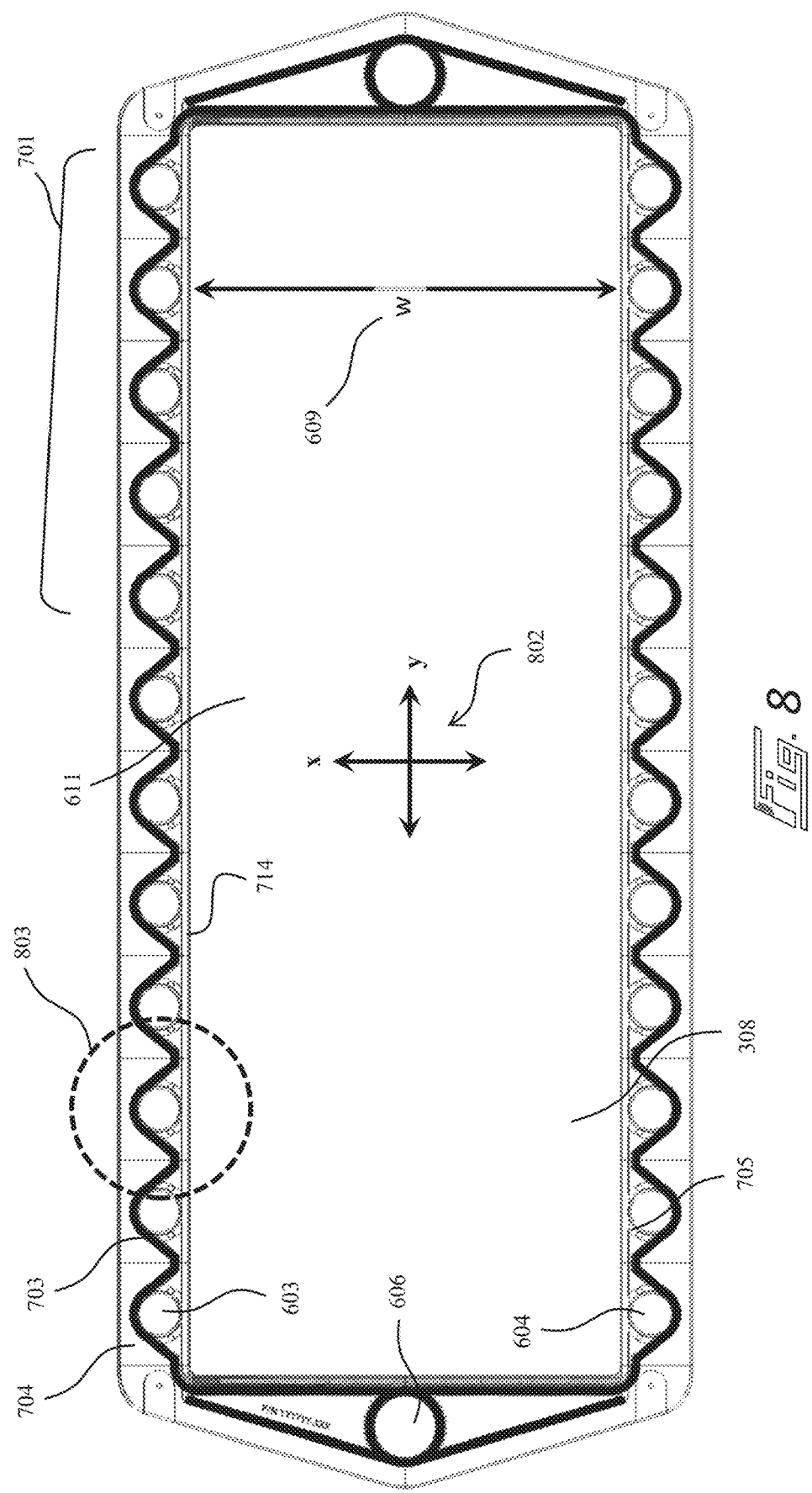

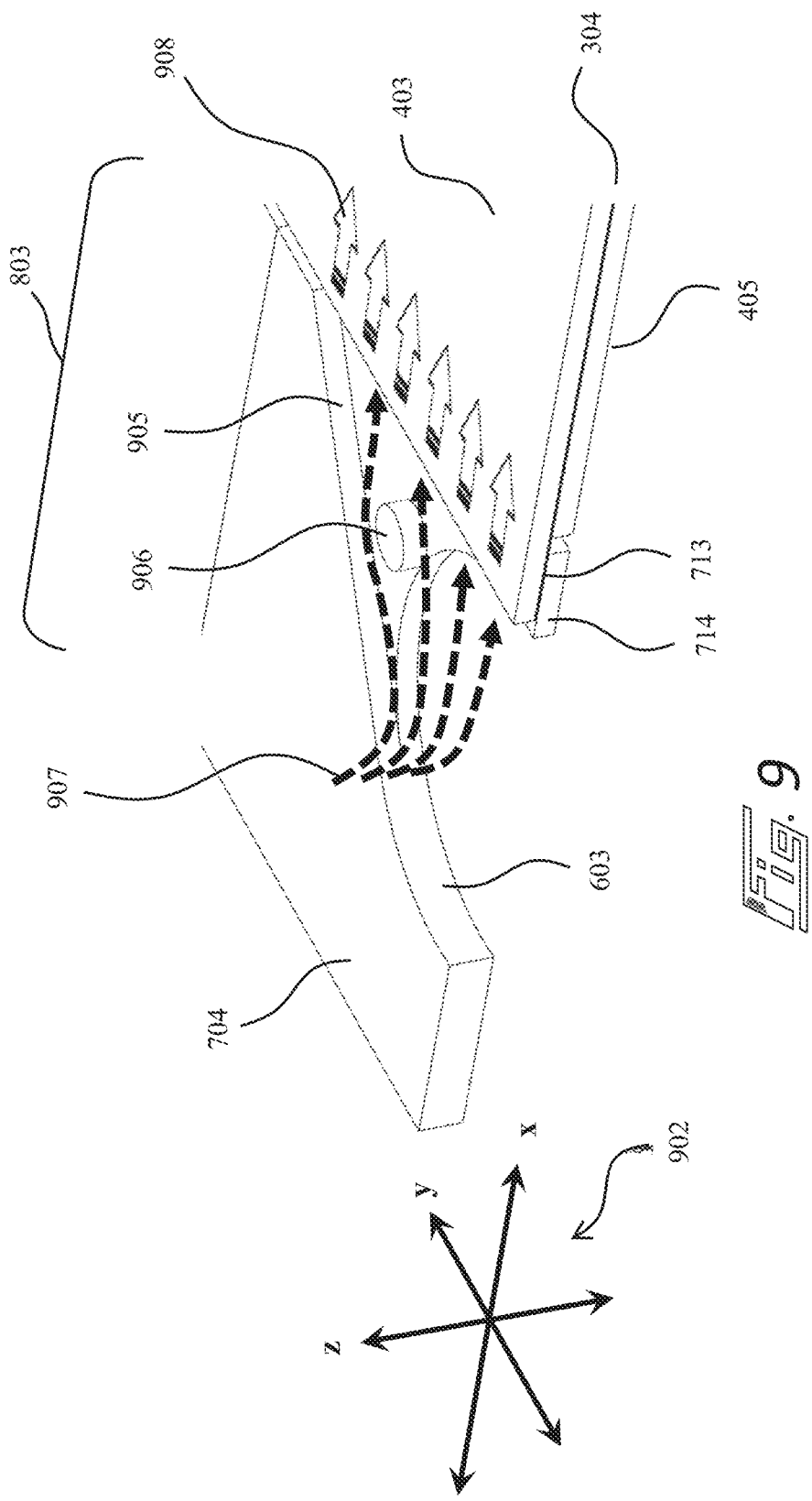

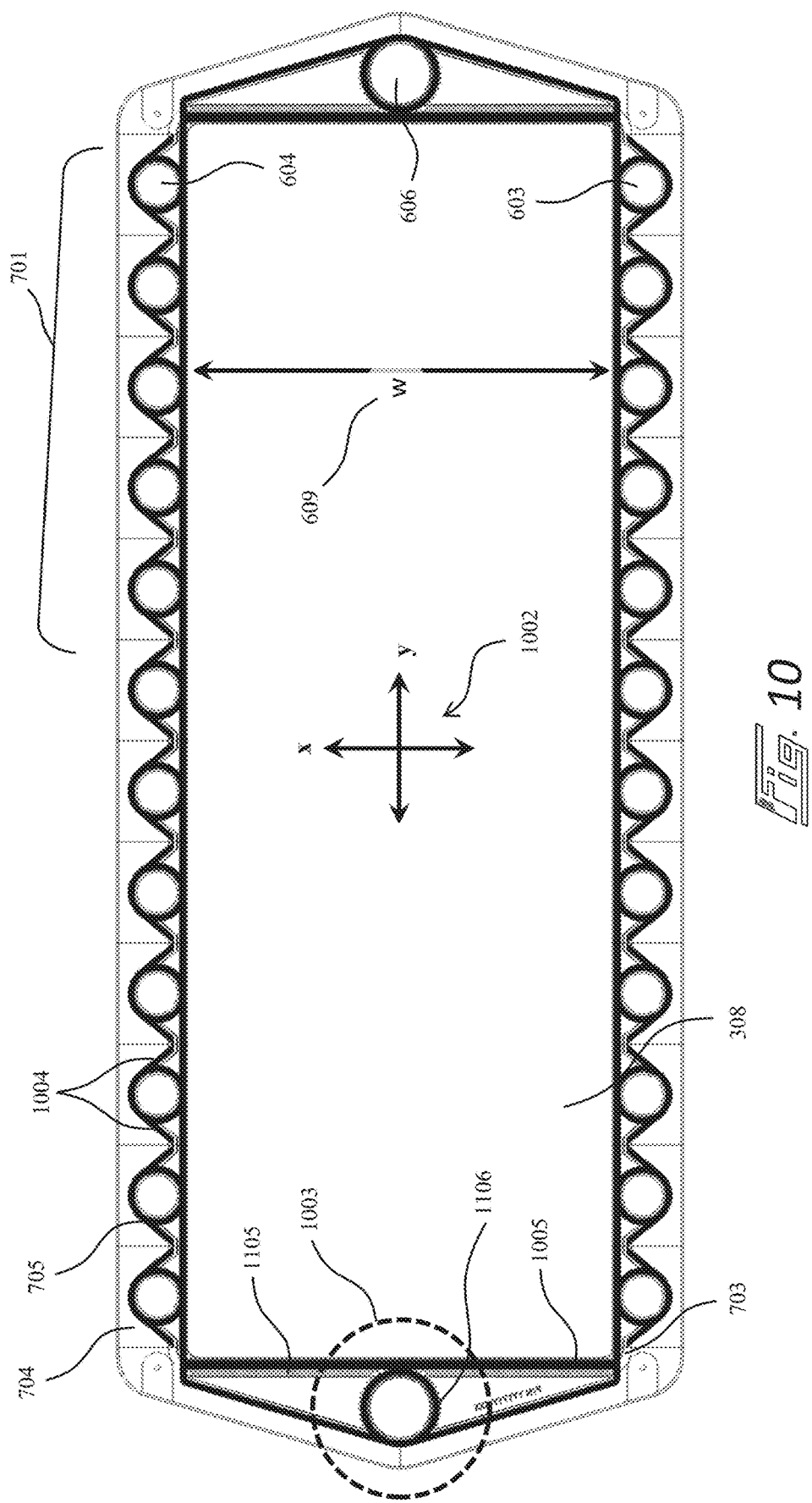

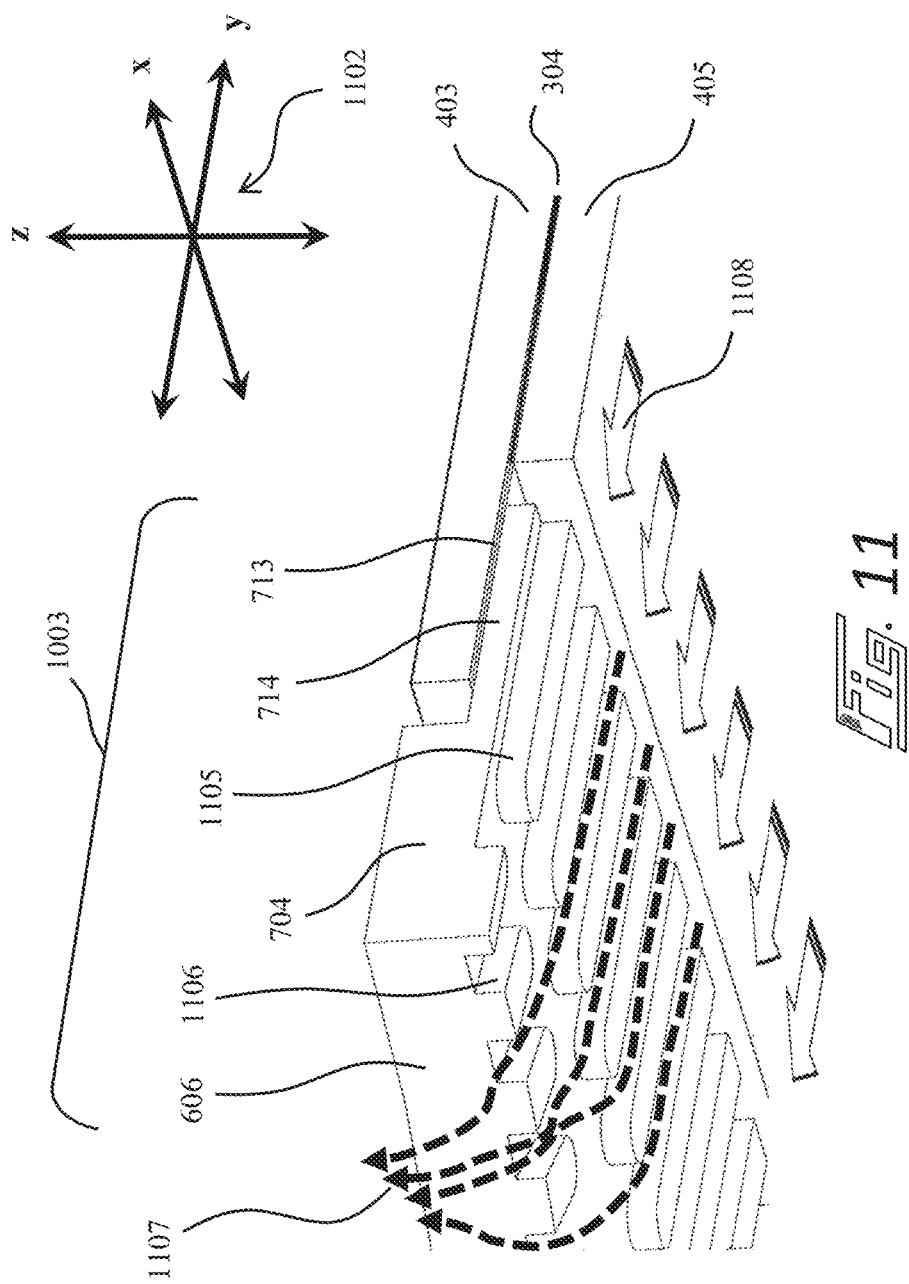

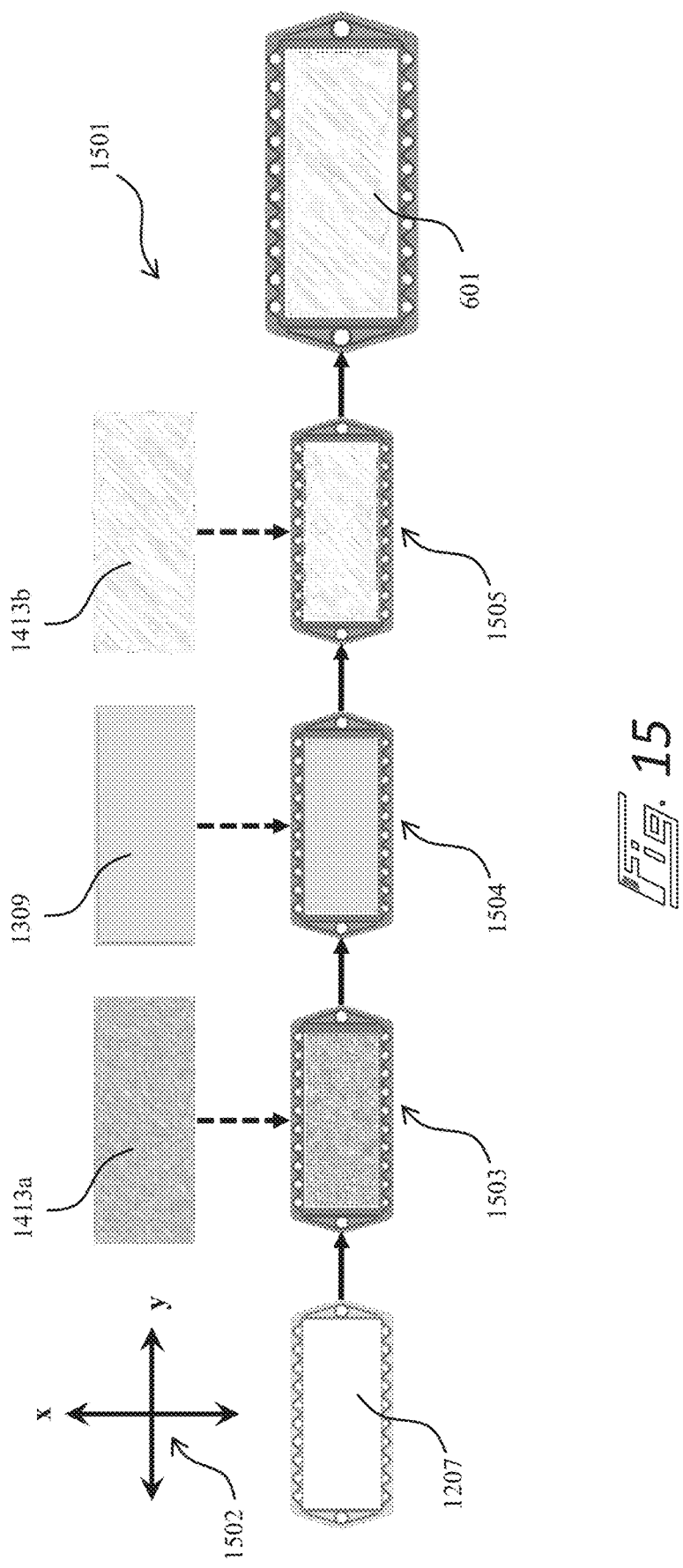

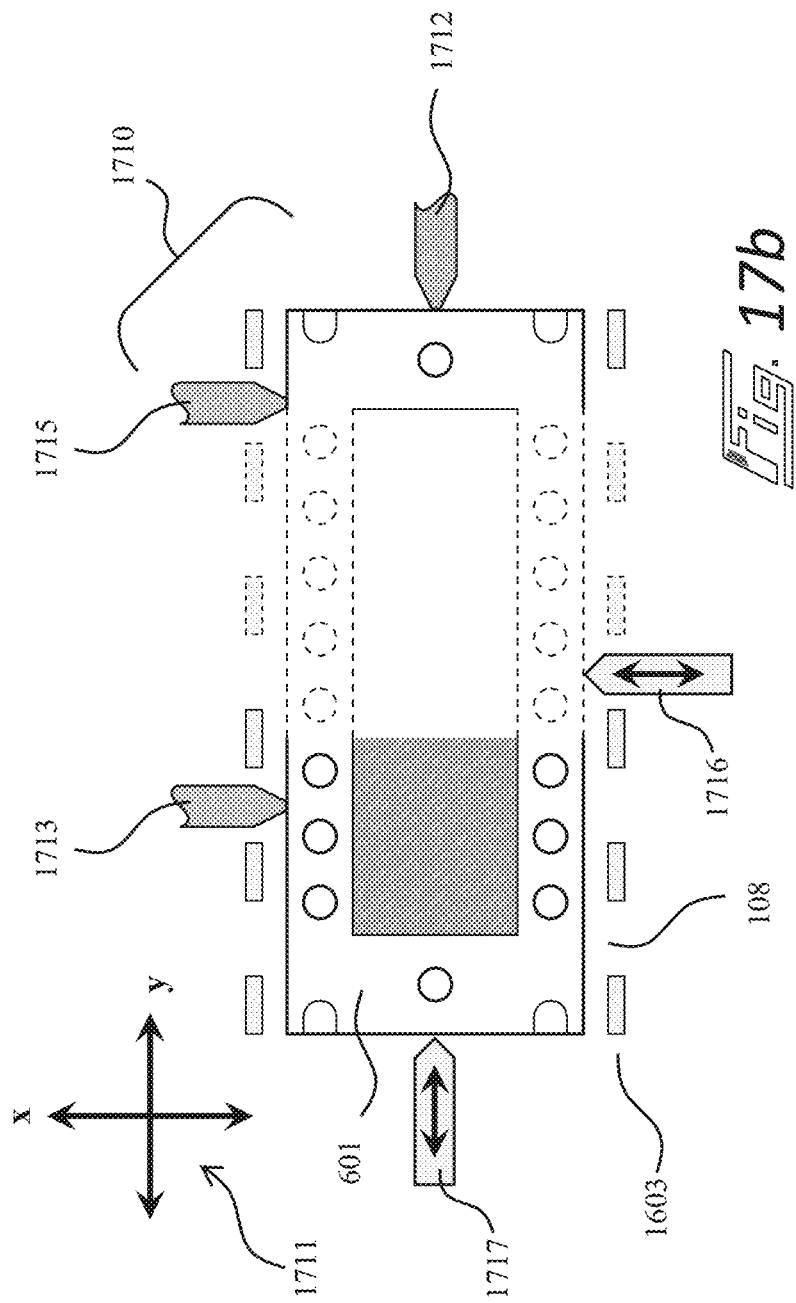

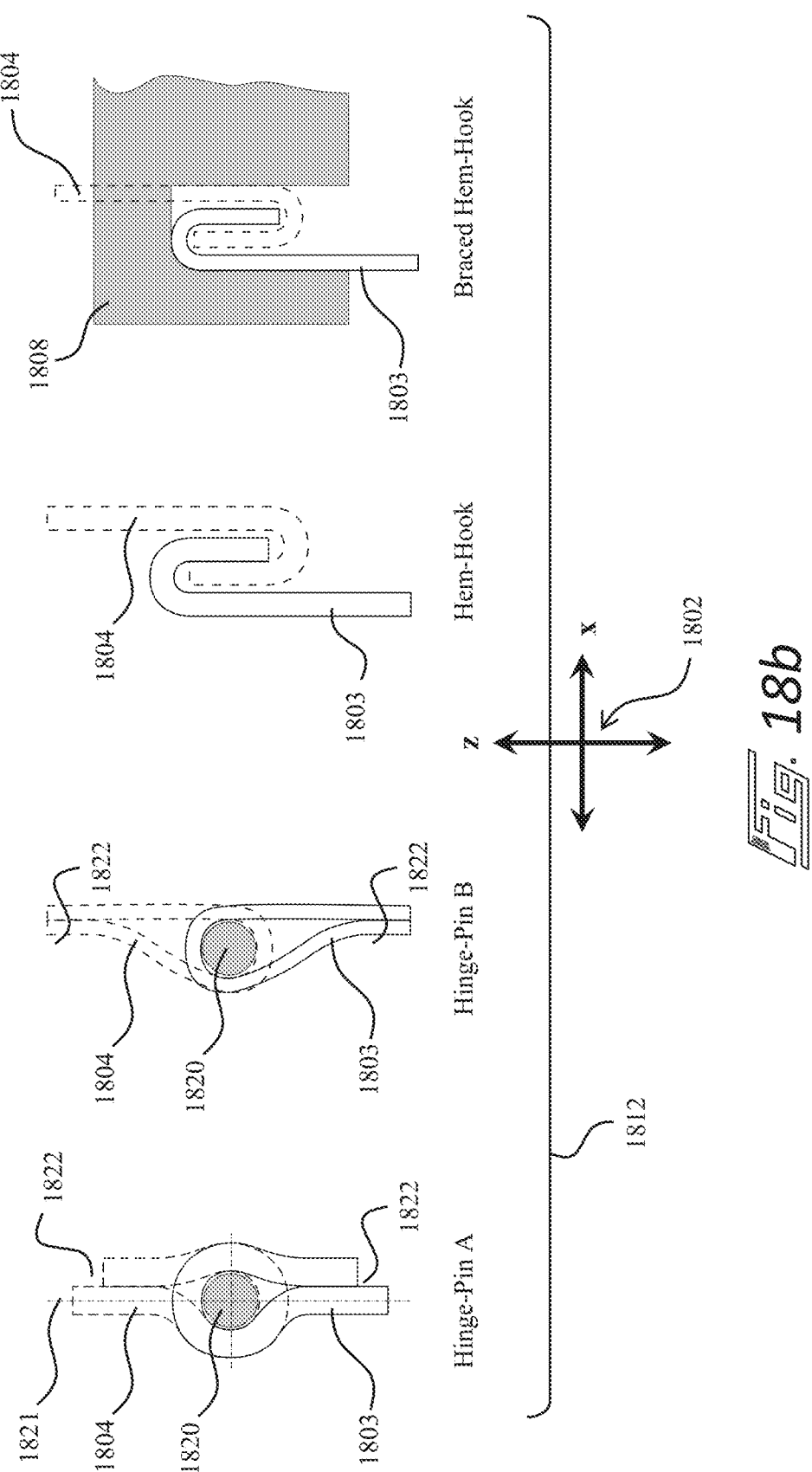

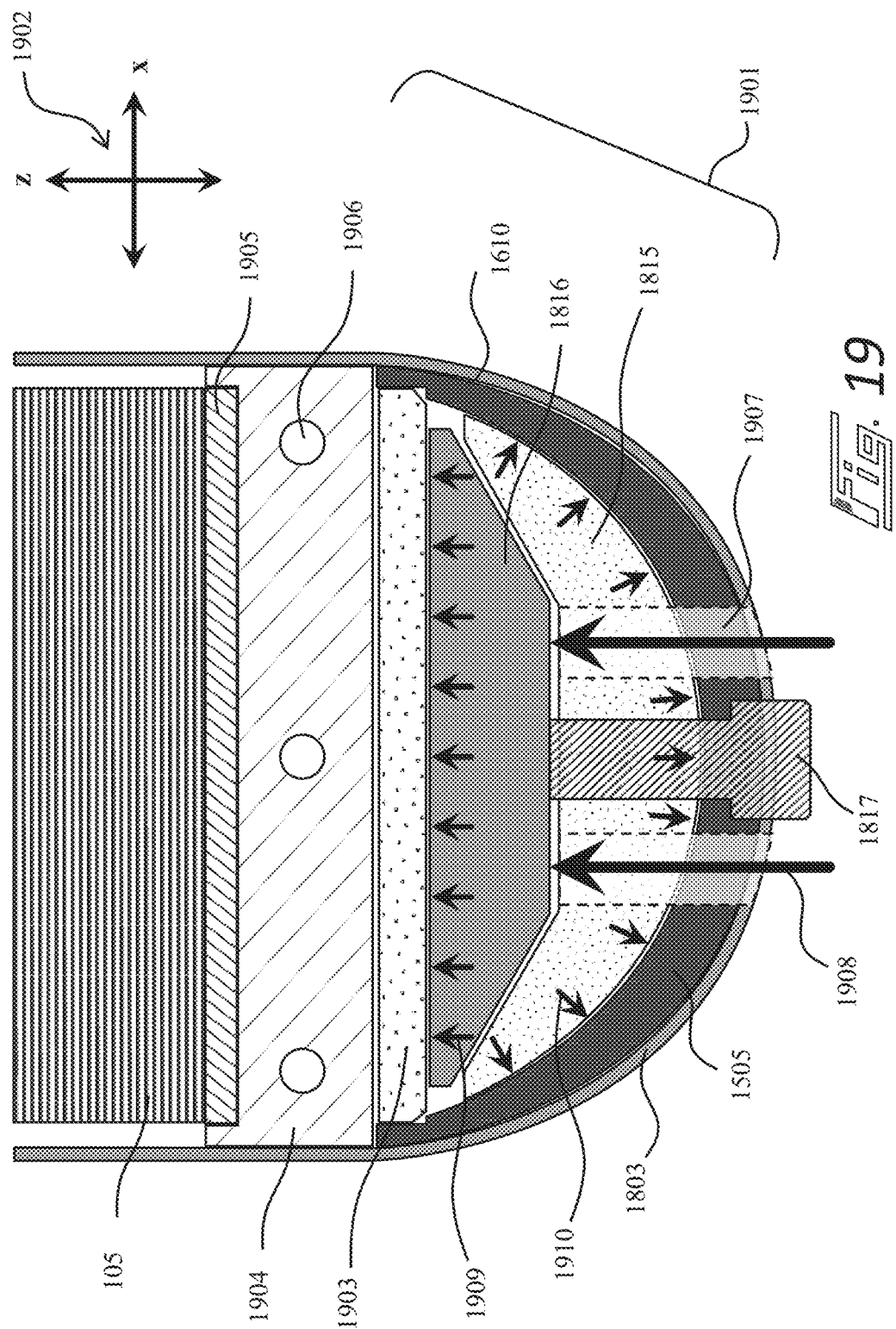

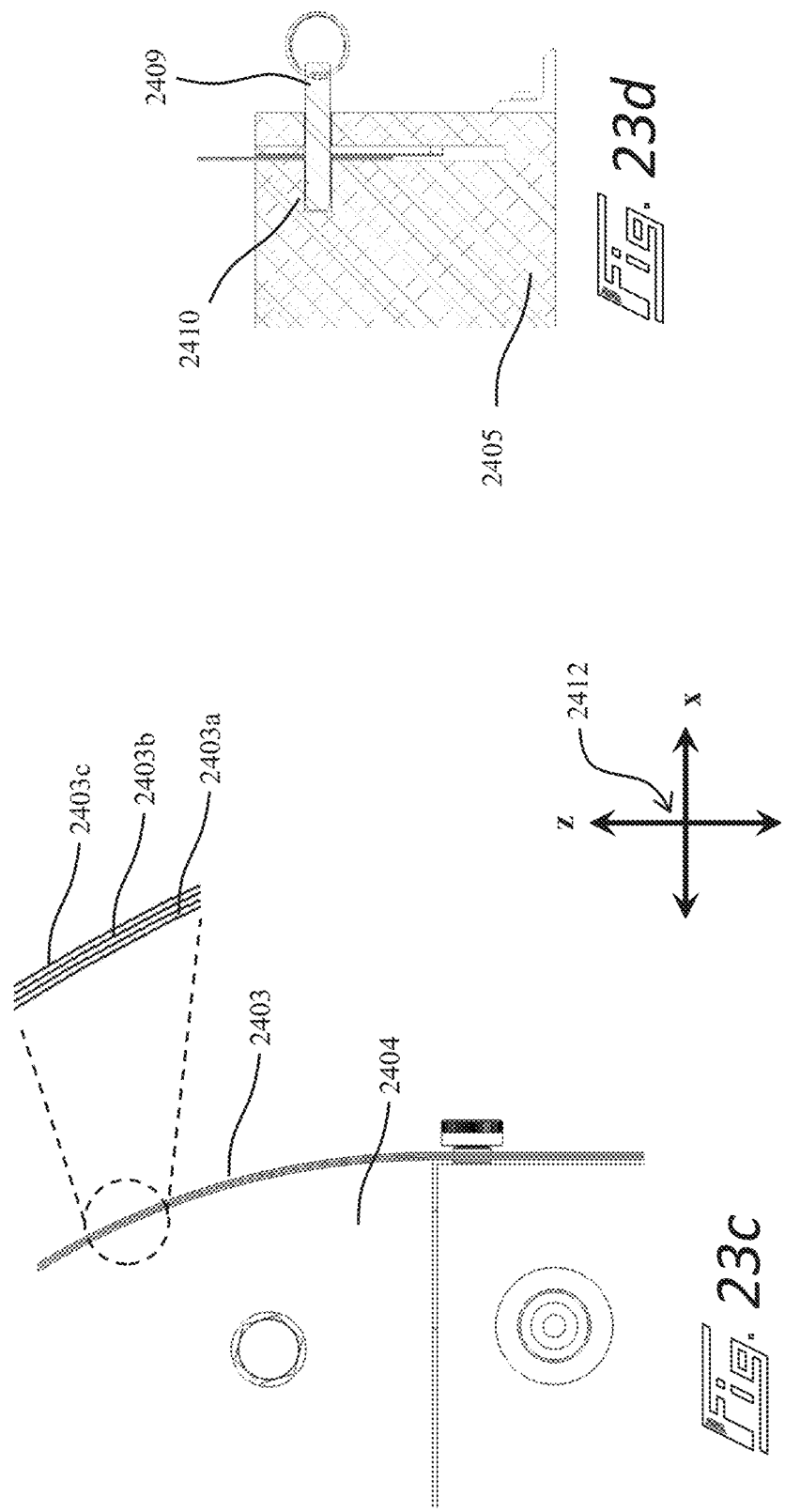

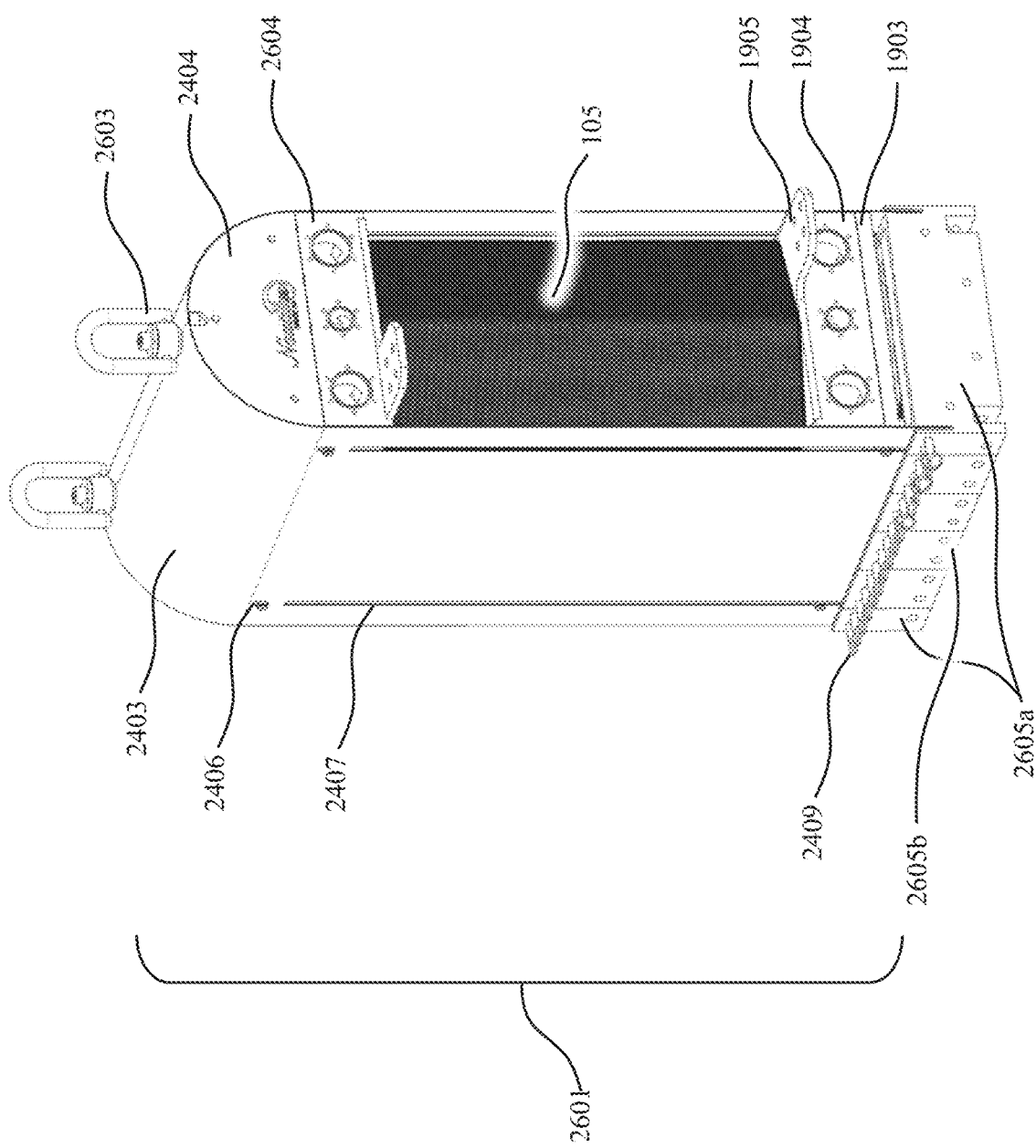

SCALABLE ELECTROLYSIS CELL AND STACK AND METHOD OF HIGH-SPEED MANUFACTURING THE SAME

INCORPORATION BY REFERENCE OF RELATED PATENT APPLICATIONS

This application is based upon and claims the benefit of priority under 35 U.S.C. § 119(e) to U.S. Provisional Application No. 63/218,446, filed Jul. 5, 2021, and to U.S. Provisional Application No. 63/311,773, filed Feb. 18, 2022, the entire contents of all of which are incorporated herein by reference in their entirety.

FIELD OF INVENTION

The present disclosure relates to electrochemical cells, more particularly, to electrochemical cells and stacks designed for scalable, high-speed manufacturing.

BACKGROUND

Electrochemical cells are devices for inducing chemical reactions using electricity or generating electricity using chemical reactions. If electricity is the output, the cells may be considered fuel cells or expander cells, depending on the chemical product. If electricity is the input, the cells may be considered electrolyzer cells, compressor cells or purifier cells, depending on the chemical product. For example, an electrolyzer takes electrical energy and stores it in a fuel such as hydrogen by splitting water into its constituent elements. In contrast, a fuel cell may be thought of essentially as an electrolyzer running in reverse—hydrogen and oxygen are provided to the cell, which then combines these molecules to form water, releasing electrical energy in the process. The basic elements of these devices are two electrodes, an ion-conducting electrolyte, and an ion-permeable layer separating the two electrodes, although it is possible to operate an electrolyzer or fuel cell in a membrane-less configuration, as well. Electrochemical cells may also include a separator between the electrodes to prevent products from mixing inside of the cell. In the case of solid-electrolytic cells, the membrane and separator may be combined into a unitized, solid, ion-conducting layer. A complete electrochemical cell may also include flow fields for delivering reactants to the electrodes, seals for isolating reactants from each other and the environment, and one or more impermeable separator plates, also referred to as bipolar plates, for isolating one cell from adjacent cells in a stack and, in certain embodiments, for containing a separate cooling fluid for thermal management of the cell.

A variety of electrolytes can be used in electrochemical cells, including proton exchange membranes, anion exchange membranes, solid-oxide ceramic membranes, and liquid alkaline solutions such as potassium hydroxide and sodium hydroxide. Different electrolytes demand different operating conditions, and each comes with its own benefits and limitations. Advantages of proton and anion exchange membrane electrolytes may include relatively low operating temperature and a cell that can be constructed using a unitized-layer electrolyte/membrane. Electrolyzers using such membranes have the distinct advantage over other electrolyzer cells of being able to operate using pure, liquid water, rather than a caustic solution or water vapor as a feed stock, thereby greatly simplifying the balance of system in practice. Such electrolyzers may also be operated without liquid water on the cathode, allowing production of hydrogen gas having low, vapor-phase moisture content.

The impact of carbon dioxide on global climate change is well-documented. As society's efforts to address global climate change accelerate, the need for deep decarbonization of most or all human energy use has become clear and urgent. The use of hydrogen as a carbon-free energy carrier is essential to reaching certain segments of human industry that are difficult or impossible to decarbonize directly with electricity. Examples of such segments include steel production, fertilizer manufacturing, construction, and heavy transport such as trucking, marine and air vehicles. In addition to these segments, the energy density and stable storage characteristics of hydrogen has made it the most viable candidate for seasonal-scale energy storage and establishment of grid resiliency using only renewable electricity, which will be required for complete conversion of energy use to carbon-free sources. These and other benefits have driven a high level of interest in "green hydrogen" production.

Hydrogen is given a "green" label if it is produced by electrolysis from renewable electricity (wind, solar, hydropower, etc.). The scale required to meet the potential demand for green hydrogen in the future global energy system is daunting. Production capacities for electrolyzers will need to increase by many orders of magnitude and their costs reduced by a factor of ten or more over the next decade to meet such demand. Up to now, production of hydrogen electrolyzers has been a niche industry with small systems and limited deployments based on cells and stacks designed for research and development. Only minor considerations have been made for the speed of manufacturing necessary to produce and assemble cells and stacks at a rate commensurate with society's eventual need.

BRIEF SUMMARY

Recognizing the urgent need for innovative electrolyzer technology, the inventors of the present application have developed a scalable electrolysis cell and stack along with a scalable stack compression system and method of high-speed manufacturing. Embodiments of the present application minimize capital costs for producing a wide range of electrochemical cell stack sizes and enable rapid manufacturing of electrochemical cells, including water electrolyzers.

The basic process of water electrolysis involves providing water to a positively charged anode and conducting ions between the anode and a negatively charged cathode. Oxygen gas is produced at the anode while hydrogen gas is produced at the cathode at room temperature at sea level. The particular ion conducted between the anode and the cathode depends on the electrolyte used. In an acidic cell, positively charged hydronium ions are conducted from the anode to the cathode. In an alkaline cell, negatively charged hydroxide ions are conducted from the cathode to the anode. In both systems, the overall reaction is the same: $(2)H_2O(l) \rightarrow (2)H_2(g)+O_2(g)$. Electricity must be provided to drive the reaction. The open-circuit, or thermo-neutral, voltage for the basic reaction of hydrogen to liquid water is 1.481, therefore a voltage higher than 1.481 must be applied to a hydrogen electrolysis cell fed with liquid water to cause the reaction to progress (as discussed below, an overpotential is usually required for the reaction to proceed at acceptable rates). The size (i.e., active area) of the cell determines the rate of hydrogen/oxygen production from one cell at a given applied voltage. The total current required for a particular applied voltage may be proportional to the size (i.e., active area) of the cell. In practical systems, multiple cells may be "stacked" on top of each other to increase production capacity. This stack of cells results in the need to apply a higher voltage (integer multiple of the cell count) to drive the reaction. For example, a single cell of 1000 cm² may produce the same hydrogen flow as two stacked cells of 500 cm², but the 500 cm² stack will require an input of 2× the voltage and ½× the current. Flexibility in selecting required voltage and current may be a significant consideration in the design and cost of a total electrolysis system. For example, power supplies for higher current and lower voltage may be more expensive than those for higher voltage and lower current due to the size of the required electrical conductors and additional materials required for their construction.

As the reaction proceeds, water is consumed and hydrogen+oxygen gases are produced, therefore water must be continuously provided to the cell to feed the reaction. Stoichiometry is a term relating to the "balance" of a chemical reaction. In electrochemical cells, the term "stoichiometry" or "stoich" refers to the ratio of reactants fed to a cell relative to the amount required to exactly balance the overall reaction. For example, an electrolysis cell operating at a water stoich of 2 would have as its input twice the amount of water required to produce the hydrogen and oxygen exiting the cell. Conserving mass for the system at 1 stoich shows that 1 kg per hour of hydrogen production is associated with approximately 8 kg per hour of oxygen production and approximately 9 kg per hour of water consumption. Electrolyzers may be typically run with a minimum water stoich greater than 1 to ensure adequate reactants everywhere in the cell. For example, at a water flow stoich of 1, all of the water provided to the cell may be converted to oxygen on the anode, making the oxygen fraction at the cell outlet 100% (i.e. no water exiting the cell). This condition may be unstable and could result in damage due to anode starvation of the cell near the outlet. It may also result in high fluid velocity and pressure loss at the outlet as everything leaving the cell is vapor. Process conditions may therefore be selected to maintain an oxygen vapor fraction at the cell outlet below a given threshold. For example, an outlet oxygen fraction of <40% may result in less than a 2× increase in flow field velocity from water inlet to outlet. To maintain <40% oxygen fraction, a water stoich of up to or greater than 100 may be required.

The electrolysis process is not 100% efficient, and, as a result, some of the input electricity is converted to heat within the cell rather than chemical energy stored as hydrogen. This results in voltages greater than the thermo-neutral voltage (1.481) being required for practical hydrogen output flow rates. Conserving energy for the system can show that the fraction of electrical power (voltage times current) delivered to the cell that goes into heat may be equal to $[1-(1.481/V_{cell})]$. A practical electrolysis cell may operate at 1.8V, which results in $[1-(1.481/1.8)]=\sim 18\%$ of the power sent to the cell to turn into heat rather than hydrogen. Therefore, practical electrolysis cells require cooling during operation and an efficient way to accomplish this cooling may be by utilizing the process water itself to cool the cells. Depending on the operating conditions of the cell, a relatively high flow rate of water may be required to ensure the peak temperature of the cell is kept below an acceptable threshold and the temperature gradient within the cell is also acceptable. This flow rate may also represent a water stoich much greater than 1. For example, for a cell operating at 1.8V, releasing 18% of the input energy into heat and operating at 2.7 W/cm², a water stoich of approximately 160 may be required to maintain a temperature rise of <10° C. across the cell. From the design considerations described above, water flow rate into the cell may be determined by the need for adequate reactants or by the need for adequate temperature control, whichever is higher.

Managing the water provided to a hydrogen electrolysis cell/stack may be a major consideration for the overall hydrogen generation system. Flow rate, pressure, temperature, and composition must all be regulated to meet the requirements of the cell/stack. A typical system may include a liquid-gas separator, heat exchanger, pump, and de-ionization system connected in a loop with the anode side of the cell/stack to recirculate water at the required flow rate. As the system produces hydrogen and oxygen, one "stoich" of water is consumed. Consumed water may be made-up by injecting 1 stoich of new water into the system loop from a source of acceptable quality (e.g., demineralized, de-salinized, or city water). When considering the scale of an electrolysis plant, the required water flow consumed by the cells/stacks may be proportional to the plant capacity. It may be desirable to keep other process parameters (pressures, temperatures, compositions) uniform regardless of scale as it may greatly simplify system component selection, overall system controls and the cost of engineering, procurement, and construction (EPC) at the deployment site. For example, water pumps may be generally commercially available at a wide range of scale in flow rate for a given pressure capability. It may, therefore, be advantageous to have a basic cell/stack whose water flow resistance is not dependent on cell or stack size. Larger systems could then be constructed in a modular fashion, from more cells and/or more stacks without requiring a change in water pump technology and basic pressure ratings for the system and plant.

The elements of a hydrogen electrolyzer stack may include a stack of repeating components and a system of non-repeating components. As the name implies, the repeating components are those whose quantity scales with stack height and may typically include the membrane/electrolyte, anode and cathode electrodes, water and hydrogen flow fields, water and hydrogen seals, and a bipolar, cell separator plate. The non-repeating components may typically include end units and a mechanical system for maintaining stack compression. The end units may also include power terminals, electrical isolators, fluid distribution and/or drain/purge manifolds and structural end plates. The stack compression system may include tension elements, spring elements and adjustable elements used to transfer mechanical force (tension) in the tensile and spring elements to mechanical force (compression) in the stacked core of repeating components. This compression of the stack core may be essential to ensure both electrical contact and fluid sealing between individual cells and with the end units. For convenience we may define a cartesian coordinate system with perpendicular x-y-z axes where "x" is parallel to the general direction of water flow through the stack, "y" is perpendicular to x, but in the same plane defined by a single cell, and "z" is generally parallel to the direction of stacking of the cells. In this context the compression system generally works to apply compressive load along the z axis.

To function properly over an expected range of operating conditions for the electrolyzer stack, the compression system may maintain adequate compression on the stack over a range of temperatures taking into consideration thermal expansion and contraction. The system may also apply compressive load high enough to prevent cells from separating over the expected range of operating pressure within the cells. Separation as pressure increases may result in either reduced performance due to a loss of contact between cells, fluid leakage, or both. Electrolysis cells and stacks may be designed to a maximum allowable working pressure (MAWP) on both the hydrogen and water sides of the cell. The MAWP, the desired cell-to-cell contact pressure, the mechanical stiffness of the core, the overall operating temperature range and the expected variation in repeating component thicknesses may be the major drivers for the design of a stack compression system.

A typical electrolysis cell may be generally circular in shape or rectangular in shape, although other geometries are possible. Circular cells were historically selected to enable a circular cell pressure boundary in establishing the MAWP of the cell. Recently, rectangular cells have been introduced due to major benefits in reducing material waste during manufacturing. Rectangular cells may maintain a cell pressure boundary relying on friction and/or bonding between the cell frame and the bipolar plate. In both cases, the typical compression system employed may involve two thick end plates, one on each end of the stack core, and a multitude of spring-loaded tie rods extending between the plates, generally evenly distributed around the periphery of the x-y plane of the stack to minimize deformation of the end plates. The tie rods may act as both the tension and adjustable elements of the compression system. As tension load is increased in the adjustable rods, the endplates may function like a diaphragm and bend to deliver a compressive load to the stack core. Basic structural mechanics dictates that as the load increases (greater MAWP, more pre-load required for contact or sealing), the thickness or material stiffness of the end plates may also increase to prevent excessive bending and loss of contact near the central region of the cell. Basic structural mechanics also dictates that as the area of the cell increases in the x-y plane, the thickness or material stiffness of the end plates may also increase to prevent excessive bending and loss of contact near the central region of the cell. With increased area, the total number of rods/springs may be increased as well to minimize spacing between rods and peripheral bending and contact/sealing issues. These changes may require redesign, re-engineering and re-validation of the stack and system from a basic level when larger cells are desired. This, in turn, may present challenges to manufacturing due to multi-dimensional variability of components, changing requirements for handling and other inconsistencies/changes in assembly procedures.

As described above, the basic elements of an electrolyzer cell may include: two electrodes, a unitized, solid, ion-conducting separation membrane, flow fields for delivering reactants to the electrodes, seals for isolating reactants from each other and the environment and an impermeable bipolar plate. The cell design may also include features to facilitate stacking of cells and sealing between stacked cells. These may include seals for water and/or hydrogen, windows and ports at the cell periphery for distributing and collecting water, oxygen, and hydrogen and various other detailed features to ensure load from the compression of the stack core is directed in proper proportion to the active area and peripheral seals of the individual cells. As cells are stacked, windows at the cell periphery may be aligned and form continuous plenums through which water, oxygen and hydrogen may be directed into/out of the cells and toward the ends of the stack. In a typical electrolysis stack, due to limited available area around the x-y boundary, these plenums may be aligned with holes provided in one or both of the end plates, thereby facilitating external process fluid connections to the stack from the system. Through-hole features in the endplates may weaken their structure and require the end plates to be made even thicker or stiffer. Pipes exiting the stack along the z axis may require additional z-direction height in the end units for distributing and collecting fluids from plenums arranged at the periphery of the x-y plane. This space may also add to the thickness of the end plates. If not enough space is allocated, poorly distributed fluid to or high pressure-loss through the stack may result, thereby impacting performance or durability. Pipes exiting the stack along the z axis may also present awkward installation and alignment challenges for piping connections to the system. It may be advantageous to manifold the plenums together within one or both end units and allow the process connection to the stack to be made perpendicular to z in the x and/or y direction. However, with tension elements surrounding the whole of the x-y plane, it may be challenging for process connections to exit the stack boundary other than along the z axis without interfering with the tension members.

Thus, one embodiment of the present disclosure provides a scalable electrolyzer cell with substantially equal resistance to water flow, equal temperature-rise, and equal exit oxygen fraction at a given operating voltage regardless of selected active area. In some embodiments, the cell may be substantially rectangular, characterized by a dimension along an x-axis which is selected according to a roll web width (w) of a membrane, an electrode, and/or a flow field material used in its production. In some embodiments, a desired roll web width (w) may be selected based on maintaining process parameters for the operating cell within target threshold values. For example, it may be desirable to keep a water pressure drop for the cell below a pumping pressure limitation of the system into which the cell may be installed. Alternately, it may be desirable to keep a water flow temperature rise below a stack temperature gradient limitation to ensure acceptable performance and lifetime. Alternately, it may be desirable to keep cell outlet oxygen volume fraction below a limit that ensures stable performance and lifetime of the cell. Alternately, a desired roll web width (w) may be selected based on available source materials for constructing the cell. For example, it may be desirable to select a roll web width that minimized scrap material in converting rolls into pieces during assembly. In this case the desired roll web width for the membrane, the electrodes and the flow fields may be the same or different. If they are different, the selected roll web width may be chosen based on the most expensive of the membrane, the electrodes or the flow fields and the other material rolls may be selected with a web width (w) consistent with the others, where consistent implies a roll web width (w) that optimizes manufacturing speed and/or overall cost.

In some embodiments, a variable cell area may be achieved from the scalable cell by adjusting the length of the cell along a y-axis. Water distribution windows may be arranged parallel to a y-axis, along a leading edge of the anode flow field and each window may be associated with a unit length of the anode flow field. A leading edge of an anode flow field may be defined as the edge through which water flows into the anode flow field. The area, or effective diameter—a diameter of a circle whose area is equal to that of the window—of each water distribution window may be selected to maintain water velocity along a z-axis through the window below a predetermined threshold at a water flow stoich selected to maintain one or more of a cell temperature-rise or an oxygen outlet volume fraction below a target threshold. The unit length associated with each water distribution window may be selected to keep a water velocity along an x-axis at the leading edge of the anode flow field below a predetermined threshold. The number of water distribution windows may then be selected to achieve the overall target hydrogen production rate for the cell while maintaining water flow pressure loss, water temperature-rise and oxygen outlet volume fraction below a target threshold.

In another embodiment, a bipolar plate assembly is provided for a scalable electrolysis cell, comprising a bipolar plate, a hydrogen seal, a water seal, and a fluid distribution frame. The fluid distribution frame may be configured to locate, bound, and contain a cathode flow field, a cathode electrode, a membrane, an anode electrode, and an anode flow field between two adjacent bipolar plates. The fluid distribution frame may also be configured to uniformly distribute water flow from one or more water delivery windows to a leading edge of the anode flow field. The fluid distribution frame may be further configured to uniformly collect water and oxygen flow from a trailing edge of the anode flow field and distribute said flows to one or more oxygen collection windows. A trailing edge may be defined as the edge of the anode flow field through which water and/or oxygen flow out of the flow field. Uniform distribution or collection may be defined as less than plus or minus 50% velocity variation at the leading and/or trailing edges of the flow field. The fluid distribution frame may be further configured to engage a hydrogen seal between the frame and a bipolar plate adjacent to the cathode flow field. The fluid distribution frame may be further configured to receive a water seal between the frame and a bipolar plate adjacent to the anode flow field. The fluid distribution frame may be further configured to enable curing by ultraviolet light, microwaves, magnetocuring, thermal curing, solvent curing, a two-part epoxy curing method, and/or humidity curing of at least one of the hydrogen or the water seal. To accomplish this the frame may be constructed of a UV-transparent material or a microwave-transparent material to enable ultraviolet light to access the hydrogen seal located between the frame and bipolar plate. The advantage of ultraviolet and microwave cured seals may be the potential for very fast curing and short cycle time leading to high speed, low-cost manufacturing of the bipolar plate assembly. Alternatively, the fluid distribution frame may be constructed from a material that serves to function as a seal, thereby eliminating the need for curing. For example, the frame itself may be made of silicone rubber or polyurethane or any of a variety of other polymers with properties and a geometry suited to deforming under compression and forming the hydrogen seal, the water seal or both. For example, the frame may be manufactured by a two-shot injection molding process as a single integral component, pairing a rigid base frame with over-molded elastomeric patterns for the hydrogen seal, the water seal or both. In another example, the fluid distribution frame may be constructed by screen printing the hydrogen and/or water seals onto one or both sides of a plastic film in a roll-to-roll process. The fluid distribution frame may be further configured to collect a hydrogen flow from one or more trailing edges of a cathode flow field and deliver said flow to one or more hydrogen collection windows. The fluid distribution frame may be further configured to engage an internal seal between an anode and a cathode flow field, the seal being applied to at least one of a membrane, a catalyst coated membrane, an electrode, a sub-gasket border of a membrane-electrode assembly or the frame itself. The anode flow field may be further configured to be larger than the cathode flow field such that the anode flow field facilitates application of compressive load to the internal seal as the cell stack is compressed. The fluid distribution frame, water seal, and hydrogen seal may be further arranged in a projected view along a z-axis to minimize unsupported seal area, wherein unsupported seal area is defined as any area where compressive load cannot transfer between components along a z-axis. For example, it may be advantageous to sealing performance and reliability to ensure that less than 50% of the project seal along a z-axis is left unsupported.

In some embodiments, a method of manufacturing a bipolar plate assembly for a scalable electrolysis cell is described. In some embodiments, the method involves a series of manufacturing steps in a continuous production line designed for high-speed assembly. First, a material for a bipolar plate, a hydrogen seal, a water seal, and a fluid distribution frame may be selected from appropriate candidate materials compatible with production, operation, performance, and lifetime expectations of the electrolyzer to be manufactured. Second, a bipolar plate may be produced from a coil of the selected material by stamping, laser cutting, waterjet cutting, or other appropriate metal forming technique. If required for performance or durability, the bipolar plate may be coated with an appropriate layer of material. For example, a thin layer of gold may be required for a PEM electrolyzer whereas a thin layer of nickel may be required for an AEM electrolyzer. Alternately, a coating may not be required, and the produced bipolar plate may need only to be passivated and/or cleaned after forming to eliminate contamination and promote adhesion of the hydrogen seal to be applied. A variety of standard passivating and cleaning methods may be used to ensure free metals and hydrophobic contaminants are minimized on the bipolar plate surfaces. Third, a hydrogen seal may be applied to the bipolar plate in an uncured state. Methods including screen printing, rotary screen printing, stencil printing, robotic dispensing, injection molding, compression molding, or stamp printing may be selected based on factors including, but not limited to, process speed, cycle time, material waste, and machine cost. For example, screen printing may be a very fast process, but may not be appropriate for seals that are too thick or seals that are not planar in design. In another example, multiple screen prints may be executed to build the required thickness for the seals. Fourth, a fluid distribution frame, having been produced in a separate process, may be aligned with the bipolar plate and hydrogen seal in an x-y plane and pressed onto the uncured hydrogen seal with a force appropriate to ensure an unbroken seal may be created between the cathode flow field of the cell and both the water distribution windows and the outside perimeter of the cell. The fluid distribution frame may also be pressed onto the hydrogen seal to achieve a specific target thickness for the bipolar plate assembly. This method may allow the final thickness of the hydrogen seal to vary, thereby reducing tolerance stack-up and overall bipolar plate thickness variation due to variability in either the bipolar plate thickness, fluid distribution frame thickness, or both. At this point the hydrogen seal may be cured by an appropriate process (as discussed herein) or left uncured. Fifth, a water seal may be applied to the fluid distribution frame in an uncured state. Methods, including screen printing, rotary screen printing, stencil printing, robotic dispensing, injection molding, compression molding, or stamp printing, may be selected based on factors including, but not limited to, process speed, cycle time, material waste, and machine cost. Sixth, the water seal, and hydrogen seal if not previously cured, may be cured using an appropriate process such as ultraviolet light curing, microwave curing, thermal curing, solvent curing, a two-part epoxy curing method or humidity curing based on factors including process speed, cycle time, and machine cost. For example, ultraviolet light curing can be a very fast process, but requires the light source to have line-of-sight to the uncured seal material. The curing of a hydrogen seal between a bipolar plate and a fluid distribution frame where these components are opaque to light may prevent ultraviolet light curing from working. If the fluid distribution frame or bipolar plate were transparent to ultraviolet light, then fast curing with this technique may be possible. An advantage of selecting a transparent material for the fluid distribution frame may be that it enables simultaneous curing of both the hydrogen and water seals, eliminating the cost and process time associated with separate curing steps.

In another embodiment, a scalable electrolyzer stack compression system is described, adapted to accept and compress a plurality of scalable electrolyzer cells with a generally fixed dimension along an x-axis and a variable dimension along a y-axis. The compression system may be configured with tension members along two opposite sides of a generally rectangular cell stack, those sides being parallel to the y-axis such that the stress area of the tension members grows proportionately to the variable, y-axis dimension (e.g., y-axis length) of the cells. The two sides adjacent to the tension members may be left open to facilitate high-speed stack assembly and efficient process connections to the stack, or may optionally include further tension members. In some embodiments, the tension members may be further characterized as being constructed from generally flat sheets of material, wrapped into a frame structure surrounding the ends and two variable-length sides of the stack. The wrap may be formed into a semi-cylindrical shape at each end of the stack, producing a generally oval racetrack profile when viewed along a y-axis. This shape may have the advantage of allowing the wrap material to be configured such that mechanical stress in the wrap may be substantially tensile stress and bending of the semi-cylindrical end units may be minimized. The wrap may be configured to allow a slip surface between the wrap and the associated semi-cylindrical end units of the cell stack. The wrap, having characteristics of a generally fixed dimension along an x-axis and scalable dimensions along both a y-axis (cell area) and a z-axis (number of cells), may enable the same material and thickness to be used regardless of cell active area or stack height. As the cell area grows by increasing length along a y-axis, the wrap depth along the y-axis may optionally grow proportionately. As the added active area may require added compressive load for assembly, the material naturally added to increase the y-axis depth of the wrap may provide the structure to carry this load in direct proportion at the same wrap thickness. This geometric scalability may provide advantages in simplified and consistent production of wraps for different stacks and in economies of scale for raw material procurement. The thickness of the wrap may then only be a function of the fixed x-axis dimension of the cell, the desired pre-load to be applied to the stack core at assembly, and/or the rated maximum allowable working pressure of the electrolyzer. The thickness of the wrap may be greater than or equal to the dimension of the cathode flow field along an x-axis multiplied by the ratio of the maximum allowable working pressure of the electrolyzer to the tensile strength of the selected wrap material.

In another embodiment, the wrap may be constructed from one piece of material, joined at a single seam, or more than one piece of material joined at several seams. For example, it may be advantageous to construct the wrap from two opposing halves, connected with hinge-pin style joints on the flat sides of the oval racetrack profile. This construction may facilitate direct stack assembly at high speed within the one half of the wrap through one or both open sides of the wrap. It may also allow the second half of the wrap to be used in efficiently pre-compressing the stack of cells after stacking is complete. It may also allow for efficient joining of the two wrap halves into a continuous structural border by inserting the hinge pins along a y-axis into aligned hinge loops formed into each wrap half. The connection method may also be formed using alternate joint designs such as lap-weld, lap-bolt, flange-weld, flange-bolt, hem-hook, and/or braced hem-hook. The wrap may be designed to be generally continuous along a y-axis or may be designed with strips along the flat sides. The width and length of the strips may be selected to facilitate formation of the selected joint design. The width and length of the strips may be selected to achieve a desired strength and/or a desired elasticity under load. The strips may run part way around one or both wrap halves or may completely subdivide the two halves into separate bands. The strips may have a uniform y-axis dimension along a z-axis or may vary. The variation in strip geometry in a y-z plane may be selected to achieve a desired strength, a desired elasticity, or both.

In another embodiment, the semi-cylindrical end-units may be configured to contain an adjustable element of the compression system. The adjustable element may be fully contained within one or both of the cylindrical end units, thereby reducing the overall volume compared to a stack with adjustable elements outside the tension element boundary. The adjustable elements may include screws, nuts, springs, pads, shoes, and other structural components necessary to transfer tensile stress from the wrap to compressive stress in the stack core. The components of the adjustable element may be arranged to promote separation of two or more components along a z-axis in alignment with the cell stack from within the wrap boundary, thereby causing the wrap to stretch while the cell stack is compressed. The adjustable element may be configured with greater length of adjustability when cell stacks of more cells are to be compressed. The adjustable element may also be provided with features to allow an external system to compress the cell stack during initial assembly. For example, holes and contact pads may be provided to allow hydraulic or pneumatic cylinders as part of a high-speed manufacturing machine to be used to compress the cell stack to a desired, precise load during assembly. The adjustable element may then be engaged to transfer load from the manufacturing system to the wrap an achieve a final, desired, precise load on the cell stack. There may be one or a multitude of adjustable elements fitted within the cylindrical end units. The number of adjustable elements may be designed to scale proportionately with the y-axis dimension of the cell stack and/or the number of fluid distribution windows selected for the scalable cell to be compressed.

In another embodiment, the wrap may be provided with features to facilitate engagement with cell stack alignment and compression fixtures. For example, the wrap may be provided with holes or slots along one or both flat sides to enable alignment rails to be brought into contact with one or more edges of the cells as they are being placed on the stack during assembly. It should be understood the holes or slots need not necessarily be rectangular or circular. These features may be designed to enable precise datums to be established along a z-axis to ensure all cells in the cell stack are accurately aligned relative to each other and to the cell stack compression system. The wrap may also be provided with features to allow access to the adjustable elements within one or both semi-cylindrical end units to facilitate compression. For example, holes may be provided in the wrap to allow hydraulically driven posts to compress the cell stack to a desired first load. Additional holes may be provided to allow access to an adjustable screw or nut for the purpose of transferring load from the compression machine to the wrap. Again, it should be understood the holes need not necessarily be rectangular or circular.

In another embodiment, a scalable electrolyzer stack is described comprising a cell stack of scalable electrolyzer cells, scalable cell stack end units, and a scalable cell stack compression system. The electrolyzer stack includes a multitude of individual cells arranged along a z-axis. In aligning these cells into a cell stack, the water and hydrogen distribution windows present in each cell align along the z-axis to form water and hydrogen plenums for distributing and collecting process fluids to and from individual cells in the cell stack.

The electrolyzer stack may also include process ports entering and/or exiting the stack compression system boundary on faces defined by an x-z plane, through freely accessible sides of the compression system. The stack may comprise a process manifold in one end unit of the stack and a drain/purge manifold in the opposite end unit. These manifolds may be configured to fluidly connect the stack process ports with the appropriate fluid plenums in the cell stack. In this way a single water stream may be delivered to a water inlet port of the stack, sub-divided amongst a multitude of water inlet plenums, and further subdivided and delivered to individual water distribution windows and associated lengths of a leading edge of the anode flow field. Each associated length of a leading edge of the anode flow field may deliver water flow to the anode electrode at a mass flow rate and velocity to ensure the pressure loss, temperature rise, and increase in oxygen volume fraction is below target thresholds for each parameter over the flow length along an x-axis in the anode flow field. At the trailing edge of the anode flow field an associated length of a trailing edge may deliver water/oxygen flow to an associated water collection window, which may combine to form water collection plenums, which deliver water and oxygen to a common manifold, and ultimately a single water outlet port for connection to the electrolysis system.

Electrical power terminals may be provided in both end units, one positive and one negative for providing electricity to the stack. Access to individual cells of the cell stack may also be provided on one or both freely accessible sides of the cell stack for probing individual cell voltages. In certain cases, it may be advantageous for the positive pole of the stack to be at the top and the negative pole at the bottom when the z-axis is substantially aligned with the gravitational vector. In this configuration, bubbles formed on the anode side of the cells may be motivated by gravity to move away from the electrode, thereby freeing access for water to further react and potentially improving performance of the cell stack. In other configurations, wherein the z-axis is not substantially aligned with the gravitational vector, it may still be advantageous for the positive pole of the stack to be elevated with respect to the negative pole, for similar reasons.

In certain cases, it may be advantageous for the process connections—water in, water/oxygen out and hydrogen out—to be in the top end unit. In this configuration, as oxygen bubbles become a significant volume percentage of the outlet fluid on the anode side, they may tend to rise due to gravity in water outlet plenums. With the process manifold at the top, the rising oxygen bubbles may flow in the general direction desired and may help prevent liquid slugging, vapor lock and/or other flow instabilities potentially caused by flowing the bubbles against gravity. In certain cases, it may be advantageous for the drain/purge manifold to be in the bottom end unit. During startup and service of the electrolyzer stack it may be necessary to drain standing water from the electrolyzer stack prior to connecting or disconnecting the stack with the system. During service or operation, it may be necessary to purge the hydrogen collection plenums of condensed water. A drain/purge manifold located at the lowest point relative to gravity may best facilitate complete expulsion of water from the stack. During service it may also be necessary to purge the cathode with an inert gas such as nitrogen before hydrogen is first generated on the cathode. The drain/purge manifold may also be configured to accept a process connection for inert-gas purging of the cathode side of the stack.

In another embodiment, a method of manufacturing a scalable electrolyzer stack is described comprising a stack assembly station located at the end of a cell assembly line. The stacking station may be arranged to allow multiple operators to perform actions simultaneously, thereby accelerating throughput of finished stacks and enabling high speed production of both cells and stacks. For example, a full-scale stack may contain 300 cells and a manufacturing facility configured to produce 1,000 megawatts of electrolyzer stacks in a year may need to process up to 1,000 such stacks and 300,000 corresponding cells in each year. For one production shift operating 1,750 work hours per year, this production capacity requires a tack time of approximately 20 seconds per cell. With 300 cells per stack, each stack station may have up to 1.8 hours. In some embodiments, stations may comprise 1) preparing and loading non-repeating stack components in assembly fixtures; 2) cell placement and alignment; 3) cell stack compression, leak check and locking; and 4) stack finishing and unloading. These stations may be conveniently positioned on a rotary table at the end of the cell manufacturing line. The stations may be at 90-degree angles to one another whereby the non-repeating station may be first, the cell placement station may be second, the cell stack compression and leak station may be third and the stack finishing and unloading station may be last. Each station may include specific tooling, fixtures, and equipment to facilitate the task. For example, the cell placement and alignment station may include one or more cell alignment rails against which the individual cells may be placed to ensure straight and accurate alignment along a z-axis. Functioning of said rails may be facilitated by features such as holes and/or slots in the stack compression wrap. The table may be controlled to rotate 90-degrees every 1.8 hours, after the final cell in the stack is placed and aligned in the second station. Certain stations may require more labor time than others and a single worker may perform duties at more than one station.

The system may be conducive to assembly of scalable cells and stacks based on a fixed roll web width (w) along an x-axis, as described previously. The cell assembly line may convey component in a direction generally aligned with a y-axis. Such a conveyer could flexibly handle cells of various areas as the varying cell dimension for larger or smaller cells is in the direction of conveyance and wider cell assembly belts, machines and handling equipment would not be required. At the end of the cell assembly line a rotary stack assembly station may be positioned to enable stack compression systems configured for different size cells to accept said cells. A scalable compression system, also based on the same fixed roll web width (w), may allow only the distance along a y-axis for the pick and place operation to vary to handle assembly of stacks of different area cells.

The system may also allow production rates greater than 1,000 stacks per year. For example, operators at the rotary table may only require 30 minutes to complete their tasks. This may enable the cell production rate to increase by a factor of four, resulting in a tack time of approximately 5 seconds per cell. A high-speed curing technique such as ultraviolet light curing may be conducive to such cycle times, thereby enabling a single stack manufacturing line to produce up to 4,000, megawatt-class stacks per year on a single shift. The flexible nature of a scalable cell, stack, and manufacturing process design may enable the investment in such a line to be protected from early obsolescence as technologies improve and stacks of different sizes may be required by the market.

The described manufacturing system may also be flexible in terms of electrolysis technology. The system may produce PEM electrolyzers so long as PEM components and materials are used in the cell assembly line. The system may produce AEM electrolyzer so long as AEM components and materials are used in the cell assembly line.

In another embodiment, a method for high-speed manufacturing of an internal seal for a scalable electrolysis cell is described. A membrane or a catalyst coated membrane of a desired roll web width along an x-axis may be selected. Material from the roll may be directed through a seal application machine along a y-axis wherein an uncured internal seal may be applied to one side of the material using one of a screen printing, rotary screen printing, stencil printing, or robotic dispensing method. The selection of method may be made based on the required speed of production (i.e., process cycle and/or tack time) and multiple application cycles may be employed to build the required thickness for functioning on the seal. The applied internal seal may be cured the using a high-speed curing system such as ultraviolet light curing, microwave curing, thermal curing, solvent curing, a two-part epoxy curing method, or humidity curing. The membrane-gasket assembly or catalyst coated membrane-gasket assembly roll may then be cut into discrete piece parts using a flat knife-die, rolling knife die, laser, or any other common cutting method. The resulting individual piece parts may be delivered to a cell assembly machine for integration into a complete, scalable electrolysis cell.

In another embodiment, a method of manufacturing a unitized electrode flow field for a scalable electrolysis cell is described. An electrode substrate of a desired roll web width along and x-axis may be selected from one of a foam, a felt, a woven screen, an expanded metal, or a sintered metal frit. A flow field substrate of a desired roll web width along and x-axis may be selected from one of a foam, a felt, a woven screen, an expanded metal, or a sintered metal frit. The electrode substrate material from the roll may be directed along a y-axis through calendering rollers configured to achieve the desired thickness and surface properties of each side of the electrode substrate. For example, calendering rollers placed on either side of the substrate web may be of the same diameter or different diameters or they may be of the same material or of different materials. It may be advantageous to use a harder and/or smaller roll on the side of the electrode substrate that is to be converted to an active electrode to achieve a denser and/or smoother surface for conversion. It may also be advantageous to use a softer and/or larger roll on the side of the electrode substrate that is to be laminated to the flow field substrate to maintain a more porous and/or rougher surface for lamination.

The electrode substrate may be converted to an active electrode by an appropriate process. For example, an electrode material may be spray coated, screen printed, rotary screen printed, doctor-blade coated, slot die coated, curtain coated, squeegee coated, or laminated using heat and/or pressure on the appropriate surface of the electrode substrate. The electrode conversion process may also include a post-coating step. For example, the coating may be dried, heat treated, annealed, or otherwise physically or chemically processed to promote bonding to the substrate and/or functional performance of the cell. The flow field substrate material from the roll may be directed along a y-axis and placed adjacent to the active electrode web and, through a laminating process, the electrode and the flow field webs may be caused to adhere together. The laminating process may include roller calendering wherein the mating surfaces of the electrode web and flow field web are mechanically squeezed such that solid fibers and/or ligaments of the substrate intertwine and become locked together. The laminated electrode flow field roll may then be cut into discrete piece parts, which may be delivered to a cell assembly machine for integration into a complete, scalable electrolysis cell.

It is to be understood that both the foregoing general descriptions and the following detailed descriptions are exemplary and explanatory only and not restrictive of the disclosure, as claimed. Further objects, features, and advantages of the present application will become apparent from the detailed description of preferred embodiments which is set forth below, when considered together with the figures of drawing.

BRIEF DESCRIPTION OF DRAWINGS

The accompanying drawings are incorporated into and constitute a part of this specification. The drawings illustrate certain embodiments only of the present disclosure and, together with the foregoing and following descriptions, explain the principles of the disclosure. Wherever possible the same identification numbers have been used to indicate common or like components across different figures.

FIG. 1 shows an isometric view of a preferred embodiment of a scalable electrolyzer stack including major components and a defining cartesian coordinate system.

FIG. 6 shows a plan view of an exemplary cell illustrating features including water delivery and collection windows and scalability of the cell active area through replication of water windows and associated anode flow field lengths along a y-axis with a fixed dimension along an x-axis based on a desired roll web width (w).

FIG. 7e shows an embodiment of a cross-section view of FIG. 7d.

FIG. 8 shows a plan view of a bipolar plate assembly of FIG. 7a looking downward along a z-axis and illustrating the projected alignment of exemplary water and hydrogen seals.

FIG. 9 shows an isometric view of a typical water distribution window illustrating the distribution and sealing features that may be included in the frame to provide uniform water flow to the associated length of the anode flow field.

FIG. 10 shows a plan view of a bipolar plate assembly of FIG. 7a looking upward along a z-axis and illustrating the projected alignment of exemplary water and hydrogen seals.

FIG. 11 shows an isometric view of a typical hydrogen collection window illustrating the distribution and sealing features that may be included in the frame to uniformly collect hydrogen produced by the cell and deliver it to one or more collection windows.

FIG. 15 shows the basic steps that may be included in a high-speed manufacturing process for assembling a unitized electrolysis cell.

FIG. 17b shows the cross section of FIG. 17a illustrating engagement of the stack alignment fixtures through gaps provided in the wrap for that purpose and the engagement of movable cell positioning actuators along opposite sides of the cell.

FIG. 18b shows exemplary joints for connection the lower and upper parts of the wrap described in FIG. 18a.

FIG. 19 shows exemplary components of an adjustable element of the compression system packaged into the lower semi-cylindrical end unit illustrating the internal separating force generated by locking the system resulting in compression of the cell stack and tension in the wrap.

FIGS. 23a, 23b, 23c and 23d depict an alternate embodiment of a compression system.

FIG. 25 shows an embodiment of a complete, megawatt-class electrolysis stack comprising elements disclosed in this specification.

DETAILED DESCRIPTION OF DRAWINGS

Figures 2A, 2B:
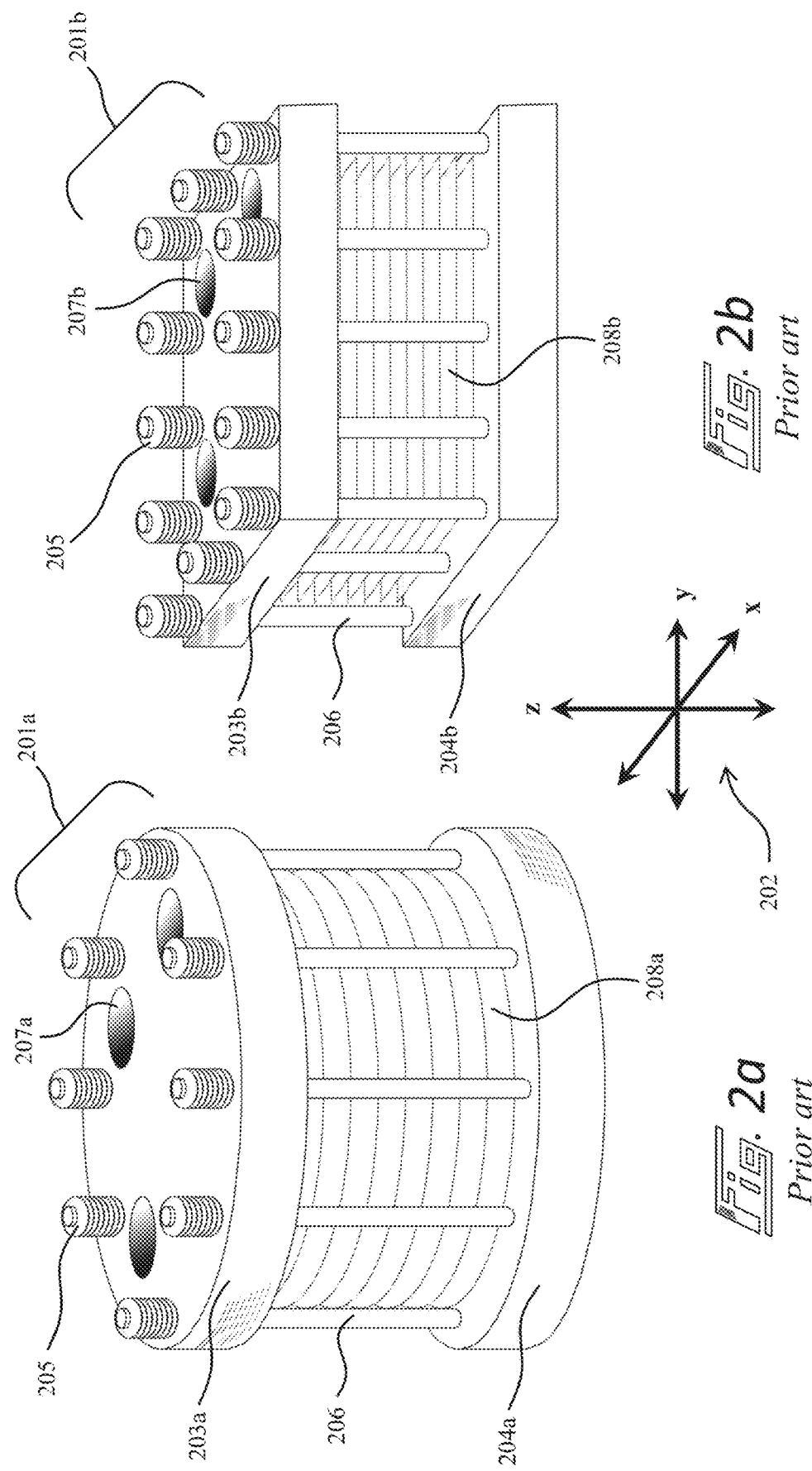
FIGS. 2a & 2b show exemplary prior art electrolyzer stacks including major components and features that may limit scalability of their designs.

Detailed descriptions of several preferred embodiments will now be given in reference to the accompanying drawings. Although descriptions relate to electrolysis, it is understood that the described features, components, and methods are applicable and adaptable, by those skilled in the art, to other electrochemical technologies including hydrogen compressors and hydrogen purifiers.

FIG. 1 shows an isometric view of an embodiment of a scalable electrolyzer stack (101) including major components: lower wrap (103), upper wrap (104), cell stack (105), lower end unit (106), upper end unit (107) and a defining cartesian coordinate system (102). The stack (101) may be characterized by having variable dimensions along the y and z-axes and a relatively fixed dimension along an x-axis in FIG. 1. Changes in active area for cells in cell stack (105) may increase or decrease the dimension of the stack along a y-axis. Changes in the number of cells used in the cell stack may increase or decrease the dimension of the cell stack along a z-axis. For convenience of manufacturing (described in detail later) the compression system of the stack assembly may comprise two pieces, a lower wrap (103) and an upper wrap (104), connected at a joint (109) to form a continuous tension boundary around the cell stack (105) and end units (106) & (107) when viewed along a y-axis. This wrap configuration may also provide free access to the two opposite sides of the stack aligned with the x-z plane (102). The lower wrap (103) and/or the upper wrap (104) may also comprise holes, slots, or other gap features (108) to facilitate high speed stack assembly as described in process (1801) further below. The lower end unit (106) and upper end unit (107) may comprise several components each including end blocks, gaskets, manifolds, electrical isolation and/or power terminals. Additionally, one or both end units may be configured to contain adjustable elements for compressing the cell stack.

FIGS. 2a & 2b show exemplary prior art electrolyzer stacks including major components and features that may limit scalability of their designs as well as a reference coordinate system (202). Prior art electrolyzer stacks may be round (201a) or rectangular (201b) in cell shape. Both shapes may embody common elements including end plates (203a/b) and (204a/b), tensile elements—tie rods (206), adjustable elements—screws, nuts, springs (205), a cell stack (208a/b) and ports (207a/b) for conveying process fluids into and out of the stack. An essential element of an electrolysis stack may be to maintain compressive load on the cell stack (208a/b). This has historically been accomplished as shown by tying structural plates (203a/b) and (204a/b) on either end of the cell stack together with tie rods (206). The tie rods may be threaded to allow adjustment for varying cell stack height and to create tension force in the rod to be used as a source of compression force for the cell stack core. The overall compression load may be a function of the pressure required by the cell active area, the pressure required by the seals between each cell and the operating pressure within the process fluids of the cell, which acts to separate the cells from one another. As the active area of the cell stack is made bigger (e.g. for higher capacity systems), the total pressure required by the cells may remain fixed, thereby increasing the total force required of the compression system in proportion to the area. Therefore, as cells in stack (201a/b) grow in the x-y plane, the end plates (203a/b) and (204a/b) may become very heavy and thick. The number of tie rods (206) also may increase in order to minimize structural bending of the end plates. As the tie rods (206) may surround the entire cell stack (208a/b) periphery, the only space available for connecting process fluids ports (207a/b) may be through the end plates (203a/b) and/or (204a/b). The overall variation in size, weight, and tensile element quantity for traditional electrolyzer cell stacks may limit the ability to scale designs and manufacturing systems for cells and stacks designed in this way.

Figure 3:
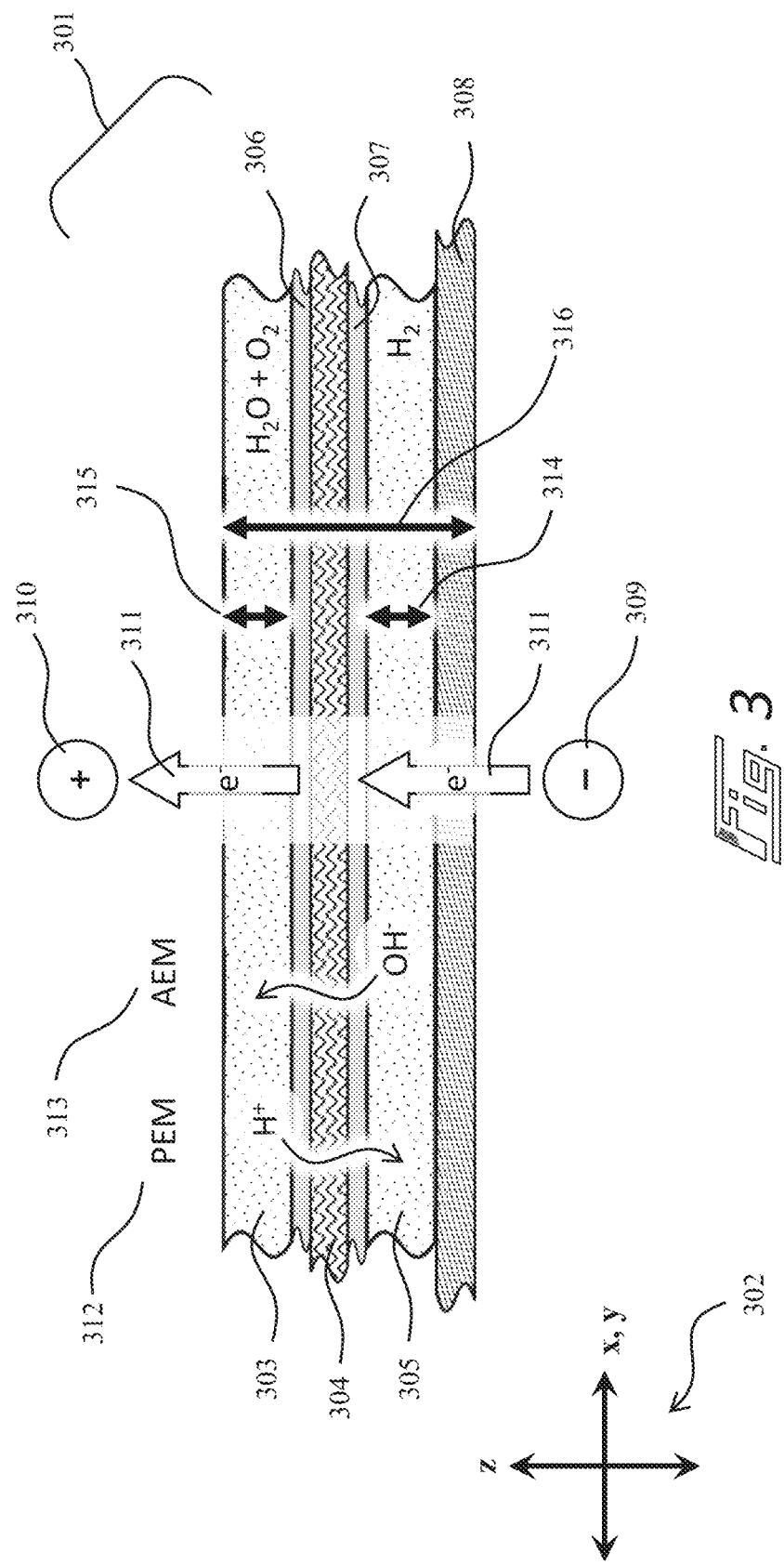
FIG. 3 shows a cross-section of electrolysis cell components in the active area of a typical cell illustrating ion, electron and fluid flows for proton and anion exchange membrane electrolysis technologies.

FIG. 3 shows a cross-section of an embodiment of exemplary core electrolysis cell components (301) in the active area of a cell illustrating typical ion, electron, and fluid flows for proton (312) and anion (313) exchange membrane electrolysis technologies. Here (308) is an impermeable separator, or bipolar, plate; (305) is a cathode flow field; (307) is a cathode electrode; (304) is an ion-conducting membrane; (306) is an anode electrode and (303) is an anode flow field. Attaching a power supply to the cell with a negative pole (309) at the bottom and a positive pole (310) at the top, may cause electrons (311) to flow upward through the cell. If the cell is an acidic, proton-conducting type (312), positive hydronium ions may be motivated by the resulting electrical field to move downward through the membrane (304). If the cell is an alkaline, hydroxide-conducting type (313), negative hydroxide ions may be motivated by the resulting electrical field to move upward through the membrane (304). In both types, hydrogen may be formed on the cathode (307) and flow into the cathode flow field (305), whereas oxygen may be formed on the anode (306) and flow into the anode flow field (303). In dry-cathode systems, water may be provided only to the anode flow field (303) as a reactant for forming hydrogen and oxygen. Stoichiometry is a term relating to the "balance" of a chemical reaction. In electrochemical cells the term "stoichiometry" or "stoich" refers to the ratio of reactants fed to a cell relative to the amount required to exactly balance the overall reaction. As described earlier in this specification, the water stoich provided to anode flow field (303) may be much higher than 1. Also, because the fluid in the anode flow field (303) may be mostly liquid, this compartment may represent significant flow resistance compared to the cathode flow field. The thickness of the cathode (314) and anode (315) flow fields may have an impact on flow velocity, temperature distribution, and pressure losses in the cell. The overall cell pitch (316) of the cell may be determined by the thicknesses of each of components (303) through (308) making up the complete cell. A small cell pitch (316) may be desirable for producing an electrolyzer stack with high power density and a small size for a given hydrogen production rate [kg/hr]. Therefore, optimizing the anode flow field geometry—length in a water flow direction along an x-axis, width along a y-axis and thickness along a z-axis—may be a critical design goal for an electrolyzer. For example, anode (303) and/or cathode (305) flow fields may be configured with thicknesses of 0.1 to 5.0 mm, 0.2 to 3.0 mm, 0.3 to 2 mm, 0.5 to 2 mm or 0.6 to 2 mm. Although they are depicted in FIG. 3 as having relatively equal thicknesses, flow fields (303) and (305) may be selected with the same or different thicknesses based on factors for optimizing cell process conditions, performance and manufacturing.

Figure 4:
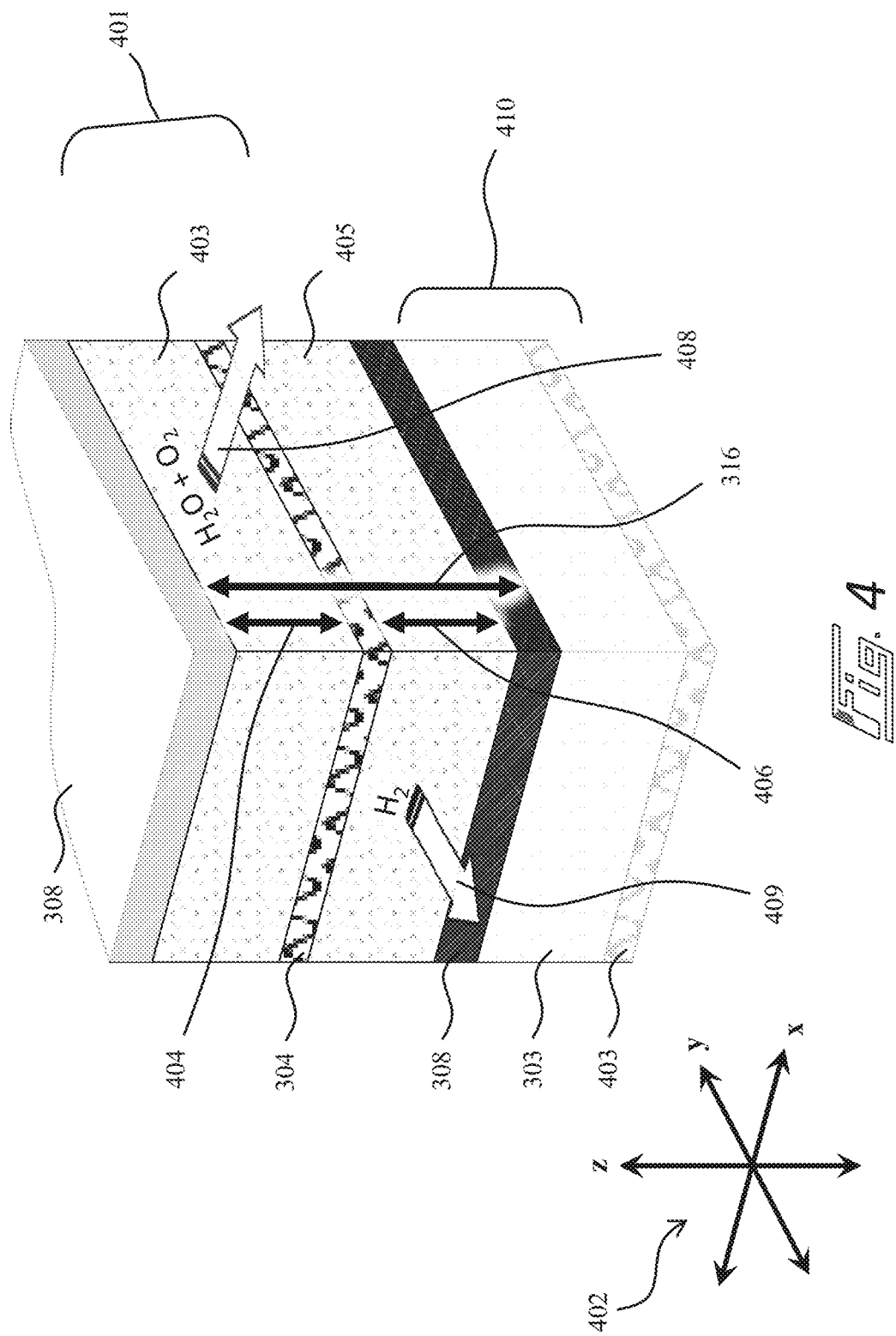
FIG. 4 shows an isometric view of electrolysis cell components of FIG. 3 illustrating exemplary cross flow orientation of the process fluids and the repeating of cell components along a z-axis to create a stack of cells.

FIG. 4 shows an isometric view (401) of an embodiment of the stack core (301) further illustrating exemplary cross flow orientation (408) and (409) of the process fluids and the repeating of cell components (410) along a z-axis to create a stack of cells. Here the bipolar plate (308) can be seen separating one cell of thickness (316) from an adjacent cell 410 (below). The bipolar plate (308) of another adjacent cell can be seen above cell (401). Water and oxygen (408) may flow along an x-axis in the combined anode electrode flow field (403) of thickness (404). Hydrogen (409) may flow along a y-axis in the combined cathode electrode flow field (405) of thickness (406). Assuming the cell is oriented as shown with a gravity vector downward and parallel to the z-axis, it may be advantageous to position the anode above the membrane as shown to allow buoyancy to assist in moving oxygen bubbles that form on the anode electrode into the water flowing through the anode flow field above the anode electrode.

Figure 5A:
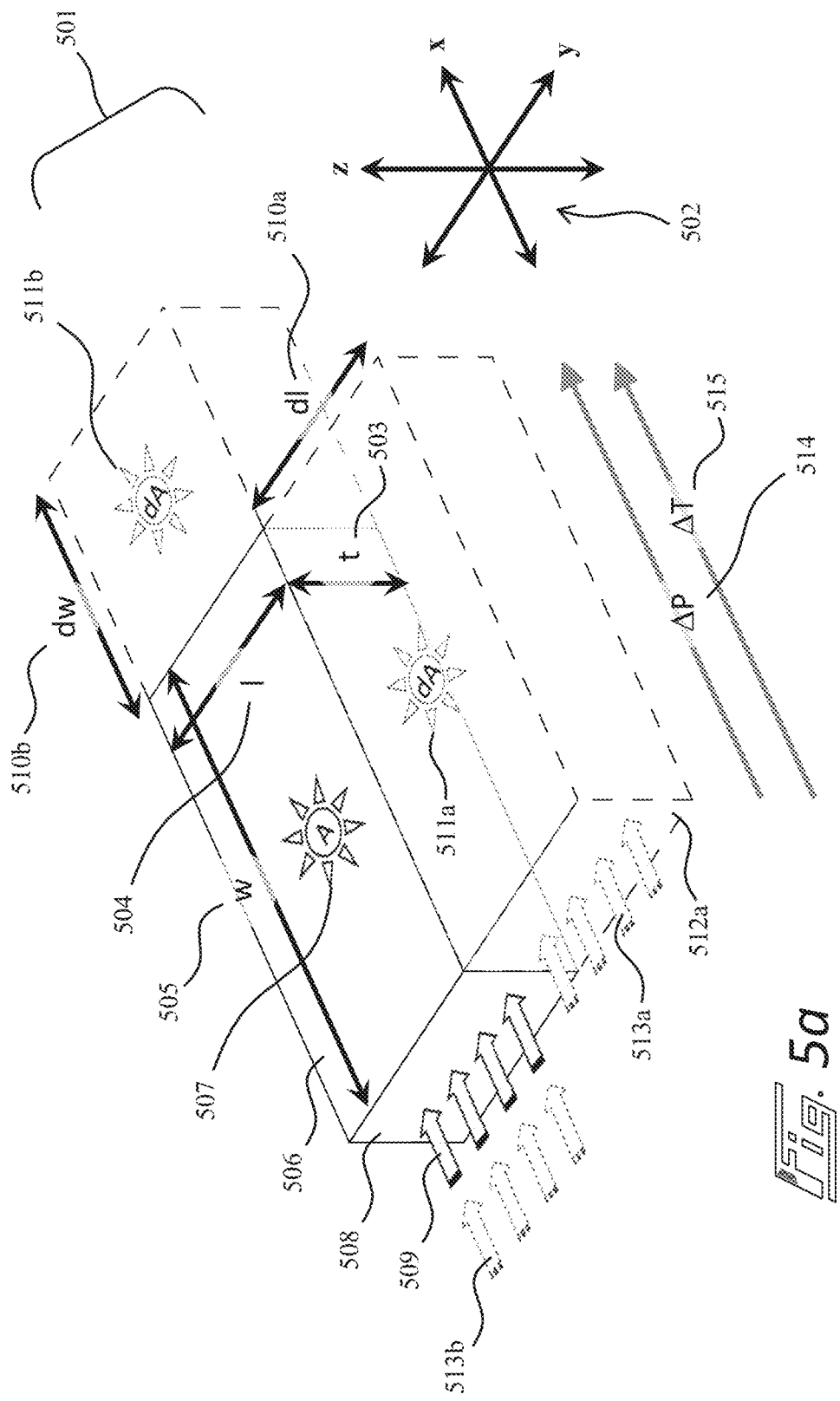
FIG. 5a shows an isometric view of an anode flow field component illustrating trade-offs present in scaling the cell active area.

FIG. 5a shows an isometric view (501) of an embodiment of an anode flow field component (506) illustrating the trade-offs that may be present in scaling the cell area. A base unit of an anode flow field may comprise a width "w" (505) along an x-axis, a length "l" (504) along a y-axis and a thickness "t" (503) along a z-axis. A width "w" (505) along an x-axis of base unit may be between 5 and 1000 cm, between 5 and 500 cm, between 5 and 100 cm, or between 10 and 50 cm. A length "l" (504) along a y-axis of base unit may be between 0.5 and 100 cm, between 1 and 50 cm, between 2 and 25 cm or between 2 and 10 cm. The area (507) of this base unit may be found by multiplying the width "w" (505) by the length "l" (504). A water flow area at a leading edge (508) of this base unit may be found by multiplying the thickness "t" (503) by the length "l" (504). A water flow for a fixed stoich and efficiency (509) into this water flow area (508) may be determined by the area (507). Achieving higher hydrogen production [kg/hr] at a fixed efficiency and water stoich may require added area "dA" (511a) and/or (511b). If "dA" (511b) is made by adding "dw" (510b) to "w" (505), added water (513b) may be required to flow into the fixed leading edge flow area (508). The added water flow may thereby increase water flow velocity through the cell and may result in increased pressure drop (514). If "dA" (511a) is made by adding "dl" (510a) to "l" (504), added water (513a) may be accompanied by a proportional increase in fixed leading edge flow area (512a). The added water may flow through the incremental and proportional flow area (512a) without increasing pressure drop (514). Therefore, scaling area along a y-axis may allow all process conditions—pressures, temperatures, and oxygen volume fraction—within the cell to remain constant. While total water flow rate may necessarily be proportional to hydrogen/oxygen production rate, other system parameters may be unchanged by scaling the cell along only a y-axis. This may greatly simplify the resulting electrolyzer systems made from cells and cell stacks designed in this way. For example, electrolyzer production plant specifications including pressure ratings, temperature ratings, and/or fluid composition ratings may be consistent for plants of different water flow and hydrogen/oxygen capacities. This, in turn may simplify engineering procurement and construction activities, expand available supplies of system components, and reduce overall hydrogen production costs.

Figure 5B:
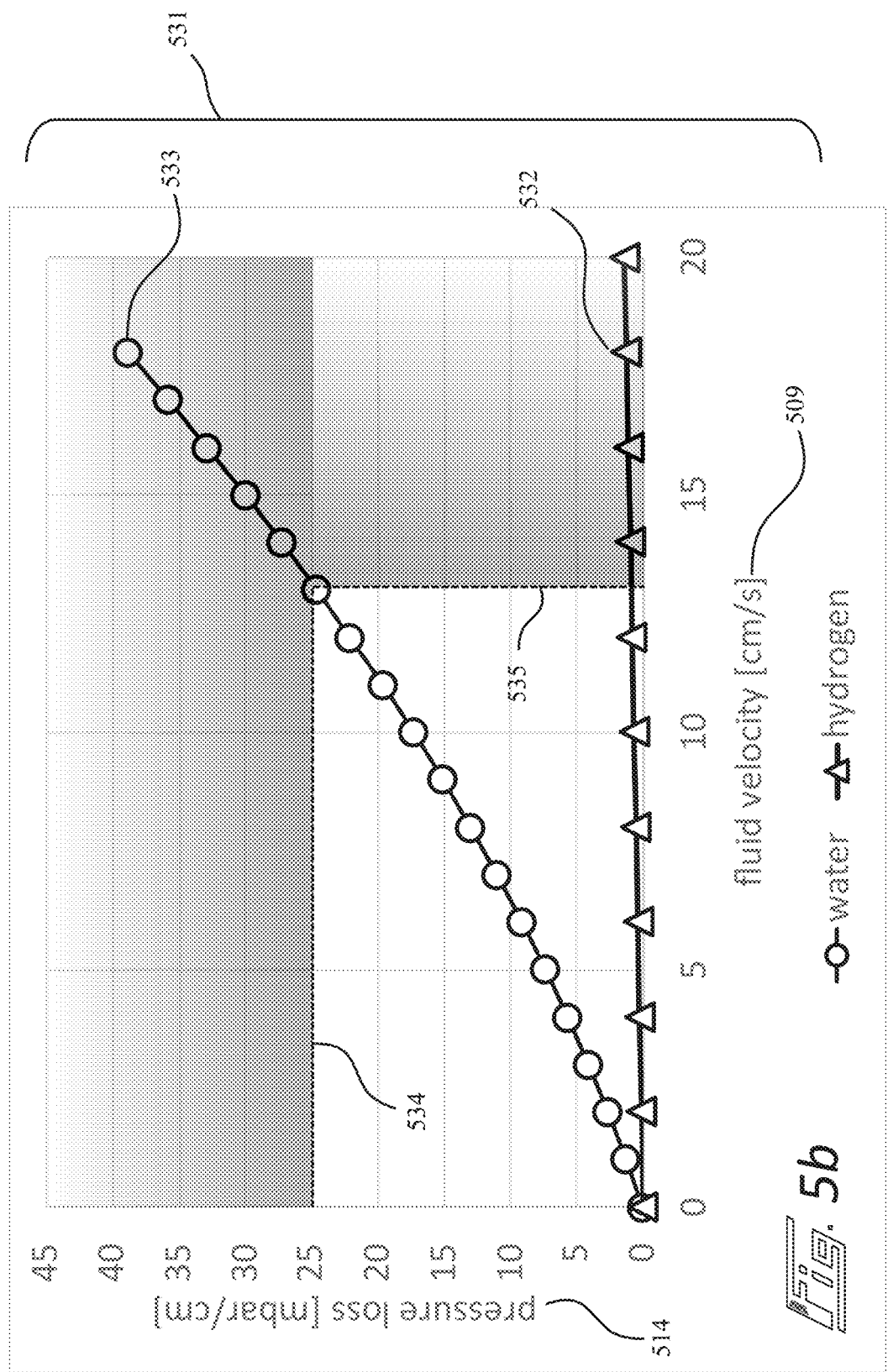
FIG. 5b shows mathematical model output for pressure loss through an exemplary flow field for water and hydrogen flow versus velocity and an illustrative pressure loss target threshold.

FIG. 5b shows mathematical model results (531) for pressure loss per unit flow length (514) [mbar/cm] as a function of flow velocity (509) [cm/s] for a hydrogen gas (532) and a liquid water (533) flowing through a typical porous media that may be used for an anode and/or cathode flow field. Also shown is an illustrative target pressure loss threshold (534) that may selected based on the overall electrolyzer stack and system design. Threshold (534) may represent an upper limit for water pressure loss and thereby define a target threshold for water velocity in the anode flow field (535). As evident from results (531), pressure loss per unit length for hydrogen may be several times less than for water at a given velocity. It may, therefore, be advantageous to prioritize cell scaling based on water velocity and flow length as cell area increases. For example, water pumps for delivering water to an electrolysis cell may have pressure capability of up to 10 bar. It may be advantageous to configure anode flow field (501) to enable water velocity (509) below 100 cm/s, below 50 cm/s, below 20 cm/s, below 10 cm/s or below 5 cm/s to stay within the capabilities of commonly available and/or economically useful system water pumps.

Figure 5C:
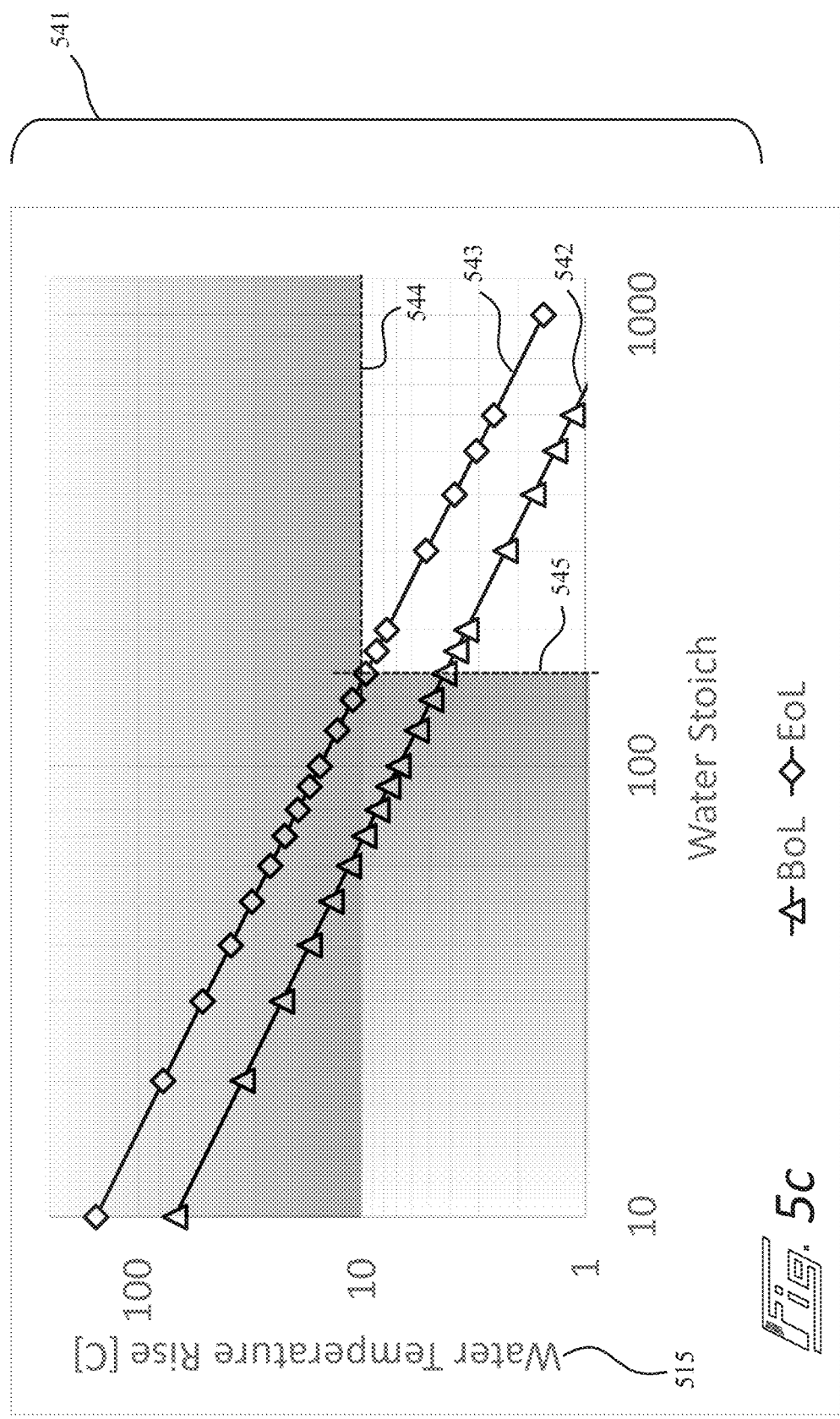
FIG. 5c shows mathematical model output for water temperature rise versus water stoich value for two exemplary cell operating voltage values and an illustrative water temperature rise threshold.

FIG. 5c shows mathematical model results (541) for water temperature rise (515) [° C.] as a function of delivered water stoich value. Heat released during electrolyzer operation may be a function of efficiency, which in turn, may be a function of operating cell voltage. Conserving energy for a cell may result in a formula for water temperature rise as specified in equation 5c-1 (below). Here V is the operating cell voltage, Vo is the thermo-neutral cell voltage [1.481V], HHV is the higher heating value of hydrogen [141.79 MJ/kg], $c_p$ is the specific heat capacity of water [4.182 kJ/kg° C.] and St is the water stoich delivered to the cell. Plots (542) and (543) show results of this model at two possible operating voltages representing exemplary values for beginning [BoL] and end [EoL] of life for an electrolysis cell. Also shown is an illustrative water temperature rise target threshold (544), above which an electrolysis cell may not operate stably or durably or above which an electrolysis system may not operate efficiently. The temperature rise threshold may be used with an EoL voltage limit to define a lower threshold for water stoich (545). It may be advantageous to select a water stoich to maintain a water temperature rise at end of life below 100 C, below 50 C, below 25 C, below 15 C or below 10 C to maintain stable and durable operation of the electrolysis cell.

$$\Delta T = \frac{\left(\frac{V}{V_0} - 1\right) \cdot HHV}{9 c_p \cdot St} \qquad \text{Equation 5c-1}$$

Figure 5D:
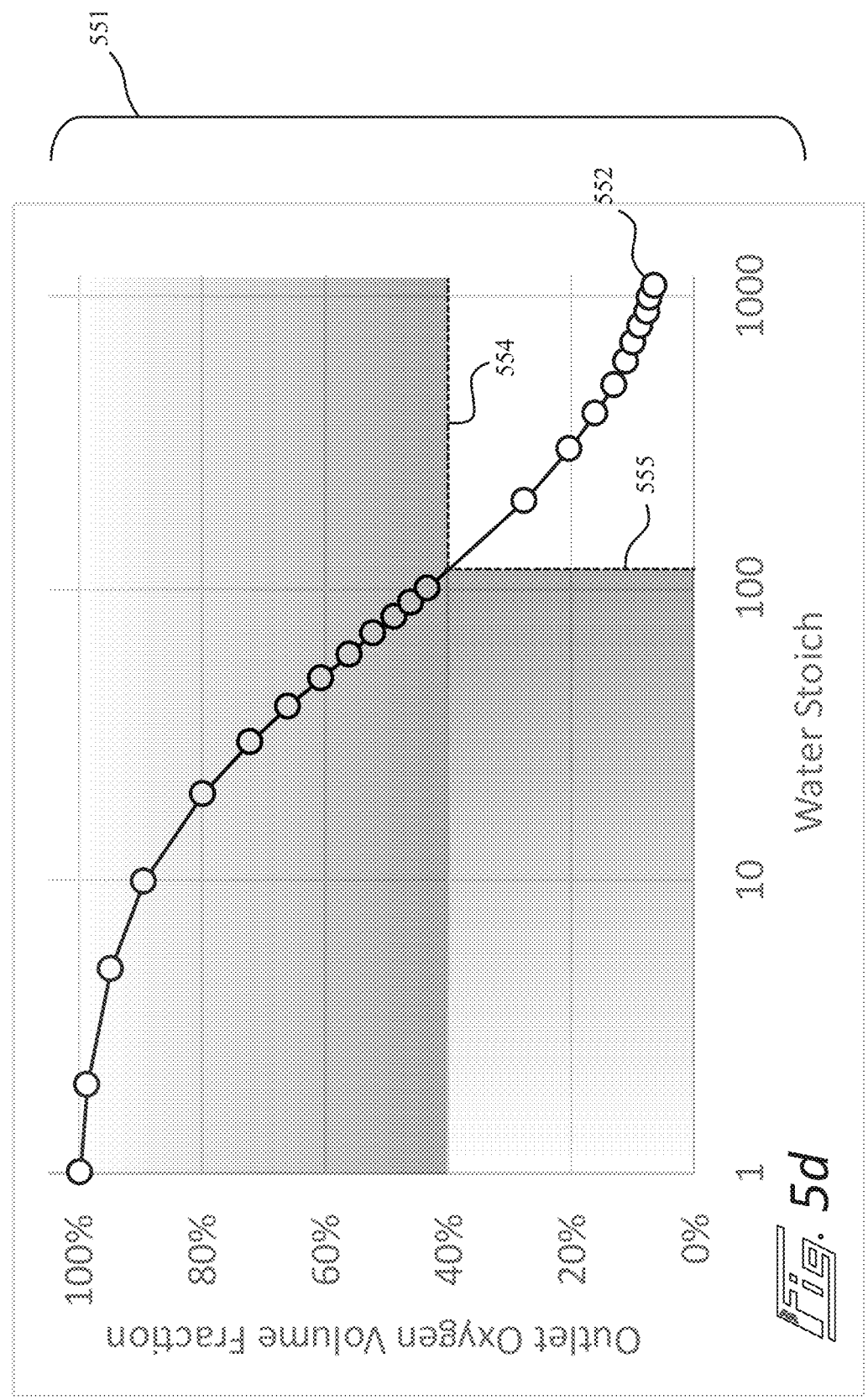
FIG. 5d shows mathematical model output for oxygen volume fraction at the outlet versus water stoich value for an exemplary cell operating pressure and an illustrative oxygen volume fraction threshold.

FIG. 5d shows mathematical model results (551) for oxygen volume fraction at the anode flow field outlet (552) as a function of delivered water stoich value. The process of electrolysis splits water into hydrogen, on the cathode side, and oxygen, on the anode side. As oxygen forms on the anode, it may mix as a gas with the delivered liquid water, resulting in a two-phase flow in the anode flow field. The volume fraction of oxygen at the anode outlet may be indicative of operating stability, performance and/or durability of the electrolysis cell and a target threshold for this parameter may be set by a designer. Conserving mass for a cell may result in a formula for oxygen outlet volume fraction as specified in equation 5d-1. Here $\rho_{O2}$ is the density of the oxygen gas at the anode outlet, $\rho_{H2O}$ is the density of the liquid water at the anode outlet and St is the water stoich delivered to the cell. Plot (552) shows the results of this model at 10 bara pressure for an anode of an electrolysis cell along with an illustrative oxygen volume fraction threshold (554), above which the cell may not operate stably or durably or above which an electrolysis system may not operate efficiently. The oxygen volume fraction threshold may be used to specify a lower threshold for water stoich (555). It may be advantageous to select a water stoich to maintain an oxygen volume fraction below 80%, below 60%, below 50%, below 40% or below 30% in order to maintain stable and durable operation of the electrolysis cell.

$$f_{O2} = \frac{1}{1 + \frac{9 \rho_{O2}}{8 \rho_{H2O}} \cdot (St - 1)} \qquad \text{Equation 5d-1}$$

Figure 5E:
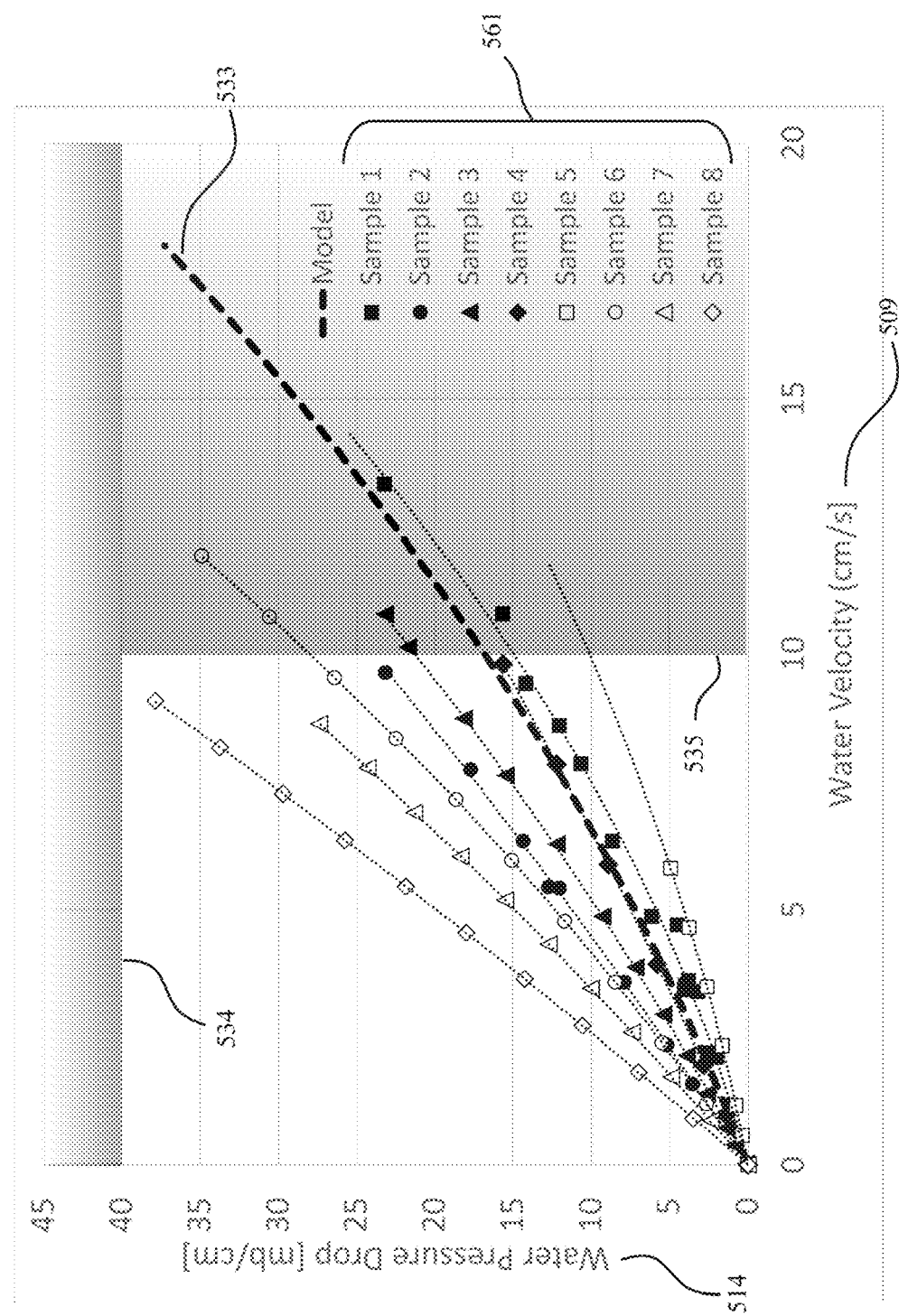
FIG. 5e shows test results for water flow resistance for a variety of flow field candidates, confirming the model results of FIG. 5b for water flow pressure loss and illustrating alternate illustrative pressure loss target thresholds.

FIG. 5e shows test results (561) for pressure loss per unit flow length (514) [mbar/cm] as a function of flow velocity (509) [cm/s] for liquid water flowing through a number of porous media candidates that may be used for an anode and/or cathode flow field. The mathematical model results from FIG. 5b (533) are repeated for reference along with an illustrative target pressure loss threshold (534) that may selected based on the overall electrolyzer stack and system design. Threshold (534) may represent an upper limit for water pressure loss and thereby define a target threshold for water velocity in the anode flow field (535) for these real potential flow field candidates (samples 1 through 8).

FIG. 6 shows a plan view of an embodiment of an exemplary cell (601) illustrating features including water delivery (603) and collection (604) windows and scalability of the cell active area through replication of water windows and associated unit anode flow field lengths (608) along a y-axis with a generally fixed dimension along an x-axis based on a desired roll web width "w" (609). The area, or effective diameter—a diameter of a circle whose area is equal to that of the window—of each water distribution window (603) may be selected to maintain water velocity along a z-axis through the window below a predetermined threshold at a water flow stoich selected to maintain one or more of a cell temperature-rise or an oxygen outlet volume fraction below a target threshold. For example, to minimize pressure loss, a water velocity along a z-axis through each window (603) may be maintained below 10 m/s, below 4 m/s, or below 2 m/s. The unit length (504) associated with each water distribution window may be selected to create a flow area (508) (depicted in FIG. 5a) for water at the leading edge of the anode flow field to keep a water velocity along an x-axis at the leading edge (509) below a predetermined threshold. The number of water distribution windows may then be selected to achieve the overall target hydrogen production rate for the cell while maintaining water flow pressure loss (514) (depicted in FIG. 5a), water temperature-rise (515) (depicted in FIG. 5a) and oxygen outlet volume fraction below a target threshold. The cell (601) may comprise an active area (611) and a border area (610). The border area may define several fluid flow windows for water delivery (603), water and oxygen collection (604) and hydrogen collection (606). As described, the number of water windows (603) may scale with active area while the number of hydrogen windows (606) may not, resulting in a cell with a greater number of water windows than hydrogen windows for any single configuration of a cell. Water delivery and/or collection windows may be round, rectangular or another shape conducive to low cost, high-speed manufacturing of cell (601). For window shapes other than circular, an "effective diameter" may be found by determining the diameter of a round hole of equivalent area to the window. Each water window (603) may be associated with a unit length along a y-axis of an anode flow field (504). The effective diameter of the window (603) may be configured to be from 1% to 110% of the unit length (504), from 5% to 75% of the unit length, from 10% to 50% of the unit length, or from 25% to 50% of the unit length. Water flow may proceed from delivery window (603) across an associated section of active area (611) to collection window (604) along path (605). In operating the cell, hydrogen may be produced on the cathode side along path (605), which may flow along streamlines (607) to one or more hydrogen collection windows (606). These collection windows (606) may be at one or both ends of the cell and may consist of one or more windows (606) at each end. As additional hydrogen/oxygen capacity is required, incremental water windows and associated flow field lengths (608) may be added along a y-axis to increase production of hydrogen/oxygen while maintaining constant operating conditions—pressures, temperatures, and fluid composition—within the cell. The total number of windows selected for a particular cell (601) may determine the overall active area of the cell and may number from 1 to 100, from 2 to 50, from 2 to 25 or from 2 to 20. Although the increased length of the cell along a y-axis may result in increased flow length for streamlines (607) for the collection of the hydrogen, the flow resistance to hydrogen gas in the cathode flow field may be much less than for liquid water in the anode flow field (as shown in FIG. 5b), thereby resulting in a negligible impact to conditions and performance of the cell, stack, or system. Therefore, no additional hydrogen windows may be required as the cell is scaled in size. The cell may also include features (612) at one or more locations along the border area (610) for facilitating instrument connections for measuring and/or controlling cell performance. A scalable electrolysis cell may comprise a membrane, an anode electrode, a cathode electrode, an anode flow field, a cathode flow field, and a bipolar plate assembly, wherein a bipolar plate assembly may define one or more water delivery windows positioned along one edge of the anode flow field aligned with a y-axis, and each water delivery window may be associated with a length along a y-axis of an anode flow field, and the number, effective diameter and/or associated length of an anode flow field of the water delivery windows may be selected to maintain a water flow resistance or a water temperature rise or a cell outlet oxygen volume fraction below a target threshold for the electrolyzer cell. The combined number of water delivery and oxygen collection windows may be equal to or greater than the number of hydrogen collection windows for said electrolysis cell. The effective diameter of each water delivery window may be between 5% and 110% of the associated length along a y-axis of the anode flow field for said electrolysis cell. The dimension of the anode flow field along an x-axis may be the same for each water delivery window of said electrolysis cell. The length along a y-axis associated with each water delivery window may be selected based on a thickness of the anode flow field to keep the average velocity of water at the leading edge of the anode flow field below 100 cm/s for said electrolysis cell. The water stoich may be selected to maintain one or more of a cell temperature-rise at end of life below 50° C. or an oxygen volume fraction at the trailing edge of the anode flow field below 80% for said electrolysis cell. The hydrogen flow velocity vectors in the cathode flow field may be generally parallel to a y-axis for said electrolysis cell. As discussed herein, in some embodiments, a scalable electrolyzer stack may comprise a multitude of scalable electrolysis cells aligned along a z-axis in a stacked configuration wherein each cell may comprise a membrane, an anode electrode, a cathode electrode, an anode flow field, a cathode flow field, and a bipolar plate assembly, and the stacked bipolar plate assemblies may define one or more water delivery plenums positioned along one edge of the anode flow fields, and each water delivery plenum may be sized to maintain a water velocity through the plenum along a z-axis below a target threshold, and each water delivery plenum may be associated with a length along a y-axis of the anode flow fields, and the number and/or sizes of the water delivery plenums may be selected to maintain one of a water flow resistance or a water temperature rise or a cell outlet oxygen volume fraction below a target threshold for the electrolyzer stack. The combined number of water delivery and oxygen collection plenums may be equal to or greater than the number of hydrogen collection plenums. The stack may further comprise end units at either end of the cell stack, a scalable, structural wrap compression system and at least one fluid manifold included in one end unit, wherein the manifold may facilitate water delivery to the stack along a y-axis and through a freely accessible face of the compression system. The fluid manifold may be located at the top of the stack relative to the gravity vector along a z-axis. The stack may further comprise a drain and/or purge manifold located at the bottom of the stack relative to the gravity vector along a z-axis. The size of the water flow port and manifold connecting the individual cell stack plenums may be selected to provide flow distribution to individual plenums with a variation of less than plus or minus 25%.

Figure 7A:
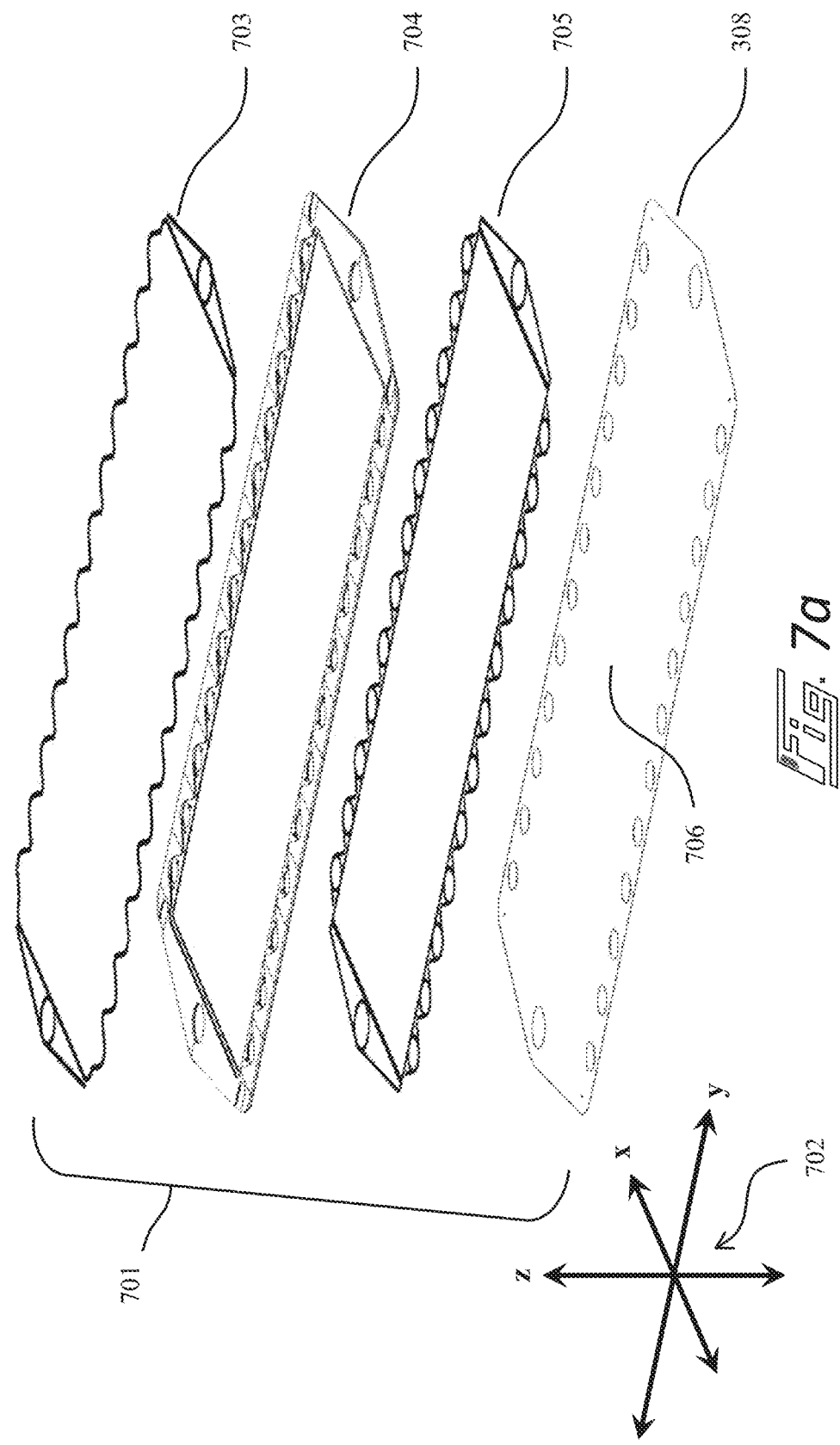
FIG. 7a shows an exploded view of exemplary components of a bipolar plate assembly designed to enable high-speed manufacturing.

FIG. 7a shows an exploded view (701) of an embodiment of exemplary components of a bipolar plate assembly (BPA) designed to enable high-speed manufacturing. The BPA (701) comprises a bipolar plate (308), a hydrogen seal (705), a fluid distribution frame (704) and a water seal (703). Bipolar plate (308) may be constructed of a base material appropriate to the environment of the electrolysis cell. For example, if the cell is an acidic, proton-conducting type, (308) may comprise alloys of titanium, stainless steel, Inconel, nickel-chromium, or combinations of these. Such bipolar plates for acidic cells may also be covered with an appropriate corrosion-resistance coating such as platinum, gold, tin, carbon, titanium nitride, or combinations of these. If the cell is an alkaline, hydroxide-conducting type, (308) may comprise alloys of iron, steel, stainless steel, nickel, nickel-chromium, Inconel, Fecralloy, or combinations of these. Such bipolar plates for alkaline cells may also be covered with an appropriate coating such as platinum, gold, tin, nickel, carbon, or combinations of these. Hydrogen seal (705) may be configured to be applied to bipolar plate (308) using a high-speed manufacturing process. Appropriately fast processes may include screen printing, rotary screen printing, stencil printing, robotic dispensing, compression molding, injection molding, stamp printing, or by die cutting and laminating a hot-melt adhesive film made from polyester, urethane, nylon, ethylene or other chemically and mechanically suitable polymer compound. The thickness of seal (705) may be produced in one or multiple application steps. It may be advantageous to apply gasket (705) in an uncured state to facilitate bonding between frame (704) and plate (308). It may also be advantageous for seal (705) to be curable by a high-speed curing method such as ultraviolet light curing, microwave curing, thermal curing, solvent curing, a two-part epoxy curing method or humidity curing, or a combination of these methods. If seal (705) is made in multiple application steps, curing may or may not be required between said steps. Seal (705) may comprise a compatible elastomeric or polymeric material such as silicone, polyurethane, polyolefin, urethane, acrylate, vinyl, butyl, EPDM, Nitrile, SBR, SEBS, SIBS or EVA. Seal (705) may be constructed with a reinforcement material embedded in the seal such as a wire mesh, open cell foam, expanded metal, or sintered metal frit. This reinforcement may provide functional advantages in sealing high pressure fluids by strengthening the polymer/elastomer seal material. It may also provide assembly advantages in setting a precise thickness for the BPA by providing a hard stop in assembling, compressing and curing the plate (308)/seal (705)/frame (704). The hardness or durometer of the cured seal material may be of a relatively soft or medium durometer. For example, it may be advantageous for the seal (705) to exhibit a relatively compressible modulus of elasticity compared to bipolar plate (308) and/or frame (704) to provide compliance in the border area (610) of the cell when the cell stack is compressed. For example, the cured hydrogen seal (705) may be configured with a range of elastic modulus between 0.01 MPa and 100 Mpa, between 0.1 and 50 Mpa, between 1.0 and 25 Mpa or between 5 and 20 Mpa. Alternately, geometry of seal (705) may be adjusted to achieve the desired compliance. The thickness of seal (705) may be increased or decreased. For example, thickness of seal (705) may range from 10 to 500, from 20 to 250, from 25 to 250 or from 25 to 100 micrometers. The width of seal (705) may also be increased or decreased. For example, width of seal (705) may range from 0.5 to 15, from 1 to 10, or from 2 to 5 millimeters. The material and properties selected for seal (705) may be different for acidic or alkaline cell designs. The fluid distribution frame (704) may be constructed of a relatively rigid plastic material. For example, it may be made by injection molding, compression molding, extruding, casting or slip-casting of polycarbonate, urethane, polysulfone, polyamide, polyamide-imide, acrylonitrile-butadiene-styrene, high-density polyethylene, polyphenylene sulfide, polyetherimide, silicone, polyurethane, polyolefin, urethane, acrylic, polyvinyl chloride, polystyrene, polypropylene, polyetheretherketone, polyimide, or acrylate or another polymer or elastomer of suitable mechanical, electrical, chemical, and thermal properties. The frame (704) may be made from a continuous film of material and later cut to shape by die, knife-die, rotary-die, laser or waterjet cutting. The frame (704) may be configured with a range of elastic modulus between 1.0 MPa and 100,000 MPa, between 10 and 50,000 MPa, between 100 and 10,000 MPa or between 1,000 and 10,000 MPa. It may be advantageous for the frame (704) to be made from a visible, ultraviolet-light transparent, or microwave transparent material to facilitate ultraviolet or microwave curing of the hydrogen seal (705) after bonding with the bipolar plate 308 using the hydrogen seal as an adhesive. The frame (704) may comprise specific geometric features for locating the flow fields, electrodes, and membrane of the cell. The frame (704) may also comprise the geometry required to uniformly distribute and collect process fluids to and from the cell as well as features to engage and compress an internal seal between the anode and cathode flow fields of the cell. The frame (704) may also comprise features (612) (depicted in FIG. 6) intended to facilitate cell voltage measurements after being assembled into a cell stack. Water seal (703) may be configured to be applied to fluid distribution frame (704) using a high-speed manufacturing process. Appropriately fast processes may include screen printing, rotary screen printing, stencil printing, robotic dispensing, compression molding, injection molding, stamp printing, or die cutting and lamination. The thickness of seal (703) may be produced in one or multiple application steps. It may also be advantageous for seal (703) to be curable by a high-speed curing method such as ultraviolet light curing, microwave curing, thermal curing, solvent curing, a two-part epoxy curing method, or humidity curing, or a combination of these methods. If seal (703) is made in multiple application steps, curing may or may not be required between said steps. Seal (703) may comprise an elastomeric or polymeric material such as silicone, polyurethane, polyolefin, urethane, acrylate, vinyl, butyl, EPDM, Nitrile, SBR, SEBS, SIBS, or EVA. The hardness or durometer of the cured seal material may be of a relatively soft or medium durometer. For example, it may be advantageous for the seal (703) to exhibit a relatively compressible modulus of elasticity compared to bipolar plate (308) and/or frame (704) to provide compliance in the border area (610) of the cell when the cell stack is compressed. For example, the cured water seal (703) may be configured with a range of elastic modulus between 0.01 MPa and 100 MPa, between 0.1 and 50 MPa, between 1.0 and 25 MPa or between 5 and 20 MPa. Alternately, geometry of seal (703) may be adjusted to achieve the desired compliance. The thickness of seal (703) may be increased or decreased. For example, thickness of seal (703) may range from 10 to 500, from 20 to 250, from 25 to 250 or from 25 to 100 micrometers. The width of seal (703) may also be increased or decreased. For example, width of seal (703) may range from 0.5 to 15, from 1 to 10, or from 2 to 5 millimeters. The material and properties selected for seal (703) may be different for acidic or alkaline cell designs. Seal (703) may also be incorporated into the geometry of frame (704) by appropriate selection of material and geometry, thereby obviating the need to apply seal (703) in a separate step. For example, frame (704) may be configured with the geometry of seal (703) and manufactured from a material of appropriate elastic modulus to provide water sealing functionality in a single component. Alternately, frame (704) may be manufactured in a two-step process, whereby seal (703) may be injection or compression molded directly onto a previously injection molded rigid plastic base. In another example, seal (703) may be applied to fluid distribution frame (704) by screen printing onto one side of a plastic film in a roll-to-roll process. Although bipolar plate (308) is shown as a flat plate, it may be formed with features in the central region (706) intended to function as a flow field for the cathode, anode or both sides of the cell. These features may comprise channels, dimples or other geometric shapes protruding along a z-axis which give three-dimensional form to bipolar plate (308) and create structural support for flow fields, electrodes and/or the membrane while also creating flow guiding pathways for the hydrogen, water/oxygen, or both fluids.

Figure 7B:
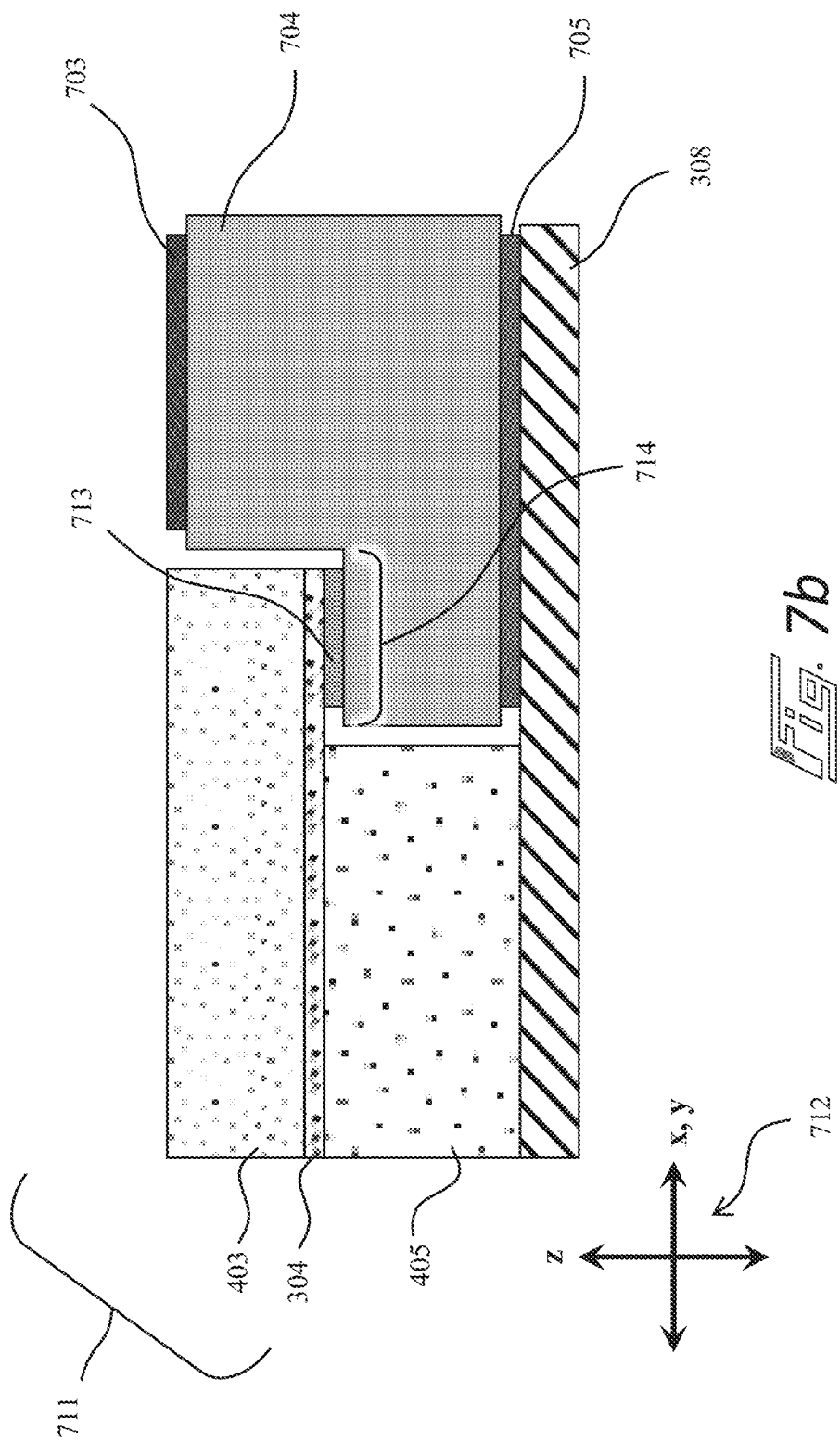
FIG. 7b shows a cross-section view of a bipolar plate assembly of FIG. 7a illustrating locating and internal seal features for the membrane, electrode and flow field components, which when added to the bipolar plate assembly comprise a scalable electrolysis cell according to a preferred embodiment of the present invention.

FIG. 7b shows a cross-section view (711) of an embodiment of bipolar plate assembly (701) of FIG. 7a illustrating location and internal seal features for the membrane (304), electrode/and flow field components (403) and (405), which when added to the bipolar plate assembly comprise a scalable electrolysis cell (601) according to a preferred embodiment of the present invention. Cross-section of frame (704) may be arranged to have a step (714) onto which an internal seal (713) may be engaged to separate anode electrode flow field (403) from cathode electrode flow field (405). The step (714) may be configured to surround cathode electrode flow field (405) and completely support the outer edge of anode electrode flow field (403) and membrane (304). In this way, anode flow field (403) may be larger than cathode flow field (405) in an x-y plane (712). Upon compression, the electrode flow fields (403) and (405) may be configured to deform, allowing internal seal (713) to compress between membrane (304) and step (714) of frame (704). It may be advantageous for cathode electrode flow field (405) to be elastic to remain in contact with membrane (304) over a range of thermal expansion, internal gas pressures, and component thickness variation expected in manufacturing cells (601). Similarly, the thicknesses, widths, and elastic moduli of seals (703), (705), and (713) may be adjusted to achieve the necessary compliance to provide sealing function over a range of thermal expansion, internal gas pressures and component thickness variation expected in manufacturing and operating the cells (601).

Figure 7C:
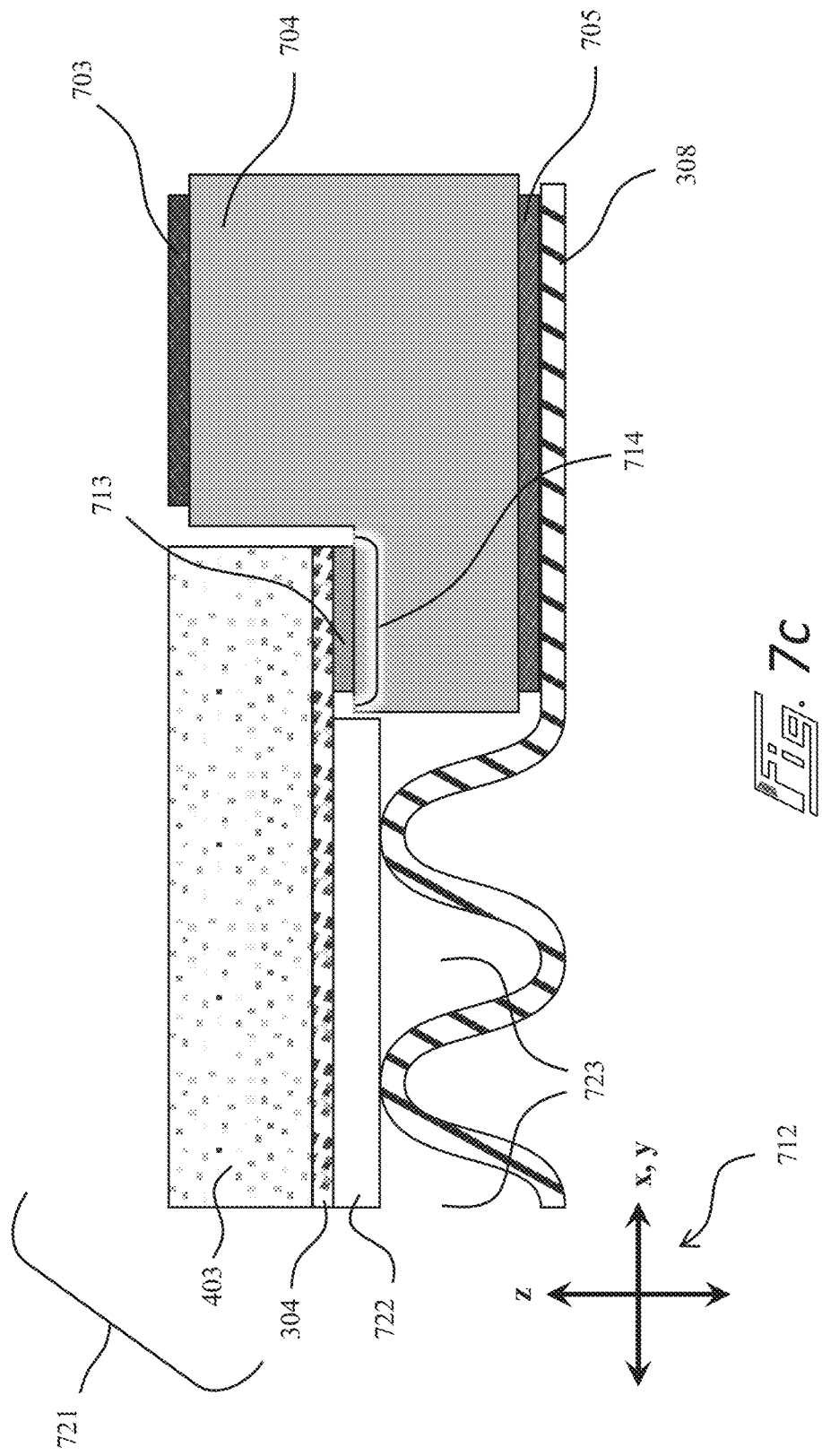
FIG. 7c shows the cross-section view of FIG. 7b where the cathode flow field is formed as a three-dimensional structure integral to the bipolar plate, rather than as a separate component.

FIG. 7c shows the cross-section view of and embodiment of FIG. 7b illustrating an alternate geometry for bipolar plate (308) whereby cathode electrode flow field (405) may be replaced with features (723) formed directly into plate (308). These features (723) may comprise channels, dimples, or other geometric shapes protruding along a z-axis which give three-dimensional form to bipolar plate (308) and create structural support for flow fields, electrodes, and/or the membrane while also creating flow guiding pathways for the hydrogen, water/oxygen, or both fluids. These features may be created by mechanical stamping, machining, hydroforming, or other appropriate manufacturing methods. The anode flow field and/or the cathode flow field may be selected and formed from one or more of a foam, a felt, a woven screen, an expanded metal, or a sintered metal frit. The anode flow field and/or the cathode flow field may be formed into the bipolar plate by a stamping or hydroforming process.

Figure 7D:
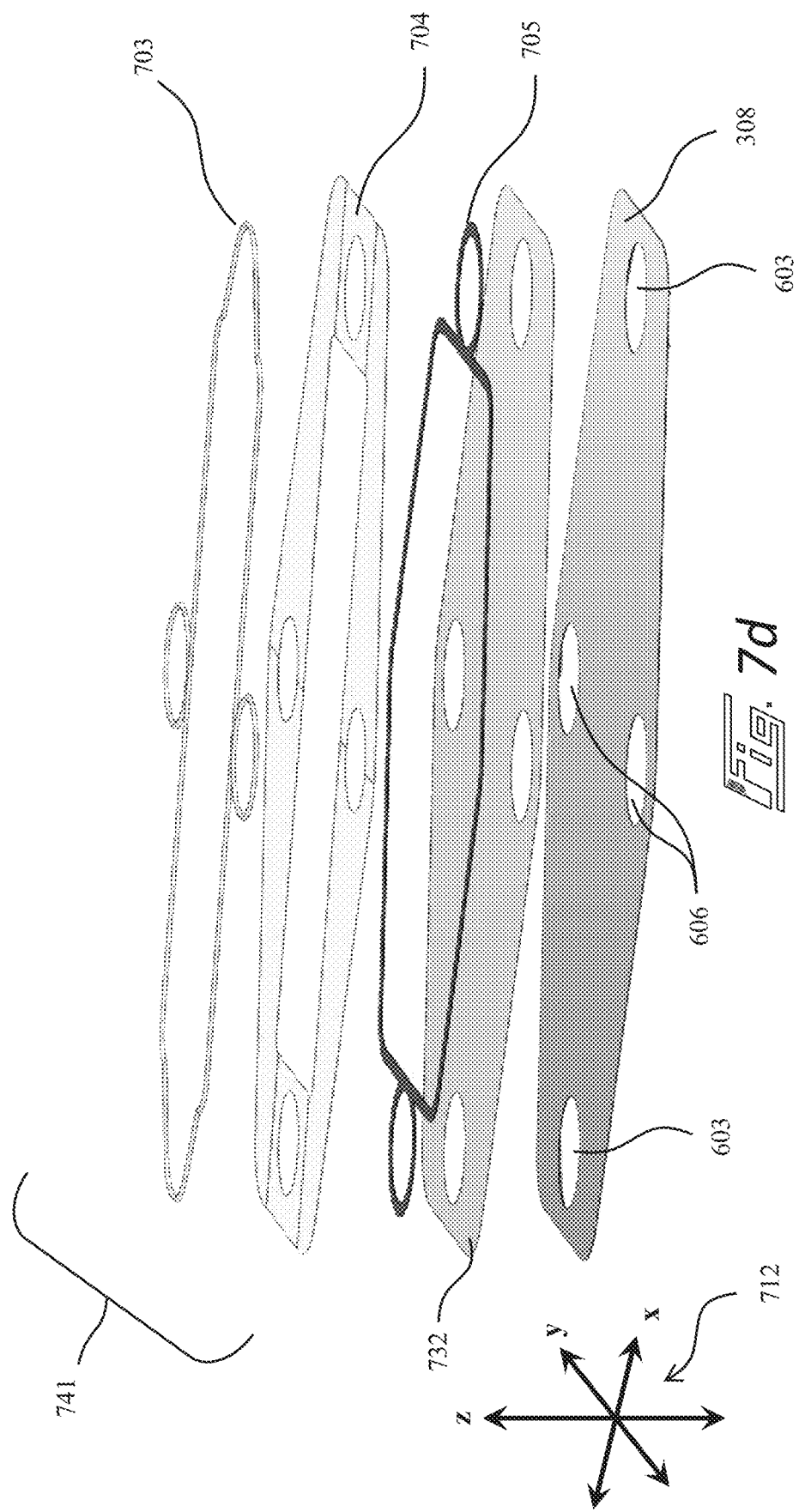
FIG. 7d shows an isometric view of an alternate embodiment of a bipolar plate assembly.

FIG. 7d shows an isometric view of an alternate embodiment wherein the bipolar plate assembly comprises a porous sheet (732) into which the hydrogen seal (705) may be embedded using a screen printing, liquid dispensing, injection, or compression molding or other suitable process. In this configuration, porous sheet (732) may provide the functionality of cathode electrode flow field (405) from FIG. 7b, providing both mechanical reinforcement for hydrogen seal (705) and open space for hydrogen gas flow from the active area of the cell to the hydrogen gas windows (606). Porous sheet (732) may also provide precise thickness control for the bipolar plate assembly during pressing and curing of hydrogen seal (705) and frame (704).

FIG. 7e illustrates an embodiment of a cross-section view of FIG. 7d with cathode electrode (722), membrane (304), anode electrode flow field (403) and internal seal (714) added. After assembly and curing, hydrogen seal (705) may be fully embedded within the porous structure of porous sheet (732) forming a gas tight seal for hydrogen gas in the cathode while also physically adhering bipolar plate (308) to porous sheet (732) and frame (704). The porous sheet (732) may be selected from one or more of a foam, a felt, a woven screen, an expanded metal, or a sintered metal frit. The porous sheet may comprise alloys of iron, steel, stainless steel, nickel, nickel-chromium, Inconel, Fecralloy, or combinations of these and may also be covered with an appropriate coating such as platinum, gold, tin, nickel, carbon, or combinations of these.

FIG. 8 shows a plan view of an embodiment of the bipolar plate assembly (701) of FIG. 7a looking downward along a z-axis (802) and illustrating the projected alignment of the water (703) and hydrogen (705) seals. To minimize local bending of the fluid distribution frame, and potential loss of sealing, it may be important for the water seal (703) to be uniformly supported by frame (704) and hydrogen seal (705). Any gaps in full material thickness for the frame (704) and/or the hydrogen seal (705) may result in bending of the frame when the water seal (703) is compressed by an adjacent cell in the cell stack. Excessive bending may, in turn, result in inadequate compression of water seal (703) and subsequent leakage. For example, a gap of greater than twice the thickness of the frame in a section may result in excessive bending. Uniform support may be determined by evaluating a percentage of the total projected area of the water seal (703) that is unsupported by full-thickness sections of the frame (704) and hydrogen seal (705). To provide proper support, the percentage unsupported projected area may be less than 10%, less than 20%, less than 30% or less than 50%. Also shown is step (714) of frame (704), which fully surrounds and borders the open active area (611) of cell (601). The step (714) may be configured with a width to allow the internal seal (713) to fall outside the cathode flow field (405) while providing a pocket into which anode flow field (403) may be positioned. Also shown is reference dimension "w" (609) representing the desired roll web width as described previously in accordance with the scalability of cell (601). Detail view (803) is described in FIG. 9.

FIG. 9 shows an isometric view of an embodiment of a typical water distribution window (803) illustrating distribution (905) and sealing (713) features included in frame (704) to provide uniform water flow (908) to the associated length of the anode electrode flow field (403). A section of one water delivery window (603) is shown with water velocity vectors (907) entering the window (603) generally along a z-axis, turning and spreading into the x-y plane and heading toward the leading edge of the anode flow field (403). Delivery window (603) may be configured with one or more distribution features (905) to facilitate spreading of the flow (907) in the x-y plane to enter the leading edge of (403) in a uniform fashion along a y-axis as indicated by vectors (908). Distribution features (905) may be integrated into the frame (704) or may be formed as part of the water seal (703) (depicted in FIGS. 7a-e and 8) geometry. The frame may also be configured with mechanical support features (906) to ensure adequate compressive load is transferred to the hydrogen seal (705) between the frame (704) and bipolar plate (308) as shown in FIG. 7b. Mechanical support features (906) may also be formed as part of water seal (703) geometry. Cathode electrode flow field (405) is shown positioned inside the step (714) of frame (704) with membrane (304) separating cathode (405) and anode (403) flow fields. Internal seal (713) is shown between membrane (304) and step (714) of frame (704) with the overlap of anode electrode flow field (403) visible. In this configuration the anode electrode flow field (403) may be larger than the cathode electrode flow field to overlap the sealing step (714) all around the active area. The step (714) may act to ensure the cathode (405) and anode (403) electrode flow fields remain properly located and to ensure that the internal seal (713) is properly located on step (714). The assurances of these features may be essential to reliable, high-speed assembly of the cells and stack.

FIG. 10 shows a plan view of an embodiment of the bipolar plate assembly (701) of FIG. 7a looking upward along a z-axis (1002) and illustrating the projected alignment of the water (703) and hydrogen (705) seals. The view from below shows more clearly how elements of hydrogen seal (705) have been included for the purpose of supporting water seal (703). For example, seal (705) may comprise features such as those shown at (1004), to match the corresponding geometry of the water seal (703). Seal (705) may also comprise features such as those shown at (1005), to support step (714) (depicted in FIGS. 7b, 7c, 7e, 8, and 9) along the hydrogen trailing edges of the cathode electrode flow field. To allow hydrogen gas to exit into the collection windows (606), bridge features (1105) and (1106) may be included in frame (705) as detailed in view (1003) of FIG. 11.

FIG. 11 shows an isometric view of an embodiment of a typical hydrogen collection window (606) illustrating the bridge (1105) and (1106) and internal sealing (713) features included in the frame to uniformly collect hydrogen (1108) produced by the cell and deliver it (1107) to one or more collection windows (606). A section of one hydrogen collection window (606) is shown with hydrogen velocity vectors (1107) exiting the window (606) generally along a z-axis, turning from the x-y plane having come from the trailing edge of the cathode electrode flow field (405). Collection window (606) may be configured with one or more bridge features (1105) and (1106) to facilitate uniform collection of the flow (1108) from the x-y plane as well as to provide mechanical support for both the internal seal (713) and the water seal (705). Bridge features (1105, 1106) may be integrated into the frame (704) or be formed as part of the hydrogen seal (705) (depicted in FIG. 7a-e, 8, 10) geometry. As part of the hydrogen seal (705) geometry, the bridge features may be created using a porous reinforcement material such as wire mesh, open cell foam, expended metal, or sintered metal frit. This porous reinforcement may be formed as an extension of all or part of the cathode electrode flow field (405) as illustrated in FIGS. 7d and 7e, porous sheet (732). Cathode electrode flow field (405) is shown positioned inside the step (714) of frame (704) with membrane (304) separating cathode (405) and anode (403) flow fields. Internal seal (713) is shown between membrane (304) and step (714) of frame (704) with the overlap of anode flow field (403) visible. The bipolar plate assembly may comprise a fluid distribution frame configured to locate and contain at least one of a cathode flow field, a cathode electrode, a membrane, an internal seal, an anode electrode, or an anode flow field between two adjacent bipolar plates. The fluid distribution frame may be configured to allow spreading of water flow in an x-y plane from one or more water delivery windows to a leading-edge of the anode flow field to provide a leading-edge velocity distribution within plus or minus 50% of the average velocity for the flow field. The fluid distribution frame may be configured to collect water and oxygen flow from a trailing-edge of the anode flow field and impose no greater than plus or minus 50% variation in trailing-edge velocity distribution. A hydrogen seal may be located between the frame and a bipolar plate adjacent to the cathode flow field while a water seal may be located between the frame and a bipolar plate adjacent to the anode flow field. The fluid distribution frame may comprise a visible or ultraviolet light transparent material or microwave transparent material. The bipolar plate assembly may be configured to collect a hydrogen flow from one or more trailing edges of a cathode flow field and deliver said flow to one or more hydrogen collection windows. The fluid distribution frame may be configured to engage an internal seal between an anode and a cathode flow field, the seal being applied to at least one of a membrane, a catalyst coated membrane, an electrode, a sub-gasket border of a membrane-electrode assembly or the frame itself. The fluid distribution frame, water seal and hydrogen seal may be arranged in a projected view along a z-axis so that there is less than 50% unsupported seal area. The anode flow field may be larger than the cathode flow field within the fluid distribution frame and the anode flow field may facilitate application of compressive load to the internal seal. The bipolar plate assembly may comprise a bipolar plate material selected from one or more of stainless steel, titanium, nickel, carbon, chromium, iron, or alloys thereof. The bipolar plate assembly may comprise a bipolar plate which may be coated with one or more of platinum, gold, tin, palladium, rhodium, titanium nitride, nickel, carbon, or chromium. The electrolysis cell using the described fluid distribution frame may have a compressed cell pitch less than or equal to 2.5 mm.

Figure 12:
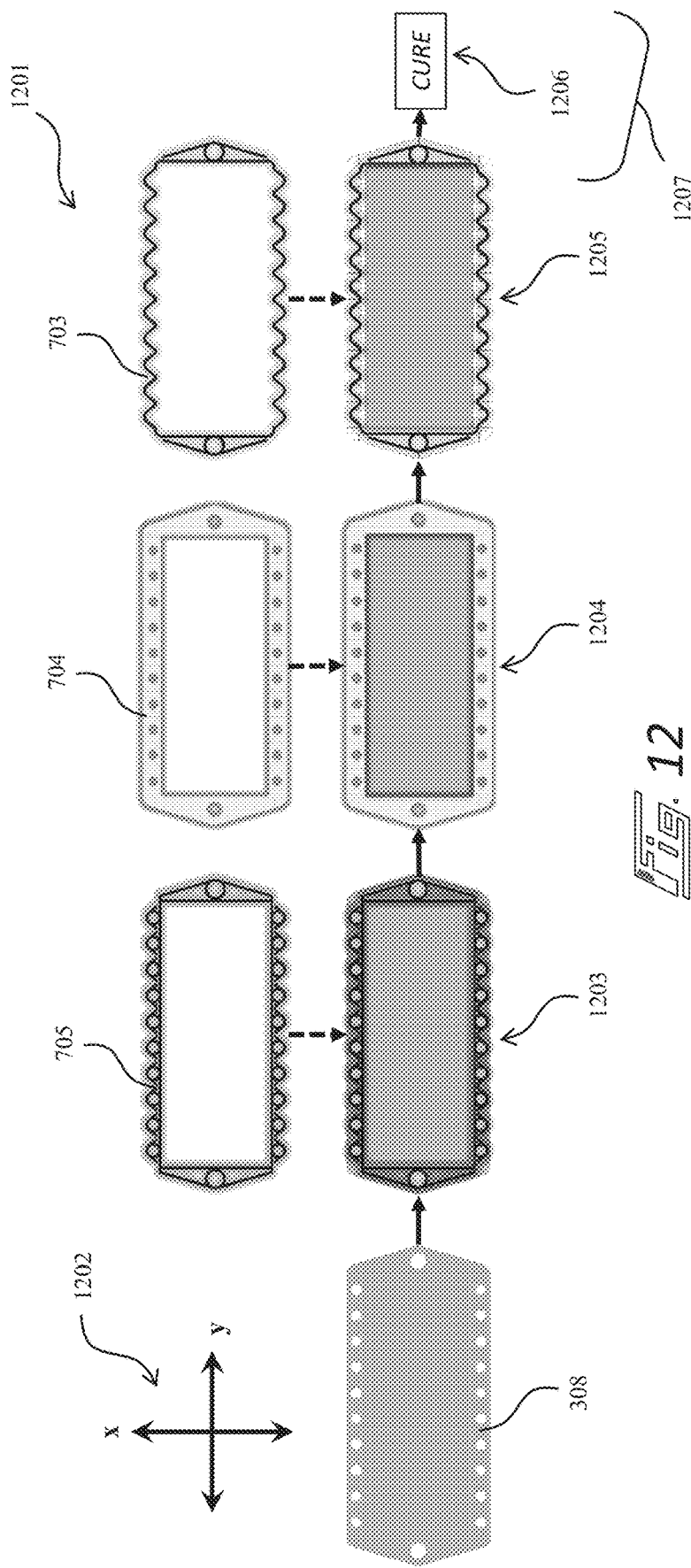
FIG. 12 shows the basic steps that may be included in a high-speed manufacturing process for a bipolar plate assembly.

FIG. 12 shows an embodiment of the basic steps in a high-speed manufacturing process (1201) for the bipolar plate assembly. Bipolar plate (308) may be loaded into the assembly line. Hydrogen seal (705) may then be applied in an uncured state (1203) to bipolar plate (308) using an appropriate high-speed application method such as screen printing, rotary screen printing, stencil printing, or robotic dispensing. Fluid distribution frame (704) may then be positioned relative to bipolar plate (308) and pressed (1204) onto seal (705). For bipolar plate (308) comprising formed flow field features (723), it may be advantageous to apply seal (705) to the frame (704) rather than the bipolar plate before process step (1204). For example, a screen or stencil printing process (1203) may be better performed on a flat component. Therefore, if bipolar plate (308) is not flat, application of seal (705) to the frame (704) and then pressing together with bipolar plate (308) may be a preferred order of operations. The material properties, geometry, and thickness of the uncured seal (705) may be selected to ensure adequate adhesion to both the bipolar plate (308) and the frame (704). The thickness and geometry may be further selected to ensure that the resulting uncured seal forms a reliably continuous gasket between the bipolar plate (308) and frame (704) after pressing (1204). The pressing process (1204) may involve assembling the components with a fixed compressive load using a mechanical, pneumatic, or hydraulic press and flat tools or by utilizing a vacuum system to apply uniform vacuum pressure to the assembly through a sealed bag or membrane. The pressing process (1204) may involve assembling the components to achieve a fixed thickness in the uncured state. After pressing, the hydrogen seal (705)

may be cured using an appropriate, high-speed curing method such as ultraviolet light curing, microwave curing, thermal curing, solvent curing, a two-part epoxy curing method or humidity curing. Alternately, the hydrogen seal may be left uncured at this stage. Next, water seal (703) may be applied to the top of frame (704) in an uncured state (1205) using an appropriate high-speed application method such as screen printing, rotary screen printing, stencil printing, or robotic dispensing. The material properties, geometry, and thickness of the uncured seal (703) may be selected to ensure adequate adhesion to the frame (704). As described for FIG. 7a, the thickness and geometry of seal (703) may be further selected to ensure adequate elastic compliance to form a reliable water seal over a range of expected thickness tolerances for cell components in high-speed manufacturing. For example, a thicker water seal (703) may provide greater range of sealing and accommodate larger thickness tolerances for the electrode flow fields. A narrower water seal (703) may provide lower overall load in a border area (610) for a given compression, thereby minimizing the percentage of stack compressive load taken up by the seals and ensuring adequate contact pressure in the active part of the cell. The final step (1206) may be to cure the seal(s) (703) and (705), if not previously cured, using one or more of an ultraviolet light curing, microwave curing, thermal curing, solvent curing, a two-part epoxy curing method or humidity curing method. It may be advantageous in certain embodiments to apply water seal (703) to frame (704) before pressing step (1204) in either an uncured or cured state or to design frame (704) with water seal (703) integrated during its manufacturing. The final bipolar plate assembly (1207) may be tested to ensure quality after curing step (1206). For example, a fixture and machine for pressure testing and verifying the cured seals are leak-tight may be employed in line with the bipolar plate assembly production following the cure step (1206). A method of manufacturing a bipolar plate assembly for a scalable electrolysis cell may comprise selecting a material for a bipolar plate, a hydrogen seal, a water seal and a fluid distribution frame, applying a hydrogen seal to one of the bipolar plate or fluid distribution frame in an uncured state, aligning a fluid distribution frame relative to the bipolar plate, compressing to engage the uncured hydrogen seal between the plate and the frame, and applying a water seal to the fluid distribution frame. At least one of the hydrogen or the water seal may be cured using an ultraviolet light curing method, microwave curing, a thermal curing method, a solvent curing method, a two-part epoxy curing method or a humidity curing method. The hydrogen and water seals may be cured simultaneously. The water seal may be formed during production of the fluid distribution frame, before engagement with the uncured hydrogen seal. The fluid distribution frame may be pressed together with the bipolar plate with a force adequate to ensure a continuous, unbroken seal may be formed between the bipolar plate and the fluid distribution frame and/or to achieve a target thickness for the bipolar plate assembly with variation less than or equal to plus or minus 25%. The hydrogen and/or water seal may be applied using a screen or stencil printing process. One or both of the hydrogen or water seal may be applied in an uncured state with a thickness between 10 and 1000 micrometers and a width between 0.5 and 15 millimeters.

Figure 13:
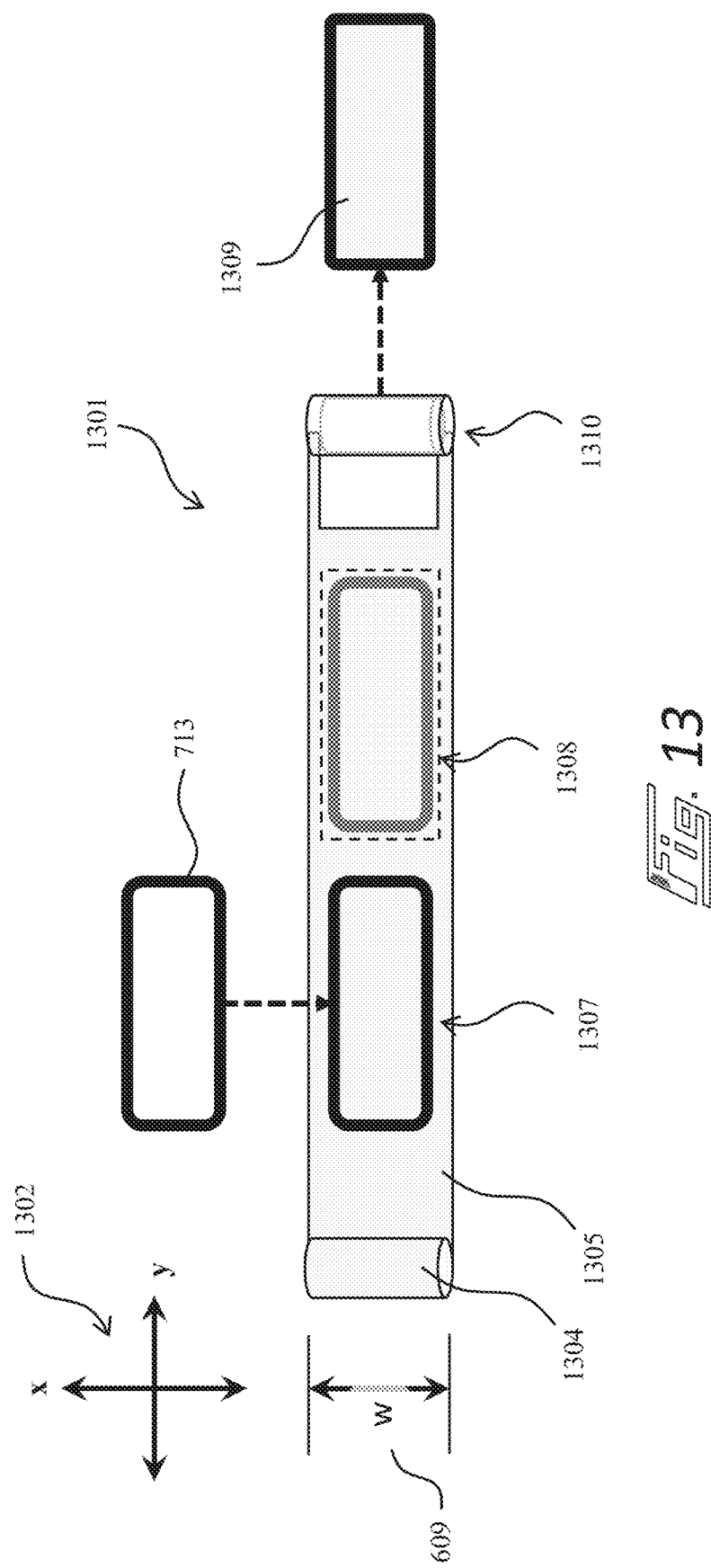
FIG. 13 shows the basic steps that may be included in a high-speed manufacturing process for applying the cell internal seal to a membrane or a catalyst coated membrane.

FIG. 13 shows an embodiment of the basic steps (1301) in a high-speed manufacturing process for applying the cell internal seal (713) to the membrane (1305). A membrane or catalyst coated membrane "CCM" (1304) is selected of desired roll web width "w" (609). The membrane may be an acidic, proton-conducting type or alkaline, hydroxide-conducting type. The membrane may be bare or have electrode catalyst applied to one or both sides. The catalyst coating on one or both sides may be continuous or coated in patches with bare membrane exposed at the edges of each patch. A roll of web width "w" (609) may be loaded onto an unwinding station designed to hold the web (1305) flat, under a known tension and able to move along a y-axis (1302). An internal seal (713) may then be applied directly to the membrane or CCM using an appropriate high-speed application method (1307) such as screen printing, rotary screen printing, stencil printing, or robotic dispensing. The internal seal (713) may then be cured using one or more of an ultraviolet light curing, microwave curing, thermal curing, solvent curing, a two-part epoxy curing method or humidity curing method (1307). The web may then be advanced, where discrete membrane-gasket assembly pieces (1309) may be cut from the roll (1308) using an appropriate method such as die cutting, blade cutting, or laser cutting and provided to a separate cell assembly process (1501) (depicted in FIG. 15). Waste from the membrane or CCM roll may be collected at the end of line (1310) for reclamation and/or recycling. A method of manufacturing an internal seal for a scalable electrolysis cell may comprise selecting one of a membrane or a catalyst coated membrane of a desired roll web width along an x-axis; directing the web of the roll through a seal application machine along a y-axis; applying an uncured internal seal to one side of the web using one of a screen printing, stencil printing or robotic dispensing method; curing the applied internal seal using one of an ultraviolet light curing, microwave curing, thermal curing, solvent curing, a two-part epoxy curing method or humidity curing method; cutting the membrane-gasket assembly or catalyst coated membrane-gasket assembly roll into discrete piece parts; and delivering the resulting individual piece parts to a cell assembly machine. The membrane material may be of an acidic, proton-conducting type or of an alkaline, hydroxide-conducting type and may be uncoated, continuously coated or patch-coated as a CCM on one or both sides. The internal seal may be applied onto the anode and/or cathode side of the web.

Figure 14A:
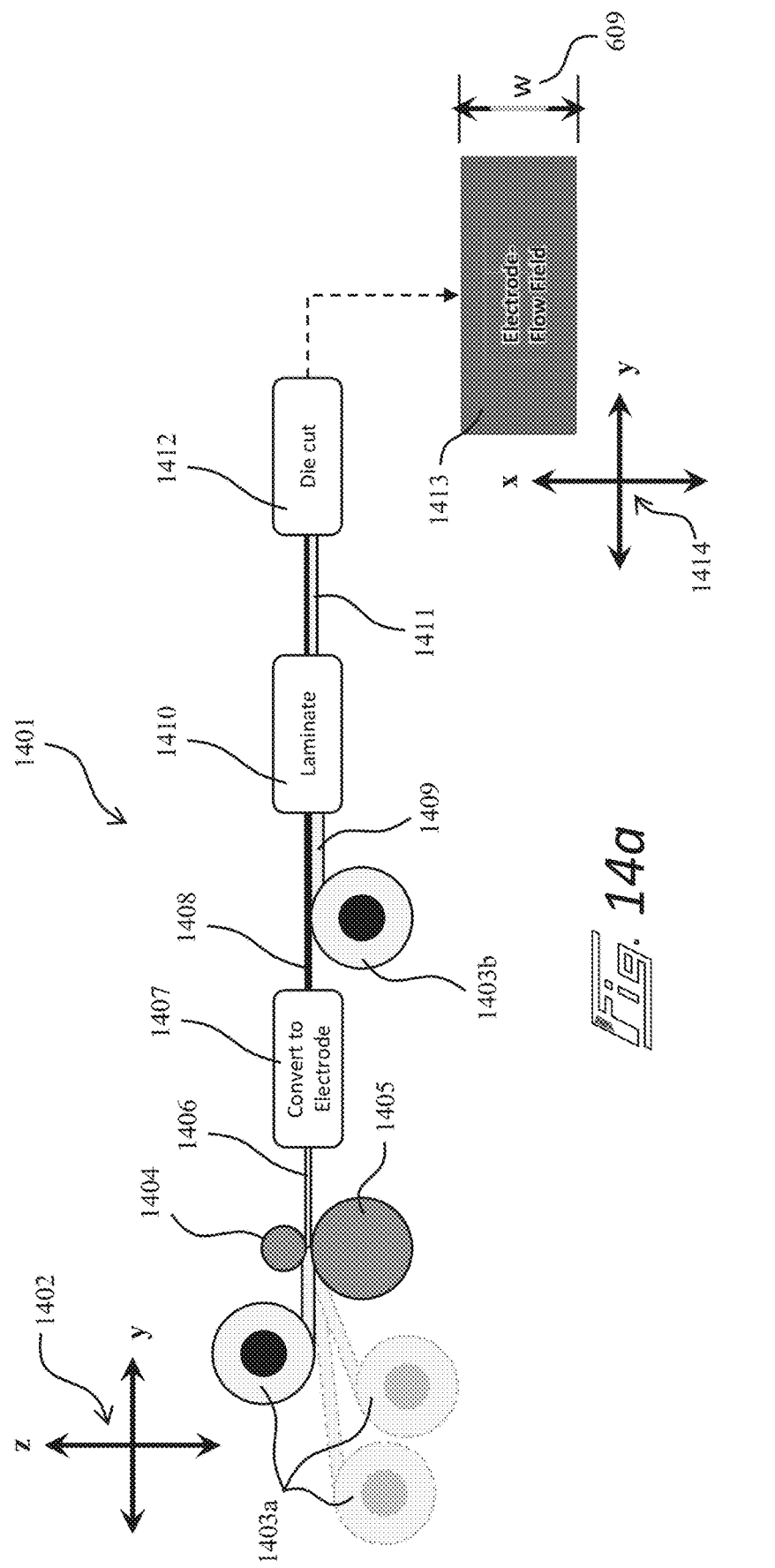
FIG. 14a shows the basic steps that may be included in a high-speed manufacturing process for creating an integrated electrode flow field component.

FIG. 14a shows an embodiment of the basic steps in a high-speed manufacturing process (1401) for creating an integrated electrode flow field component (1413). One or more rolls of porous substrate (1403a) may be selected based on a desired roll web width "w" (609) as previously described. The substrate may comprise a foam, a felt, a woven screen, an expanded metal, a sintered frit, or a fiber cloth or paper. The selected substrate may have a porosity of up to 98% where porosity is defined as the volume percent of the substrate available to through-flow of fluid. For example, the porosity may be between 98% and 40%, between 95% and 50%, between 90% and 60%, or between 95% and 80%. The composition of the substrate may comprise iron, nickel, chromium, steel, stainless steel, Inconel, aluminum, titanium, carbon, or combinations of these. The substrate may be plated or coated with other materials such as platinum, gold, tin, carbon, titanium nitride, PTFE or another corrosion-inhibiting layer including engineered layers of polymeric or oxide materials with conductive metal or carbon pathways. The roll(s) (1403a) may be loaded onto an unwinding station designed to hold the web flat, under a known tension and able to move along a y-axis (1402). The roll(s) (1403a) may be calendered through a set of rollers (1404) and (1405) to laminate more than one layer together, reduce the porosity of the web, reduce or increase its thickness, increase its strength, increase its stiffness, and/or create desired surface characteristics on one or both sides of the web (1406). For example, it may be advantageous for the substrate to be relatively smooth on one side and rough on the other to facilitate steps later in the process. It may also be advantageous to achieve a porosity gradient through the thickness of the substrate. For example, it may be beneficial to downstream processes to have one side of calendered substrate (1406) be relatively low porosity for accepting a conversion to an electrode while having the opposite side of (1406) be relatively high porosity to promote bonding with a second substrate. To achieve different properties on each side of web (1406), the rollers (1404) and (1405) may be the same or different diameter and/or be made of the same or different materials and/or be constructed with different surface finishes or coatings and/or be provided with specific surface patterns that may be embossed onto one or both sides of roll web (1403*a*). The calendered substrate (1406) may then be converted to an electrode (1408) in process (1407). For example, an electrode material may be spray coated, screen printed, rotary screen printed, doctor-blade coated, slot-die coated, curtain coated, squeegee coated, or laminated as a film, decal or solid layer using heat and/or pressure on the appropriate surface of the electrode substrate (1406). The electrode applied in process (1407) may comprise a suitable catalyst material, electrically conductive support materials, ionically conductive binder materials, and inert binder materials along with appropriate solvents to facility the electrodes application. Multiple binder materials may be selected for the ink, including primary, secondary, tertiary, etc., in order to ensure adequate adhesion of the electrode to the substrate (1406) and adequate structural integrity of the final electrode layer itself to prevent delamination and/or washout of the electrode during operation of the electrolyzer. The binders used may consist solely of ionically-conductive polymers or combinations of both conductive and non-conductive polymers to optimize the adhesive and ion-conducting functionality of the electrode. Ionically conductive binders may be selected from ionomers fully dissolved in an appropriate solvent (liquid ionomer solution) or from dispersions of non-soluble ionomers in an appropriate fluid carrier (ionomer dispersion). In a preferred embodiment, it may be advantageous to use a liquid ionomer solution as the electrode binder so that a continuous, ion-conducting film may be formed within the structure of the final electrode after application and during electrolyzer operation. In another preferred embodiment it may be advantageous to use a primary inert binder in combinations with a secondary ion conducting binder to achieve optimal resistance to wash out and low ionic resistance. In another preferred embodiment it may be advantageous to combine both liquid ionomer solutions and ionomer dispersions within the electrode to achieve optimal resistance to wash out and low ionic resistance. The electrode conversion process (1407) may also comprise a post-coating step. For example, the coating may be dried, heat treated, annealed and/or otherwise physically or chemically treated to promote bonding to the substrate and/or increase electrochemical performance of the cell. The conversion process (1407) may also comprise a chemical or physical vapor deposition process for conversion to an active electrode (1408). The conversion process (1407) may also comprise a plasma or flame spray process for depositing electrode material onto the substrate (1406) or for chemically reacting and/or converting (1406) into an active electrode. Following process (1407), electrode web (1408) may be placed adjacent to a second roll of porous substrate (1403*b*). This substrate may be identical to or different from electrode substrate (1403*a*) and may be selected based on a similar range of possible materials and propertied as (1403*a*), but toward meeting functional requirements for a fluid flow field, rather than an electrode. For example, it may result in the highest purchase volume and lowest supply cost to make (1403*b*) identical to (1403*a*). It may be advantageous for cell performance—electrical resistance, flow resistance, thermal conductivity, mechanical resiliency, or mechanical strength—to select (1403*b*) from a different substrate than (1403*a*). In process step (1410) the electrode web (1408) may be laminated to flow field web (1409) through an appropriate lamination process. The lamination process (1410) may comprise mechanical rolling or calendering through rollers similar to (1404) and (1405) in order to promote co-penetration of solid fibers, ligaments, or wires from web (1408) with web (1409). To accomplish this mechanical bonding, the similar rollers (1404) and (1405) may be the same or different diameter and/or be made of the same or different materials and/or be constructed with different surface finishes or coatings and/or be provided with specific surface patterns. It may be advantageous to select (1403*a*) and (1403*b*) from the same supplied material, but to pre-calender (1403*b*) slightly before lamination step (1410). The pre-calendering step may include embossing a pattern into the side of (1409) to be co-penetrated with (1408) to promote mechanical bonding. The laminating process (1410) may also comprise other steps including heat treatment or application of bonding promoters such as adhesives, polymer suspensions, liquid ionomer solutions, or ionomer dispersion to one or more of the webs (1408) and (1409). The order of steps (1407) and (1410) may be reversed so that conversion of web (1406) to electrode (1408) may take place after laminating to web (1409). It may be advantageous for certain electrode materials and/or methods to be formed only after calendering and laminating to ensure adequate adhesion is maintained in the final web (1411). In some cases, the electrode may be coated onto the membrane, in which case the conversion step (1407) may be skipped in process (1401). Following lamination step (1410), the unitized electrode flow field web (1411) may be processed (1412) to create discreet piece parts (1413) of the appropriate size for integration into an electrolysis cell (601). For example, the web (1411) may be processed in step (1412) by stamping with a knife or other cutting die to ensure precise sizing of the piece parts. The exact size of parts (1413) may depend on whether an anode or a cathode electrode flow field is to be produced. The size may also depend on the design tolerance required for reliable high-speed integration with the bipolar plate assembly (1201). The overall process (1401) may be adapted as necessary to produce either anode or cathode electrode flow fields and specific materials, coatings, steps, and settings of the line may be the same or different for each. In production, two independent lines may be employed to simultaneously produce one anode and one cathode electrode flow field to enable high-speed manufacturing of complete electrolysis cells. A method of manufacturing an integrated electrode flow field for a scalable electrolysis cell may comprise selecting an electrode substrate of a desired roll web width along and x-axis from one of a foam, a felt, a woven screen, an expanded metal or a sintered metal frit; selecting a flow field substrate of a desired roll web width along an x-axis from one of a foam, a felt, a woven screen, an expanded metal or a sintered metal frit; directing the electrode substrate web along a y-axis through calendering rollers configured to achieve the desired thickness and surface properties of each side of the electrode substrate; converting the electrode substrate to an active electrode; directing the flow field substrate web along a y-axis, adjacent to the electrode substrate web and through a laminating process to adhere the electrode and the flow field together; cutting the laminated electrode flow field roll into discrete piece parts; delivering the resulting individual piece parts to a cell assembly machine. The electrode and flow field substrate materials may comprise at least one of carbon, nickel, titanium, iron, chromium, stainless steel, or Inconel. One or more of the electrode web and flow field web may comprise a rough, patterned, or embossed surface to promote lamination. The laminating step may include a bonding promoter selected from one of an adhesive, a polymer dispersion, a liquid ionomer solution or an ionomer dispersion. The electrode flow field web may comprise a foam electrode and a woven screen flow field after lamination. The electrode conversion may occur before lamination or after lamination.

Figure 14B:
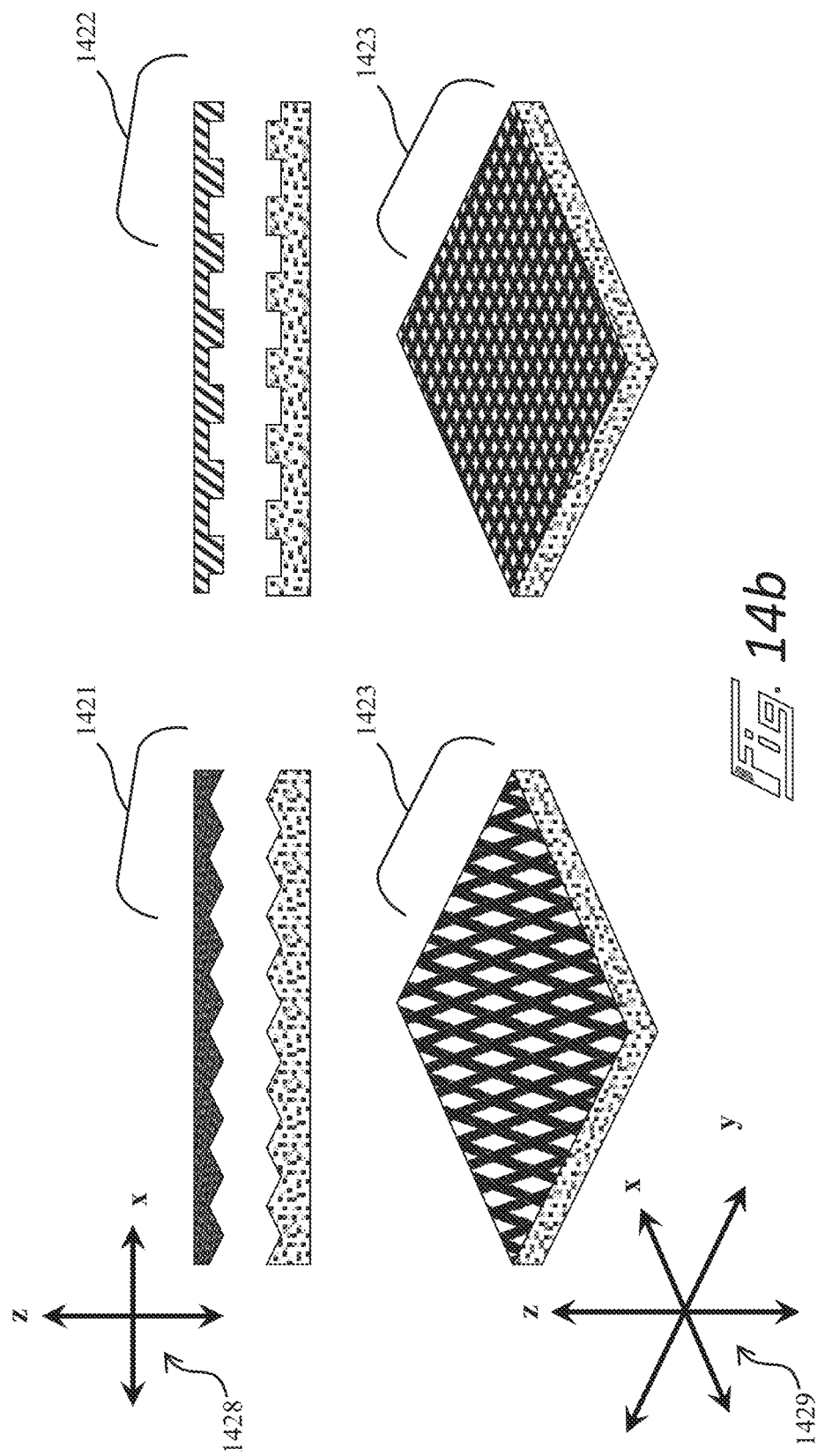
FIG. 14b shows some illustrative examples of embossing or patterning of surfaces of an electrode and/or flow field substrate to promote bonding during lamination.

FIG. 14b shows several illustrative embodiments of patterning or embossing of an electrode and/or flow field substrate to promote enhanced bonding during lamination step (1410). Patterns may be linear, along a y-axis as shown in (1421) and (1422), along an x-axis (not shown) or along both x- and y-axes in a crosshatch style (1423) and (1424). The profile shape—triangle (1421), rectangle (1422) or other shapes (not shown)—depth and spacing may be optimized based on the material and other properties of the substrates to be laminated.

FIG. 15 shows an embodiment of the basic steps (1501) in a high-speed manufacturing process for assembling a unitized electrolysis cell (601). The bipolar plate assembly (1207) may be loaded onto an assembly line moving along a y-axis (1502). A cathode electrode flow field (1413a) may be placed into the cavity of bipolar plate assembly (1207) using an appropriate handling method (1503). The resulting sub-assembly may be advanced along a y-axis where a membrane gasket assembly (1309) may be placed into the cavity of bipolar plate (1207) using an appropriate handling method (1504). The resulting sub-assembly may be advanced along a y-axis where an anode electrode flow field (1413b) may be placed into the cavity of bipolar plate (1207) using an appropriate handling method (1505). For example, appropriate handling methods (1503), (1504) and (1505) may comprise a robotic handler and/or an automated linear motion machine and may include vision or other measurement systems to ensure precision of locating components. The design features of bipolar plate assembly (1207) may be conducive to accurate placement of components (1413a), (1309) and (1413b). For example, the stepped pocket (714) of frame (704) may aid in self-locating components (1413a), (1309), and (1413b). The resulting unitized cell assembly (601) may be further processed to ensure components (1413a), (1309), and (1413b) are properly positioned within bipolar plate assembly (1206). For example, a pressing process may be performed after step (1505) whereby a generally flat platen may be used to apply a generally uniform pressure along a z-axis to component (1413b). Applied pressure in this way may act to flatten components (1413a), (1309) and (1413b) and ensure they are firmly positioned and seated within bipolar plate assembly (1207). Such a pressing process may be integrated into handling method (1505) and performed simultaneously with placement step (1505). The pressing process may also comprise a leak check to ensure components (1413a), (1309) and (1413b) are properly positioned and sealed within bipolar plate (1207).

Figure 16:
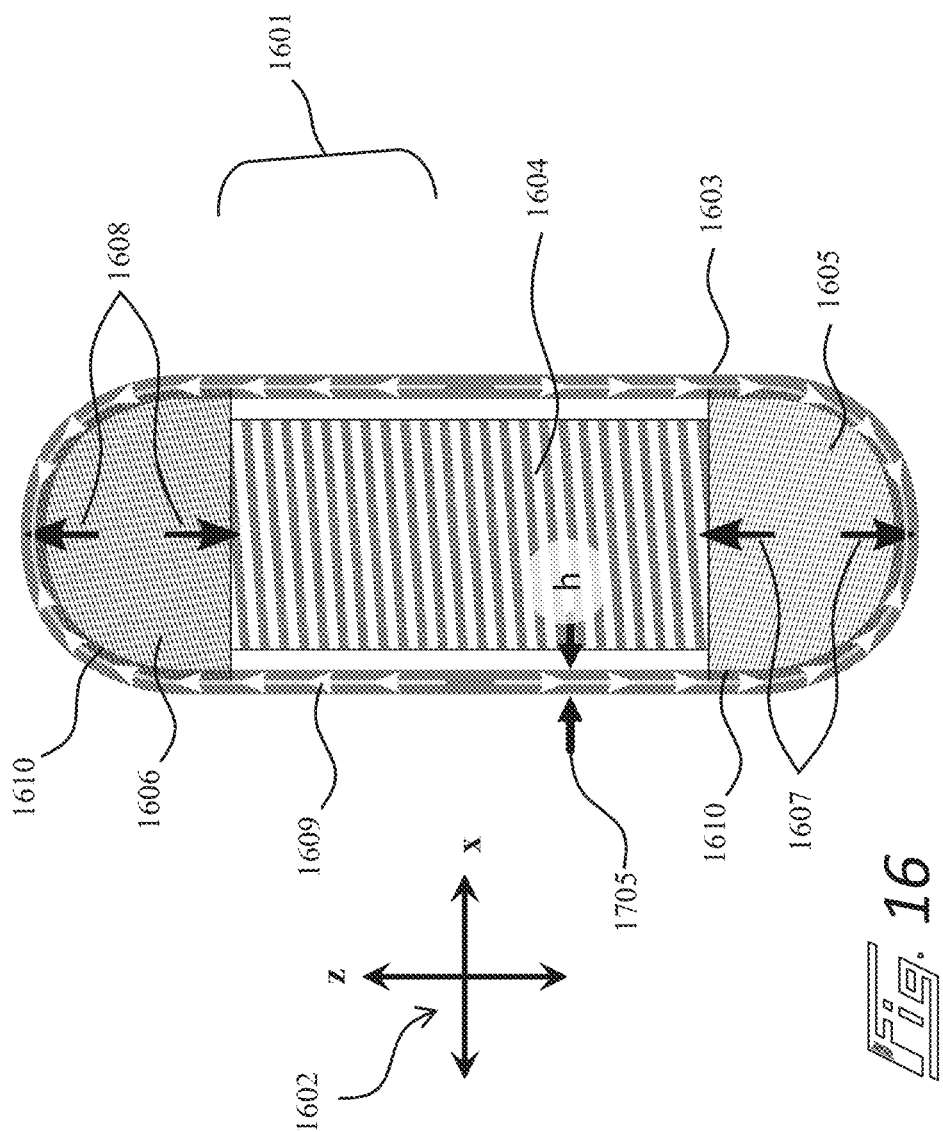
FIG. 16 shows a y-axis view of an exemplary stack compression system illustrating a tensile wrap surrounding a core cell stack and end units whereby mechanical tension force in the wrap is balanced by mechanical compression force in the cell stack.

FIG. 16 shows a y-axis view of an exemplary embodiment of a stack compression system (1601) illustrating a tensile wrap (1603) surrounding a core cell stack (1604) and end units (1605) and (1606) whereby mechanical force of tension in the wrap (1609) may be balanced by mechanical force of compression in the cell stack (1607) and (1608). Also illustrated is slip plane (1610) between the wrap (1603) and end units (1605) and (1606). The slip plane (1610) may ensure that stress in the wrap (1609) may be maintained primarily as tensile stress while load from wrap (1603) to end units (1605) and (1606) may be generally directed perpendicular to the slip plane and radially inward through the end units. This arrangement of forces may ensure minimum bending in the end units and the application of uniform pressure to the cell stack (1604) by end units (1605) and (1606). The semi-cylindrical cross-sectional shape of the end units may be conducive to this arrangement of forces. The wrap (1603) may be constructed of a material of adequate strength and elasticity to properly maintain compressive load on the core cell stack. For example, the wrap may be made of various alloys of steel, stainless steel, aluminum, or titanium, or may comprise a suitably strong plastic, reinforced plastic or a composite material such as carbon, glass or aramid fiber. The thickness of the wrap "h" (1705) may be selected to ensure stress (1609) remains below a failure threshold based on the material selected for the wrap (1603) and the maximum tension (1609) the wrap (1603) may be exposed to. The thickness "h" (1705) may also be selected to achieve a desired elongation, stretch, or spring rate for the wrap during assembly and/or service of the compression system (1601). For example, it may be advantageous for wrap (1603) to have a spring constant [N/m] lower than that of cell stack (1604) to accommodate stack thermal expansion and contraction without substantially changing load applied to cell stack (1604). For example, a wrap spring rate may be selected between 0.1% and 25%, between 0.5% and 10%, between 1% and 5% or between 2% and 5% of the cell stack spring rate.

Figure 17A:
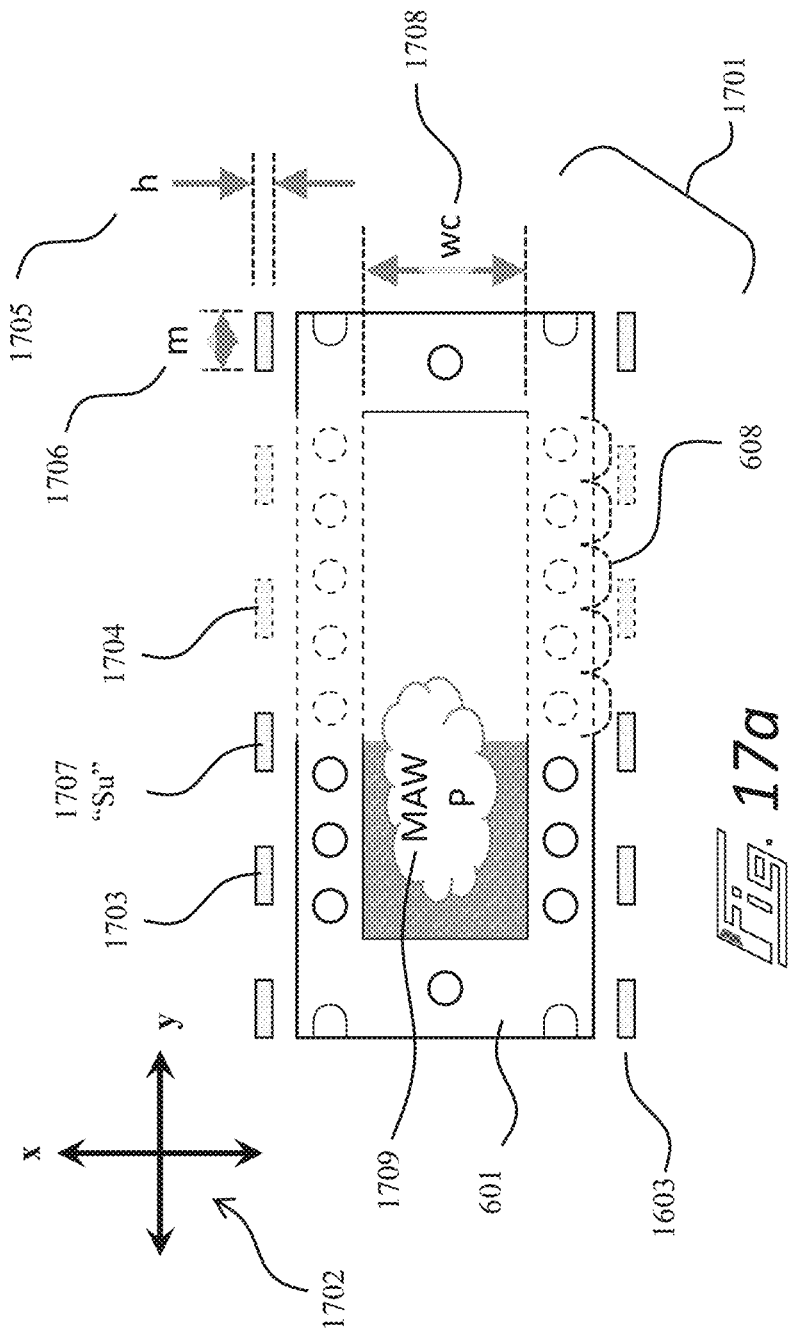
FIG. 17a shows a cross-section view of the stack of FIG. 1 illustrating the association of scalability along a y-axis of the compression system wrap and the cell.

FIG. 17a shows an exemplary x-y plane, cross-section view (1701) of an embodiment of stack (101) of FIG. 1 illustrating the association of scalability along a y-axis (1702) of the compression system wrap (1603) to the cell (601). Strips (1703) may be a feature of wrap (1603) as illustrated in FIGS. 1 (103) and (104) and these strips (1703) may, in aggregate, carry the tension force (1609) of the compression system (1601). The total compressive force (1607) and (1608) within the cell stack (1604) may be equal to the total tensile force (1609) in the wrap (1603) and may be divided amongst the multitude of strips (1703) that constitute the complete wrap (1603). The tensile stress in any one strip may be equal to the tensile force in the strip divided by the cross-sectional area of the strip. As cell (601) is scaled in active area, water windows and associated anode flow field lengths (608) may be added, increasing the dimension of cell (601) along a y-axis. This increase in y-axis dimension for the cell may be accompanied by a proportional increase in wrap (1603) dimension along the y-axis. New strips (1704) may be added and/or strip length "m" (1706) may be adjusted to ensure proportionality between increased cell (601) length and wrap (1603) length along a y-axis. In this way, the added total compressive force required by the incremental cell areas (608) may be carried at the same tensile stress in the added strips (1704) without requiring a change in wrap thickness "h" (1705). It may be advantageous to keep thickness "h" (1705) the same for wraps configured for cells of different sizes. For example, the manufacturing methods developed for fabricating a wrap for a relatively large cell may be used directly for fabricating a wrap for a smaller one, or vice versa. It may also be shown that the required thickness "h" (1705) of the wrap may then only be a function of the stack compression requirements and not the active area of the cell (601). It may be shown that the thickness "h" (1705) may be selected to ensure the tensile stress in the wrap does not exceed a predetermined failure threshold "Su" (1707) of the wrap material. This threshold may be the yield strength or the tensile strength of the material from which the strips (1703) are manufactured. In some embodiments, the thickness "h" (1705) and/or the material of the wrap may be selected to ensure the tensile stress in the wrap does not exceed 10%, 20%, 30%, 50%, 75%, 80%, or 90% of the yield strength or tensile strength. It may also be shown that, in order to keep tensile stress in the wrap from exceeding "Su" (1707), dimension "h" (1705) may be greater than or equal to the ratio of a selected maximum allowable working pressure "MAWP" (1709) for the hydrogen gas in the cathode flow field of the cells to the failure threshold "Su" (1707) of the wrap material multiplied by the dimension of the cathode flow field along an x-axis "wc" (1708), as described by equation 17a-1 below.

$$h \geq \frac{MAWP}{Su} \cdot wc \qquad \text{Equation 17a-1}$$

FIG. 17b shows an exemplary x-y plane, cross-section view (1710) of an embodiment of stack (101) of FIG. 1 illustrating engagement of the stack alignment fixtures (1713) and (1715) through gaps provided in the wrap (108) configured for that purpose and (1712) on one freely accessible face of the stack. Also shown is the engagement of movable cell positioning actuators (1716) and (1717) along opposite sides of the cell. Precise alignment of cells relative to one another and to the stack compression system during stacking and compression may be critical to reliable sealing, performance and durability of an electrolyzer stack. Exact mechanical constraint is an assembly process by which the six fundamental degrees of freedom (3 translational and 3 rotational) of the cell (601) are constrained by a system of locating datums. In practice this involves placing cell (601) onto a flat surface (i.e., a previously stacked cell or an end unit), and abutting two adjacent edges of the cell against three fixed points, two on one side (1713) and (1715) and one on the adjacent side (1712). This positioning method fully constrains the cell without over constraining it. Wrap (1603) runs along two opposite sides of cell (601). In order to facilitate an exact-constraint assembly process, gaps (108) may be provided through the wrap walls to allow alignment fixtures (1713) and (1715) to pass through the wrap and establish the aforementioned locating datums. The third datum (1712) may be established on a freely accessible face of the stack, unencumbered by the wrap structure. In order to ensure that cell (601) contacts the three established datums (1712), (1713), and (1714), cell (601) may be brought into contact with the datums by a cell handling system used to move the cells from the manufacturing line into the wrap. For example, a robotic arm may be used to ensure contact as it places the cell onto the stack. Alternately separate, movable actuators (1716) and (1717) may be provided during placement of cell (601), which act to push cell (601) long the x and y-axes after placement on the stack, thereby ensuring cell (601) contacts the designated datums (1712), (1713) and (1714). Wrap (1603) may be further configured with features to allow the necessary movable actuator (1716) to pass through the wrap and push the cell into position.

Figure 18A:
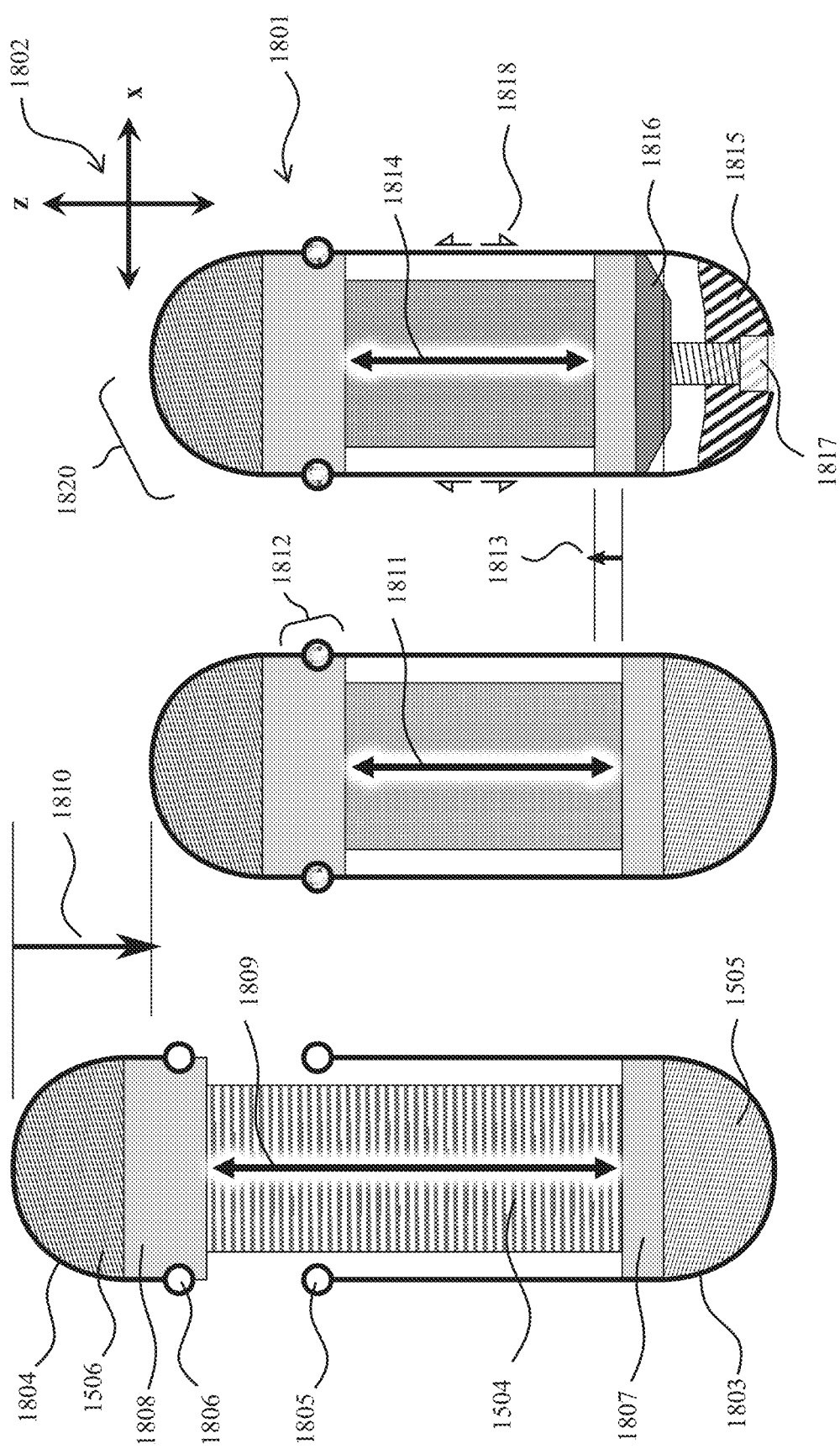
FIG. 18a shows a y-axis view of an exemplary stack compression system at three stages during the compression process ending with a fully compressed and locked electrolyzer stack.

FIG. 18a shows a y-axis view of an embodiment of an exemplary stack compression system at three stages during the compression process (1801), ending with a fully compressed and locked electrolyzer stack (1820). At stage 1 (left-most figure), the cell stack (1504) is uncompressed, with a free height along a z-axis that may be determined by the weight of the cells and top end unit as shown by dimension (1809). The lower wrap element (1803) may contain a lower end unit consisting of semi-cylinder (1505) and block (1807). Block (1807) may comprise a drain manifold, gaskets, spacers, electrical isolation and power terminal elements. The upper wrap element (1804) may contain an upper end unit consisting of semi-cylinder (1506) and block (1808). Block (1808) may comprise a process manifold, gaskets, spacers, electrical isolation and power terminal elements. Block (1808) may be further configured to engage upper wrap (1805) to hold components of upper end unit from separating from the upper wrap (1804) due to gravity along a z-axis. Lower (1803) and upper (1804) wrap sections may further comprise joint elements (1805) and (1806), which may enable the lower and upper wrap sections to be connectively joined when aligned. At stage 2 (middle figure) the upper wrap (1804) and end unit assembly (1506) and (1808) have been lowered along a z-axis (1810), compressing cell stack (1504) to a pre-compressed height shown by dimension (1811). Movement may be accomplished using a press powered by hydraulics, pneumatics, mechanical screws, or any other means of force capable of compressing the cell stack to dimension (1811). The upper wrap and end unit may be lowered to a point where joint elements (1805) and (1806) are in alignment to enable fixed joint (1812) to be completed between the wrap sections. At this stage the wrap may act as a continuous, integrated structure capable of sustaining designed tensile loading. At stage 3 (right-most figure) the adjustable elements (1815), (1816) and (1817) may be engaged to compress cell stack (1504) to final dimension (1814). This final stage may be accomplished in multiple sub-steps. Adjustable element (1816) may be driven upward along a z-axis by temporarily using hydraulic, pneumatic, or other mechanical system to achieve a desired cell stack load. This temporary loading may be advantageous in applying a precise load by incorporating load or pressure measurement instruments into the temporary system. The temporary system may also be advantageous in allowing a fixed or variable loading profile to be applied during compression. For example, the cell stack may be compressed beyond the final load planned for the wrap to minimize contact resistance between cells and cell components. Load in the cell stack may then be lowered to the final load planned for the wrap, thereby minimizing structural requirements for the compression system. The temporary load may cycle up and down several times and/or oscillate and/or vibrate as the cell stack is compressed at stage 3 to ensure all components are brought into intimate contact and/or seals are well engaged. After a temporary loading profile is complete, adjustable elements (1815) and (1817) may be engaged to transfer the reaction load of the cell stack (1504) from the temporary system to the integrated wrap (1603). For example, screw (1817) may be turned, forcing pad (1816) to separate from shoe (1815) within the lower semi-cylinder (1505) and further causing the integrated wrap (1603) to stretch (1818). As screw (1817) is turned, reaction load carried by the temporary system may reduce while tensile load in the wrap (1818) may increase as wrap (1603) stretches. When load in the temporary system has dropped to zero, the stack assembly may be in its final compressed state. Leak and other quality control testing of the compressed stack (1820) may be incorporated into process (1801). For example, leak testing of the anode, cathode, or both sides of the stack to appropriate pressures may be performed during application of temporary load, before engaging screw (1817), to ensure the stack quality is acceptable before engaging screw (1817). Leak testing may be performed after screw (1817) is engaged, or it may be performed before and after screw (1817) is engaged. Other measures may be introduced such as dimensional measurement of compressed stack height (1814), pre-compressed height (1811), free stack height (1809), or all these heights. The stretch (1818) of wrap (1803) may be measured before, during and/or after the third stage to ensure proper engagement of the adjustable elements (1815), (1816) and (1817). For example, the stretch (1818) may be measured with a linear variable displacement transducer or a displacement dial indicator or a strain gage attached to wrap (1803). These measurements may be used to determine the final load on cell stack (1504) by converting stretch (1818) into force by determining the spring constant of wrap (1803) and (1804) using Hooke's Law.

FIG. 18b shows embodiments of a variety of potential joints (1812) for connection the lower and upper sections of the wrap. Hinge-Pin A comprises lower and upper wraps (1803) and (1804) configured as a series of alternating strips formed to allow a pin (1820) to pass through a common hole formed along a y-axis (1802) when the strips are aligned as shown. The centerline of the thickness of the lower and upper wraps (1821) may be configured by the geometry of the hinge to be aligned along a z-axis with each other and with the center line of the pin (1820). This arrangement may be advantageous in minimizing bending and local stress in the strips around the pin when the integrated wrap is placed into tension. The bent flanges of each strip (1803) and (1804) may be welded or otherwise bonded at points (1822) or other locations to increase joint strength. The pin may be made of any suitable material of adequate strength such as iron, steel, aluminum, titanium, plastic, reinforced plastic, or combinations/alloys of these materials. Hinge-Pin B is an alternate geometry for Hinge-Pin A which may be advantageous in minimizing the material thickness of the upper and lower wraps. The radii of the bends in strips (1803) and (1805) for Hinge-Pin B may be larger, thereby reducing local stresses around the joint. Hem-Hook comprises interlocking, opposing hem bends formed in the lower (1803) and upper (1804) wraps. This style joint may be conducive to joining lower and upper wraps configured as a continuous sheet along a y-axis rather than a series of alternating strips. Braced Hem-Hook comprises a modified Hem-Hook joint whereby the joint may be encapsulated to counteract the natural tendency of the joint to rotate under load due to the moment that may be caused by the misalignment of the centerlines of wraps (1803) and (1804). Encapsulation may be incorporated into the design of end block (1808).

FIG. 19 shows embodiments of exemplary components of an adjustable element of the compression system (1901) packaged into a lower semi-cylindrical end unit (1505) illustrating the internal separating force (1909) and (1910) generated by locking the system and resulting in compression in the cell stack and tension in the wrap. Cell stack (105) may be abutted by power terminal plate (1905), which may be set into drain manifold (1904) with drain ports (1906). Compression plate (1903) may be below drain manifold (1904) and sit above the one or more compression pads (1816), which may be distributed along a y-axis (1902) in proportion to the number of water windows provided in the cell. Compression pads (1816) may act along a z-axis (1902) to apply an upward force on plate (1903). Shoe (1815) may be set into lower semi-cylinder (1505) and configured to apply a generally radial distribution of force (1910) to the semi-cylinder when loaded. Screw (1817) may be threaded through shoe (1815) and abut pad (1816). When turned, screw (1817) acts to separate pad (1816) from shoe (1815) causing forces (1909) and (1910) to increase. Lower wrap (1803) may contain lower semi-cylinder (1505) and be placed in tension by the action of the adjustable elements as described. Also shown are pass through holes (1907), which may allow a stack assembly mechanism to press directly on pad (1816) to accomplish the temporary compression means described earlier. Temporary forces (1908) may be accomplished using posts or rods connected to a hydraulic or other type of mechanical loading machine to accomplish stage 3 of process (1801). The compression plate (1903), pad (1816) and shoe (1815) may be constructed from any suitable structural material based on the design load of the system and the resulting stresses. For example, plate, pad, and or shoe may each be selected from alloys of iron, steel, aluminum, stainless steel, plastic (of various structural grades), fiber or bead-reinforced plastic or a composite material such as carbon, glass, or aramid fiber. The lower semi-cylinder 1505 may be made from any of the aforementioned materials as well as some typically lower-strength plastics such as polycarbonate, high-density polyethylene, acrylonitrile-butadiene-styrene, polyamide, polyethylene terephthalate, polypropylene, ultra-high molecular weight polyethylene, or similar materials due to the relatively uniform stress expected in this component. Semi-cylinder (1505) may be selected from a material that promotes low friction between it and wrap (1803) at boundary (1610). Semi-cylinder (1505) may be coated on the outside to further promote low friction at boundary (1610). A layer of thin film such as polytetrafluoroethylene may be placed between wrap (1803) and semi-cylinder (1505) to promote low friction. Wrap (1803) may comprise holes or other features to facilitate the temporary compression means (1907) and (1908) and screw (1817). All or most adjustable elements of compression system (1901) may be packaged within lower end unit (106), thereby saving space, and providing tamper-resistance for electrolyzer stack (101) installation. A scalable compression system for an electrolyzer stack may comprise a structural wrap configured to contain a cell stack, end units and one or more adjustable elements; the wrap may be configured to allow free access to 2 opposing sides of the cell stack; the wrap may be configured to serve as the tensile element of the compression system; the wrap may be formed from a generally flat sheet of material with a generally uniform thickness; the thickness of the wrap may be determined by an x-axis dimension of the cell stack and the maximum allowable working pressure of the electrolyzer stack. The wrap thickness may be greater than or equal to the dimension of the cathode flow field along an x-axis multiplied by the ratio of the maximum allowable working pressure of the electrolyzer to the tensile strength of the wrap material. The wrap may have a generally oval racetrack profile when viewed along a y-axis configured to interface with semi-cylindrical cell stack end units. The wrap and the semi-cylindrical end units may be configured to slip relative to one another as the compression system is loaded. The diameter of the semi-cylindrical end units may be between 100% and 150% of the dimension of the electrolysis cell dimension along an x-axis. The adjustable element of the compression system may be at least partially contained within one or both semi-cylindrical end units. The adjustable element may be configured to achieve a final dimension of a cell stack along a z-axis within plus or minus 25%. The wrap and semi-cylindrical end units may be configured to allow direct compression of the cell stack by a temporary stack assembly system mechanically in parallel to the adjustable element. The wrap and semi-cylindrical end units may be configured to allow access to and manipulation of the adjustable element. The adjustable element may comprise one or more of a screw, a nut, a spring, a hydraulic cylinder, a pneumatic cylinder, a pressure pad, or a pressure shoe. The total quantity of adjustable elements in the stack may be proportional to the number of water delivery windows provided in the cells comprising the cell stack. The wrap may be constructed of two pieces joined with one of a hinge-pin joint, a hem-hook joint or a braced hem-hook joint on each of the two flat sides of the wrap. The joint may be configured to allow two wrap pieces to be engaged along a z-axis while pre-compressing the cell stack and to complete the assembly of the wrap joint with the cell stack in a pre-compressed state. The wrap may be configured to allow one or more cell stack alignment fixtures to penetrate the wrap boundary and touch one or more edges of the cell stack during assembly. The wrap may be configured to stretch along a z-axis by less than or equal to 2% of a final length of a cell stack at a final cell stack compressive load. The wrap may be configured to provide a spring rate along a z-axis of between 0.1% and 25% of the spring rate of a cell stack at a target cell stack compressive load.

Figure 20:
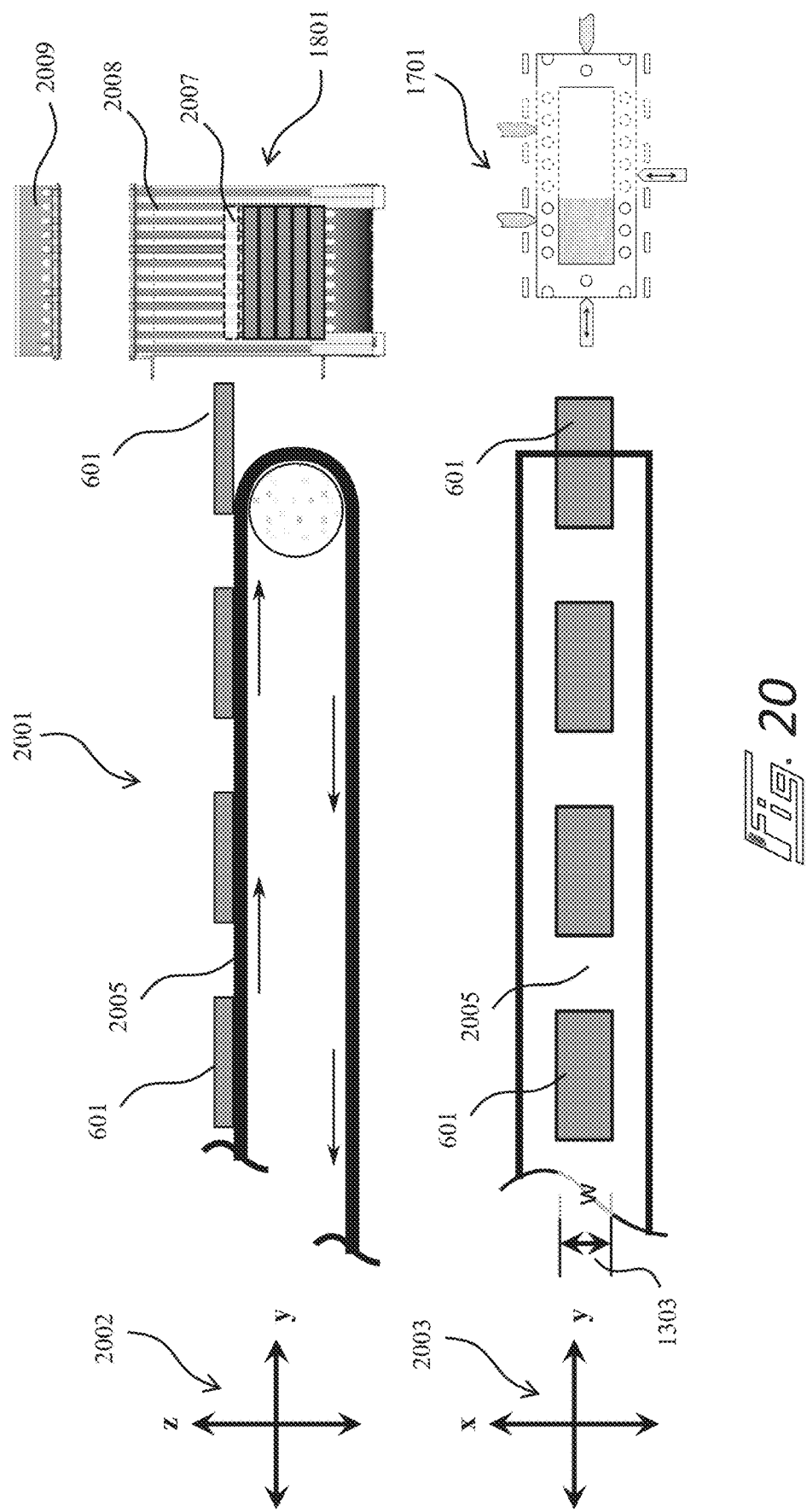
FIG. 20 shows the basic steps that may be included in a high-speed manufacturing process for placing individual electrolysis cells onto the cell stack through the freely accessible face afforded by the subject stack compression system and aligned as shown in FIG. 17b.

FIG. 20 shows an embodiment of the basic steps in a high-speed manufacturing process (2001) for placing individual electrolysis cells (601) onto the cell stack (1801) through the freely accessible face afforded by the subject stack compression system (2008) and (2009) and aligned as shown in process (1701). Unitized electrolysis cell assemblies (601) may be conveyed along a y-axis from cell assembly process (1501). The cells (601) may be robotically picked and placed into position (2007) of lower stack wrap assembly (2008) at the end of belt (2005). Alternatively, cells (601) may be moved along a y-axis into position (2007) directly by the conveyer belt (2005) without the need to pick and place each cell. It may be advantageous to align a z-axis of the stack wrap assembly (2008) at an angle relative to a gravity vector to allow gravity to assist cells (601) coming into contact with the locating datums described in process (1701) throughout the stacking process. It may be advantageous to move stack wrap assembly (2008) downward along a z-axis to facilitate either robotic or conveyer placement of cells (601) into position (2007) from a fixed z-axis height of belt (2005). The stack conveyer and assembly system (2001) may be flexible to accept cells scalable in active area as described herein as belt (2005) need not change width (1303) to accept such different size cells.

Figure 21:
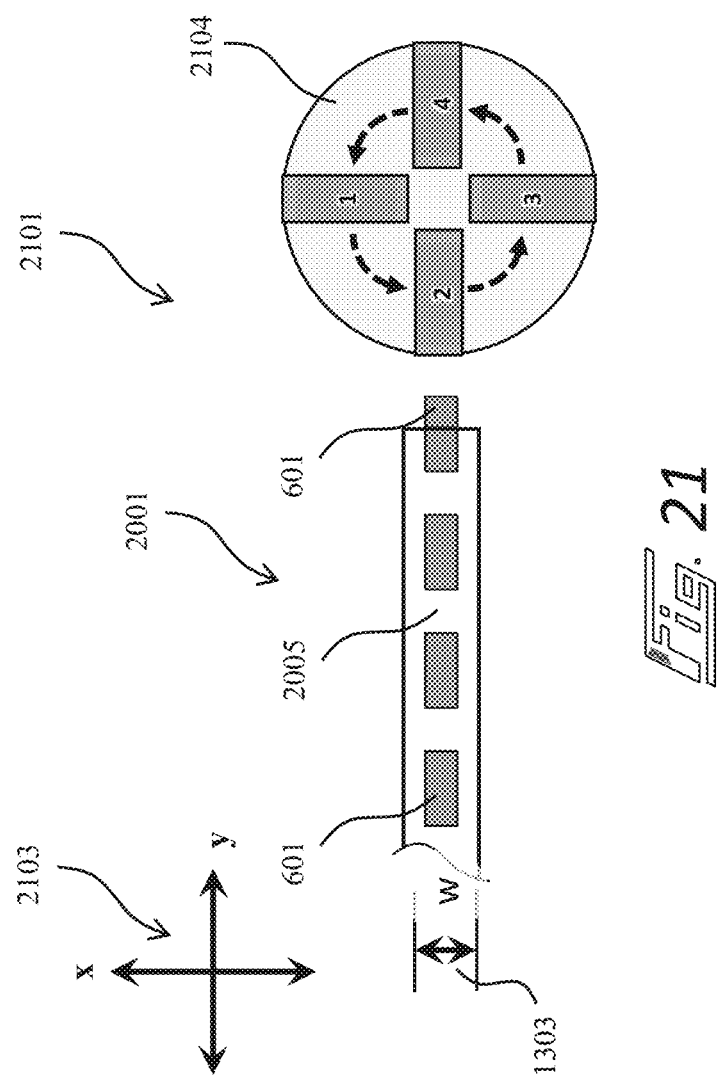
FIG. 21 shows a rotary table stack assembly station that may be included at the end of the high-speed line of FIG. 20.

FIG. 21 shows an embodiment of a rotary table stack assembly station (2104) illustrating placement at the end of a high-speed line (2001). The stacking station (2104) may be arranged to allow multiple operators to perform actions simultaneously, thereby accelerating throughput of finished stacks and enabling high speed production of both cells and stacks. For example, a full-scale stack may contain 300 or more cells and a manufacturing facility configured to produce 1,000 megawatts of electrolyzer stacks in a year may need to process up to 1,000 or more such stacks and 300,000 or more corresponding cells in each year. For one production shift operating 1750 work hours per year, this production capacity may require a tack time of approximately 20 seconds per cell which may define a required speed of conveyance of cells (601) on belt (2005). With 300 cells per stack, each stack station 1-through 4 on rotary table 2104 may have up to 1.8 hours to complete its tasks. Stations 1 through 4 of rotary table (2104) may comprise 1) preparing and loading non-repeating stack components such as bottom wrap and end unit (1803/1505/1807) and top wrap and end unit (1804/1506/1808) in assembly fixtures provided on table (2104); 2) cell placement and alignment as specified in stacking process (2001); 3) cell stack compression, leak check and locking as specified in process (1801/1901); and 4) stack finishing and unloading from table (2104). Stations may be conveniently positioned on a rotary table at the end of the cell manufacturing line. Stations may be at 90-degree angles to one another whereby the non-repeating station may be first, the cell placement station may be second, the cell stack compression and leak station may be third and the stack finishing and unloading station may be last. Each station may include specific tooling, fixtures, and equipment to facilitate the task. For example, the cell placement and alignment station may include one or more cell alignment rails against which the individual cells may be placed to ensure straight and accurate alignment along a z-axis as specified in process (1710). Functioning of said rails may be facilitated by features such as holes and/or slots in the stack compression wrap (1603). The table may be controlled to rotate 90-degrees every after the final cell in the stack is placed and aligned in the second station. Certain stations may require more labor time than others and a single worker may perform duties at more than one station or stations may be combined. For example, time required at stations 1 and 4 may allow these activities to be performed in series enabling rotary table (2104) to be reduced to three stations positioned at 120 degrees rather than four positioned at 90 degrees. The cell assembly line (2001) may convey cells (601) in a direction generally aligned with a y-axis (2103). Such a conveyer could flexibly handle cells of various areas as the varying cell dimension for larger or smaller cells is in the direction of conveyance (y-axis) and wider cell assembly belts, machines and handling equipment would not be required. At the end of the cell assembly line (2001) a rotary stack assembly station (2104) may be positioned to enable stack compression systems configured for different size cells to accept different quantities of cells such that the system may be capable of manufacturing electrolyzer stacks of variable active area and variable cell count on the same line. A scalable compression system (1801), also based on a fixed roll web width "w" (1303), may allow only the distance along a y-axis for the pick and place operation in step 2 on table (2104) to vary to handle assembly of stacks of different area cells. The system (2101) may also allow production rates greater than 1,000 stacks per year. For example, operators at the rotary table (2104) may only require 30 minutes to complete their tasks at stations 1 through 4. This may enable the cell production rate to increase by a factor of four, resulting in a tack time of approximately 5 seconds per cell and a corresponding increase of speed along a y-axis for belt (2005). A high-speed curing technique, such as ultraviolet light curing, may be conducive to such cycle times in manufacturing the bipolar plate assemblies (1206) and membrane gasket assemblies (1309), thereby enabling a single stack manufacturing line to produce up to 4,000, megawatt-class stacks per year on a single shift. The integrated design and flexible nature of a scalable cell, stack and manufacturing process may enable the investment in such a line to be protected from early obsolescence as technologies improve and stacks of different sizes may be required by the market. The described manufacturing system may also be flexible in terms of electrolysis technology and may be configured to manufacture cells and stack of a PEM or AEM type. A method of manufacturing a scalable electrolyzer stack may comprise placing a lower wrap element and end unit assembly into a stacking fixture; placing an upper wrap element and end unit assembly into a stacking fixture; aligning a freely accessible face of the lower wrap normal to the direction of piece-part flow in a manufacturing line producing scalable electrolysis cells; placing individual cells into the lower wrap through the freely accessible face; lowering an upper wrap and end unit assembly along a z-axis to pre-compress the cell stack; engaging the joint element of the wrap-style compression system to join the lower and upper wraps into an integral structure; further compressing the cell stack according to a desired compression profile and locking the stack under compressive load using an adjustable element of the compression system. The stack assembly may be accomplished using a rotational table at the end of a cell manufacturing line. The rotational table may comprise stations for loading non-repeating components, placing, and aligning cells, compressing and quality checking the assembly and unloading the final stack. Cell alignment fixtures may be provided on at least two adjacent edges of the cell stack. The cells may be automatically moved from the end of the cell manufacturing line to the inside of the lower wrap using one of a robotic placement, linear-motion actuator, or gravity. The cells may be moved through the freely accessible face of the lower wrap directly by the conveyer system of the cell manufacturing line. The lower wrap and end unit assembly may be moved downward along a z-axis after each cell is moved into position. The z-axis of the stack assembly may be angled relative to the gravity vector such that cells placed into the lower wrap are directed by gravity toward cell alignment fixtures on one or more edges of the cell stack. Movable cell alignment actuators may be engaged on one or more edges of the cell stack such that cells placed into the lower wrap are directed toward cell alignment fixtures on one or more opposite edges of the cell stack.

Figure 22:
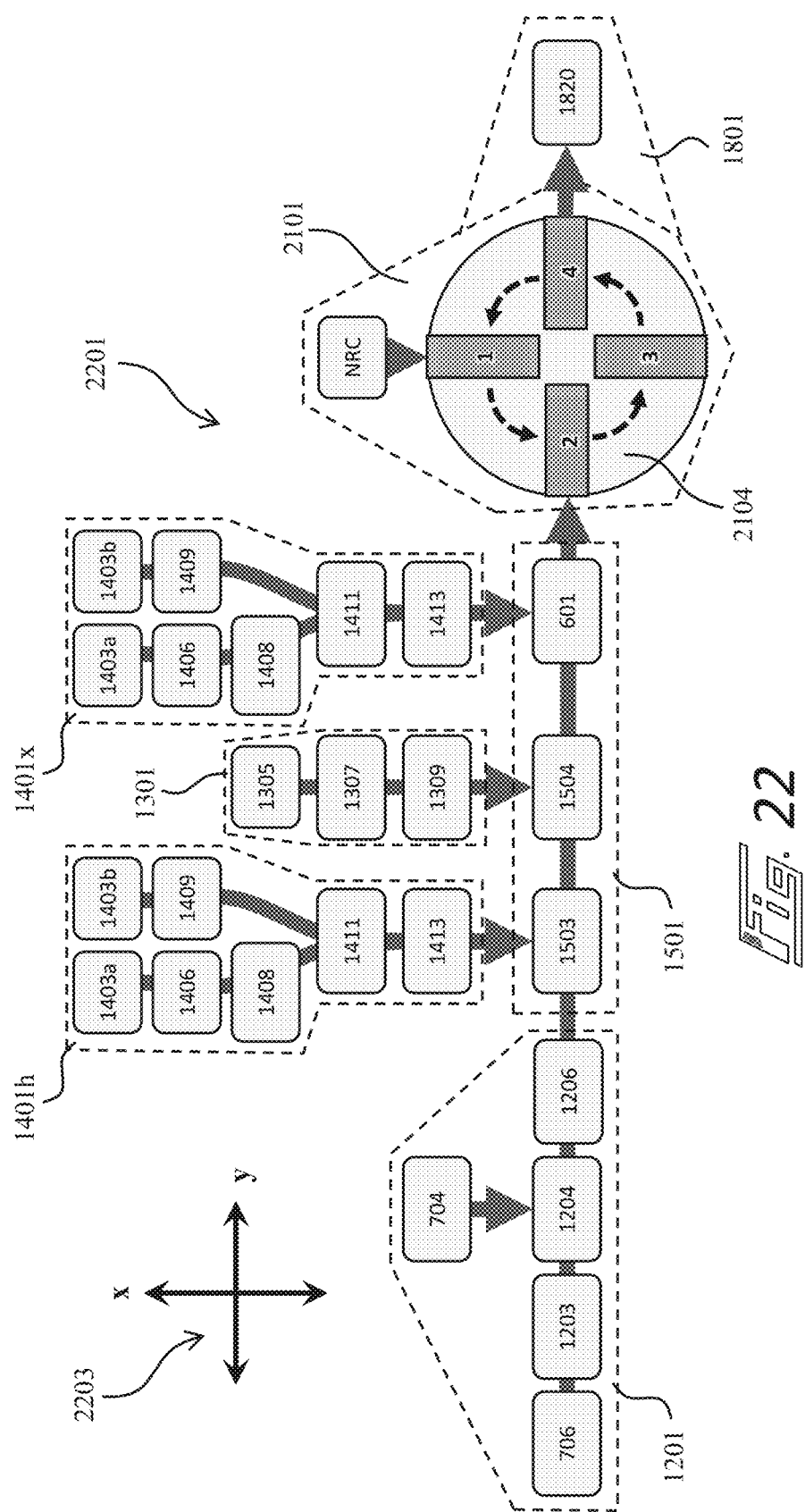
FIG. 22 shows an integrated view of an exemplary high-speed manufacturing process combining the aforementioned processes for a bipolar plate assembly, a membrane gasket assembly, a cathode electrode flow field assembly, an anode electrode flow field assembly, a scalable electrolysis cell assembly and a scalable electrolyzer stack assembly.

FIG. 22 shows an embodiment of an integrated view of a high-speed manufacturing system combining aforementioned processes for a bipolar plate assembly (1201), a membrane gasket assembly (1301), a cathode electrode flow field assembly (1401h), an anode electrode flow field assembly (1401x), a scalable electrolysis cell assembly (1501) and a scalable electrolyzer stack assembly (1801). The system may be configured to synchronize speeds for each process to achieve a continuous flow of cells (601) into process (2104). A rate-limiting step anywhere in the system may define the maximum speed with which cells (601) and stacks (1801) may be produced. For example, curing hydrogen seal (705) and water seal (703) in process (1201) may be the longest cycle time in system (2201) and may take 30 seconds. With this cycle time, one production shift operating 1750 work hours per year may only produce 210,000 cells per year. If, instead, methods of curing cut the cycle time to 5 seconds, more than 1.2 million cells may be produced on the same single shift assuming seal curing remains the rate limiting process in system (2201). For example, a simultaneous ultraviolet light curing of both the hydrogen (705) and water (703) seals as shown in step (1206) of process (1201) may be configured for a cycle time of 30 seconds, 20 seconds, 10 seconds, 5 seconds or less. If process (1201) is configured for a 30-second cycle time rather than a 5-second cycle time, 6 parallel lines of process (1201) may be required to achieve the same single-shift capacity, which may require 6 times the cost for equipment and production space and significantly impact the cost of electrolyzer stack (101). The system (2201) may produce PEM electrolyzers so long as PEM components and materials are put into processes (1201), (1301) and (1401). The system may produce AEM electrolyzer so long as AEM components and materials are put into processes (1201), (1301) and (1401).

Figure 23A:
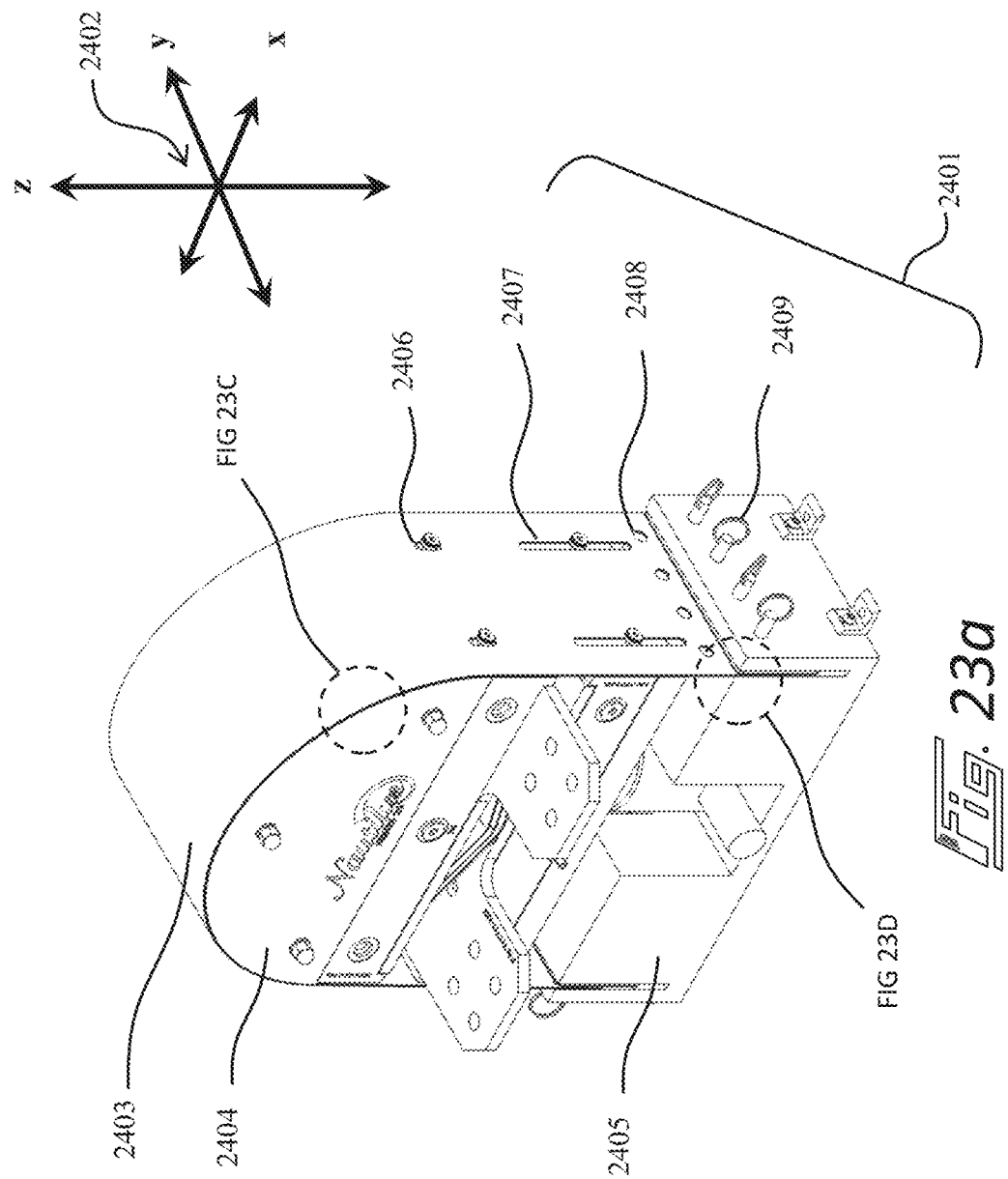
Figure 23B:
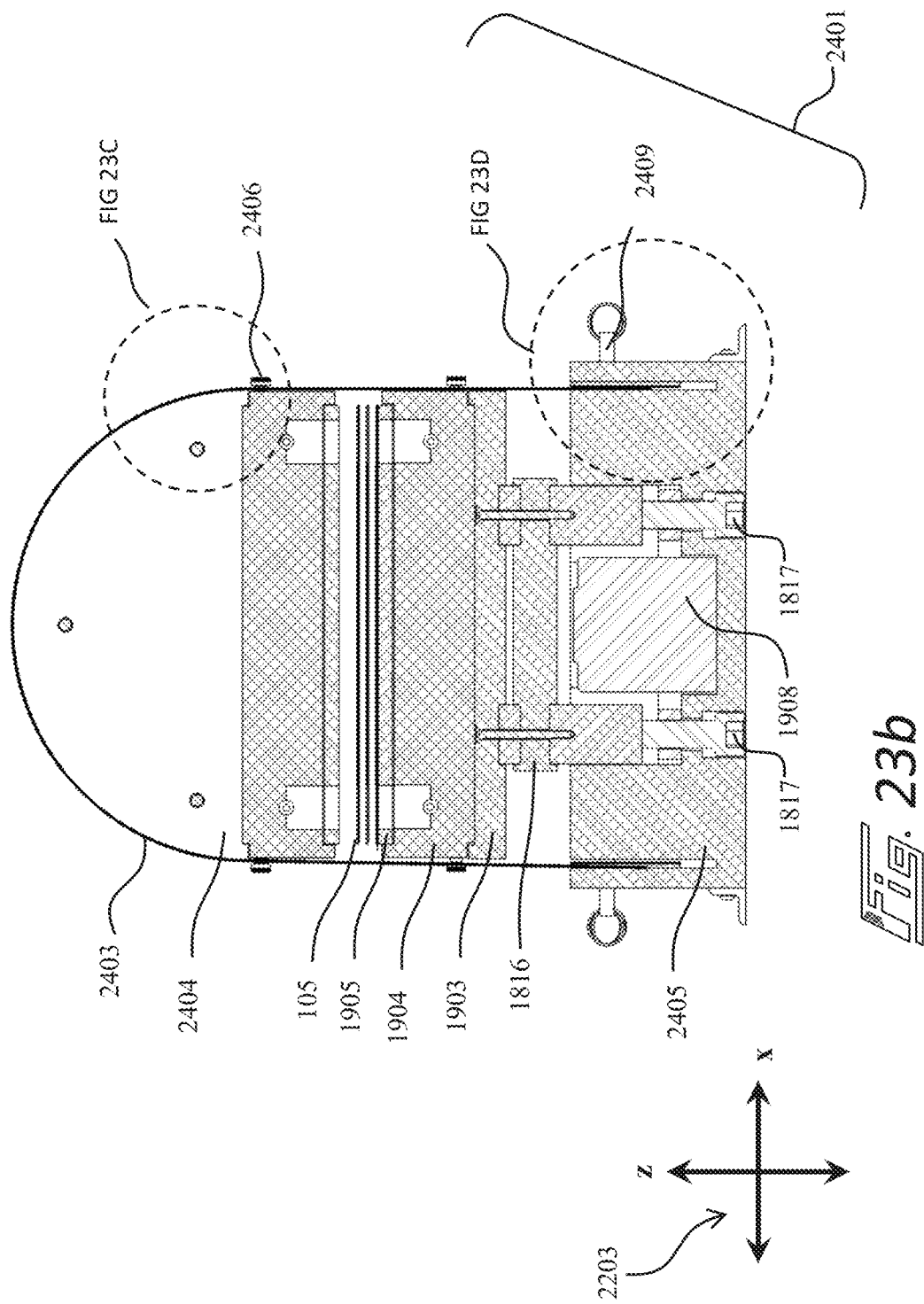

FIGS. 23a, 23b, 23c and 23d depict an alternate embodiment of compression system 1901. Compression system (2401) comprises one semi-cylindrical end unit (2404) and one end block (2405) into which wrap element (2403) may be joined using cross-pins (2409) through holes (2408) as shown in detailed view 23d. Multiple sets of holes (2408) may be provided in wrap (2403) in order to facilitate compression of stacks of varying heights or varying numbers of cells using the same compression hardware. Slots (2406) and (2407) may be provided in wrap (2403) to facilitate alignment of internal stack components during assembly and compression using shoulder bolts (2406) or similar means, either temporary or permanent. Analogous internal components to those shown in FIG. 19 are labelled with the same identifying numbers on FIG. 23b for clarity. As shown in FIG. 23c, the wrap (2403) may comprise one or more independent layers of material wrapped around semi-cylindrical end unit (2404). These layers may be formed by plastically bending the layers before assembly or by elastically bending the layers during assembly. Elastic bending of the layers during assembly may have the manufacturing advantage of being able to fabricate each layer of wrap (2403) from a single 2-dimensional cut pattern without concern for bending tolerances, thereby simplifying construction and reducing cost. Furthermore, plastically deformed materials may exhibit different stress/strain relationships as compared to elastically deformed materials, which can impact the forces applied to a cell stack. For cell stacks (105) of larger active area, wrap (2403) may be scaled along a y-axis without needing to change thickness or number of layers. Similarly, end unit (2404) may be scaled along a y-axis to accommodate large area cells in accordance with the scalable cells described herein. End unit (2405) may be scaled along a y-axis or may be made from modular units whose quantity varies along a y-axis in order to accommodate larger area cells. Other design and fabrication features of wrap (2403), end unit (2404), and end unit (2405) may remain unchanged for such larger area cells, thereby simplifying design and manufacturing and reducing cost by reusing parts for multiple stack products.

Figure 24:
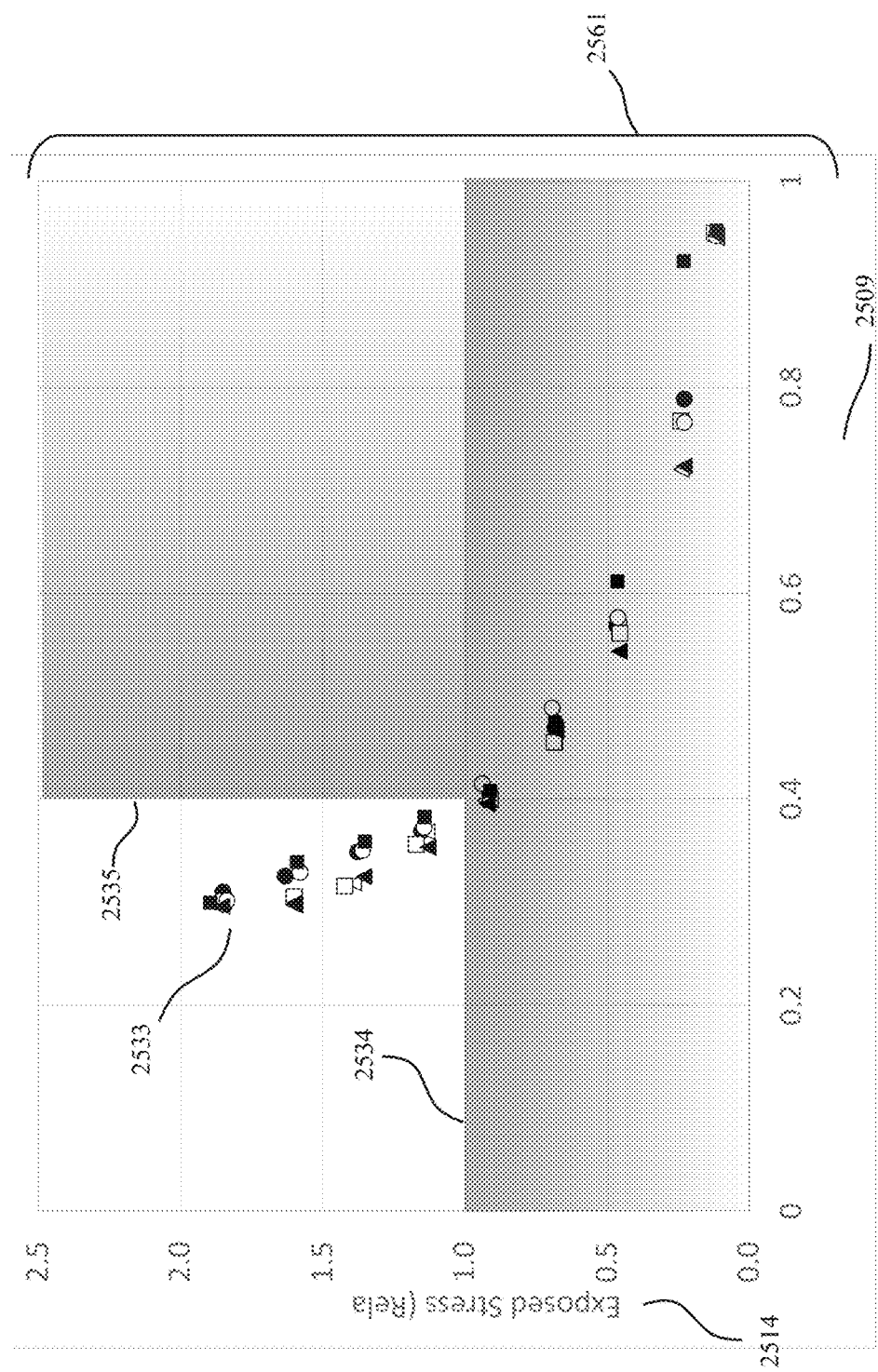
FIG. 24 shows measured strength data for samples of candidate flow field materials illustrating the permanent change in thickness as a function of the mechanical exposure stress.

FIG. 24 shows measured strength data (2561) for a number of samples of candidate flow field materials illustrating the permanent change in thickness (2509) as a function of the mechanical exposure stress (2514). Representative samples were exposed to varying levels of mechanical stress and the unloaded thickness measured after each level, resulting in the curves shown in FIG. 24. This curve then represents the material yield strength as a function of calendered thickness. During assembly of the electrolysis stack compressive load will be applied to the active area in order to maintain adequate contact and low contact resistance between the layers in a cell and between individual cells in the stack. The applied compressive load at assembly may be greater than the expected internal fluid pressure of the stack to ensure that cells or cell components do not separate during operation. It is desirable to maintain elastic behavior of the cells and cell components during assembly and operation to ensure this contact is maintained. As illustrated by limits (2534) and (2535), it may then be advantageous to calender the flow field materials during manufacturing of the flow fields (e.g., during calendaring and/or lamination) to a value less than X % of their initial thickness in order to ensure the materials remain elastic during stack assembly and operation. For the candidate materials tested X=40%, but the specific value for any candidate flow field material may be greater or less than 40% based on the particular characteristics and material properties of the candidate including porosity, basis weight—defined as the mass per unit area in an x-y plane—material of construction, and porous geometry (e.g. foam, mesh, expanded metal, felt or other).

FIG. 25 shows a preferred embodiment of a complete, megawatt-class electrolysis stack (2601) comprising the inventive elements disclosed in this specification. A stack of scalable cells (105), containing scalable membranes, electrodes, flow fields, seals, frames and bipolar plates, designed and fabricated as previously disclosed, is contained within and compressed by wrap (2403) and end blocks (2605a & 2605b) using cross pins (2409) to hold the wrap and end blocks together. For the megawatt-class stack illustrated, up to four hundred (400) such cells containing eight (8) water flow windows may be preferred to achieve a cell pitch, as shown, of 1.6 mm with a water flow velocity less than 20 cm/s and a pressure drop less than 2 bard and a temperature rise less than 20° C. It may be preferred to construct the cathode flow field from stainless steel wire mesh and the anode flow field from multiple (2 or 3) layers of nickel foam laminated and calendered to thickness. It may be preferred to reinforce the electrodes with calendered nickel foam. The stack may contain one or more end blocks (2605b) depending on the selected cell length along a y-axis. For the megawatt-class stack illustrated, two (2) end blocks (2605a) and four (4) end blocks (2605b) may be preferred. Each end block (2605b) may contain adjustable elements as described in FIGS. 19 and 23 to apply final compression to the stack unit after assembly as described in process (1801) from FIG. 18a. The wrap (2403) may be constructed of one or more layers, with more layers being preferred as the width of the selected cell along an x-axis is increased, as described for FIGS. 17a (variable "h") and 23. For the megawatt-class stack illustrated, the total number of layers may be three or four depending on the strength of the material used for each layer, an x-axis dimension of the cell stack and the maximum allowable working pressure of the electrolyzer stack. For the megawatt-class stack shown, operating at up to 30 barg hydrogen MAWP, three layers of full-hard, 304 stainless steel, with a yield strength of 140 ksi and a thickness of 0.5 mm for each layer, may be preferred to satisfy the requirement that total thickness "h" is greater than or equal to the x-axis dimension of the cell's cathode flow field multiplied by the ratio of the MAWP to the yield strength of the wrap material. The total quantity of cross pins (2409) may be proportional to the total number of end blocks (2605a & 2605b). Slots (2406 & 2407) are shown to facilitate alignment, guiding and mounting of the manifolds (1904 & 2604) during assembly. Slots (2407) may also facilitate exact constraint assembly and serve the function of the "gaps (108)" described in FIG. 17b. Also shown is an exemplary lifting system (2603) integrated into the wrap (2403) and crown (2404) to facilitate lifting and moving of the stack after final assembly. This system may consist of a cross bar placed at the peak of the crown (2404), within the wrap (2403) with threaded holes to accept standard lifting eyes or swivels (2603) as shown. Two such swivels may be preferred for the megawatt-class stack illustrated in FIG. 25.

Further Embodiments

A-1. An electrolysis cell comprising:
a membrane,
an anode electrode,
a cathode electrode,
an anode flow field,
a cathode flow field; and
a bipolar plate assembly,
wherein the bipolar plate assembly comprises a plurality of repeating water delivery windows positioned adjacent to a leading edge of the anode flow field aligned with a y-axis, wherein each water delivery window is associated with a window length along a y-axis of an anode flow field, and
wherein the electrolysis cell is configured such that a number, an effective diameter, or the window length of the water delivery windows is selected to maintain a water flow resistance, a water temperature rise, or a cell outlet oxygen volume fraction below a target threshold for the electrolyzer cell.

A-2. The electrolysis cell of A-1,
wherein the bipolar plate assembly comprises one or more oxygen collection windows and hydrogen collection windows, wherein the combined number of water delivery and oxygen collection windows is equal to or greater than the number of hydrogen collection windows.

A-3. The electrolysis cell of A-1,
wherein the effective diameter of each water delivery window is between 5% and 110% of its associated window length.

A-4. The electrolysis cell of A-1,
wherein a dimension of the anode flow field along an x-axis perpendicular to the leading edge of the anode flow field is the same for each water delivery window.

A-5. The electrolysis cell of A-1,
wherein the window length associated with each water delivery window is selected based on a thickness of the anode flow field to (a) keep the average velocity of water at the leading edge of the anode flow field below 100 cm/s at rated hydrogen production output, or (b) keep the water pressure drop below 5 bar differential at rated hydrogen production output.

A-6. The electrolysis cell of A-1,
wherein the electrolysis cell is configured to use a water stoich selected to maintain a cell temperature-rise at end of life below 50° C. or an oxygen volume fraction at the trailing edge of the anode flow field below 95%.

A-7 The electrolysis cell of A-1,
wherein the cathode flow field is arranged such that hydrogen flow velocity vectors in the cathode flow field are generally parallel to the leading edge of the anode flow field.

A-8. The electrolysis cell of A-1,
wherein the bipolar plate assembly comprises a bipolar plate and a fluid distribution frame, wherein a central region of the bipolar plate assembly is bounded at least partially by the fluid distribution frame and two bipolar plates and contains at least one of the cathode flow field, the cathode electrode, the membrane, the anode electrode, or the anode flow field.

A-9. The electrolysis cell of A-8,
further comprising a water seal located between the frame and a bipolar plate adjacent to the anode flow field.

A-10. The electrolysis cell of A-9,
wherein at least one of the fluid distribution frame or water seal is configured to permit spreading of water flow in an x-y plane from one or more water delivery windows to a leading-edge of the anode flow field, thereby providing a leading-edge water velocity distribution within plus or minus 50% of the average velocity for the anode flow field.

A-11. The electrolysis cell of A-9,
wherein at least one of the fluid distribution frame or water seal is configured to collect water and oxygen flow from a trailing-edge of the anode flow field and impose no greater than plus or minus 50% variation in trailing-edge velocity distribution for the anode flow field.

A-12. The electrolysis cell of A-8, further comprising a hydrogen seal located between the fluid distribution frame and a bipolar plate adjacent to the cathode flow field.

A-13. The electrolysis cell of A-8, wherein the fluid distribution frame comprises a visible or ultraviolet light transparent material.

A-14. The electrolysis cell of A-8, wherein the bipolar plate assembly is configured to collect a hydrogen flow from one or more trailing edges of the cathode flow field and deliver said flow to one or more hydrogen collection windows.

A-15. The electrolysis cell of A-8, wherein the fluid distribution frame is configured to engage an internal seal between the anode flow field and the cathode flow field, wherein the internal seal is applied to at least one of a membrane, a catalyst coated membrane, an electrode, a sub-gasket border of a membrane-electrode assembly, or the fluid distribution frame itself.

A-16. The electrolysis cell of A-8, further comprising a water seal located between the frame and a bipolar plate adjacent to the anode flow field and a hydrogen seal located between the fluid distribution frame and a bipolar plate adjacent to the cathode flow field, wherein the fluid distribution frame, water seal, and hydrogen seal, are arranged in a projected view along a z-axis so that there is less than 50% unsupported seal area.

A-17. The electrolysis cell of A-1, wherein the anode flow field is larger than the cathode flow field and the anode flow field facilitates application of compressive load to the internal seal.

A-18. The electrolysis cell of A-1, wherein the bipolar plate assembly comprises a bipolar plate, wherein the bipolar plate comprises a material selected from the group consisting of stainless steel, titanium, nickel, carbon, chromium, iron, and alloys thereof.

A-19. The electrolysis cell of A-5, having a compressed cell pitch of less than or equal to 5.0 mm, less than or equal to 3.0 mm, or less than or equal to 2.0 mm.

A-20. The electrolysis cell of A-1, wherein at least one of the anode flow field or the cathode flow field comprise one or more of a foam, a felt, a woven screen, an expanded metal, or a sintered metal frit.

A-21. The electrolysis cell of A-1, wherein the cathode flow field comprises geometric features in the bipolar plate protruding along a z-axis perpendicular to the y-axis and x-axis.

B-1. A method of manufacturing a bipolar plate assembly for an electrolysis cell comprising:

selecting a material for a bipolar plate, a hydrogen seal, a water seal, and a fluid distribution frame;

applying a hydrogen seal to the bipolar plate or fluid distribution frame;

aligning the fluid distribution frame relative to the bipolar plate and pressing the fluid distribution frame to engage the hydrogen seal therebetween;

applying a water seal to the fluid distribution frame; and curing at least one of the hydrogen seal or the water seal using an ultraviolet light curing method, a microwave curing method, a thermal curing method, a solvent curing method, a two-part epoxy curing method, or a humidity curing method, wherein the bipolar plate, hydrogen seal, water seal, and fluid distribution frame comprise two-dimensional patterns suitable for production using die cutting, laser cutting, waterjet cutting, robotic dispensing and/or screen-printing methods.

B-2. The method of B-1, wherein both the hydrogen and water seals are cured simultaneously.

B-3. The method of B-1, wherein the water seal is formed during production of the fluid distribution frame, before engagement with the hydrogen seal.

B-4 The method of B-1, wherein the fluid distribution frame is pressed together with the bipolar plate with a force adequate to ensure a continuous, unbroken seal is formed between the bipolar plate and the fluid distribution frame.

B-5. The method of B-1, wherein the fluid distribution frame is pressed together with the bipolar plate to achieve a target thickness for the bipolar plate assembly with variation less than or equal to plus or minus 25%.

B-6. The method of B-5, wherein the hydrogen seal is reinforced with one of a wire mesh, open cell foam, expanded metal sheet, or sintered metal frit.

B-7. The method of B-1, wherein the hydrogen or water seal is applied using a screen or stencil printing process, wherein at least one of the hydrogen or water seal is applied in an uncured state with a thickness between 10 and 1000 micrometers and a width between 0.5 and 15 millimeters.

C-1. A compression system for an electrolyzer cell stack comprising:

a structural wrap comprising one or more wrap layers circumferentially surrounding at least a portion of an electrolyzer cell stack containing a plurality of cells;

end units at opposite ends of the electrolyzer cell stack; and one or more adjustable elements proximate to one or more of the end units, wherein the structural wrap permits free access to opposing sides of the cell stack, wherein the structural wrap serves as a tensile element of the compression system, wherein the one or more wrap layers are essentially flat sheets of material having an essentially uniform thickness, wherein a total thickness of the one or more wrap layers is determined by an x-axis dimension of the cell stack and the maximum allowable working pressure of the electrolyzer cell stack.

C-2. The compression system of C-1, wherein a total wrap thickness is greater than or equal to a dimension of a cathode flow field of a cell in the cell stack along an x-axis multiplied by the ratio of the maximum allowable working pressure of the electrolyzer to the tensile strength of the wrap material.

C-3. The compression system of C-1, wherein the wrap has a generally oval racetrack profile when viewed along a y-axis and is configured to interface with the end units, wherein one or more of the end units has a semi-cylindrical profile when viewed along the y-axis.

C-4. The compression system of C-3, wherein the wrap is configured to slip relative to one or more semi-cylindrical end units as the compression system is loaded.

C-5. The compression system of C-3,
wherein the diameter of the one or more semi-cylindrical end units is between 100% and 150% of the dimension of the electrolysis cell dimension along an x-axis.

C-6. The compression system of C-3,
wherein an adjustable element of the compression system is at least partially contained within one or both of the end units.

C-7. The compression system of C-6,
wherein the adjustable element is configured to achieve a final dimension of a cell stack along a z-axis within plus or minus 25%.

C-8. The compression system of C-6,
wherein at least one of the wrap or end units are configured to allow direct compression of the cell stack by a temporary stack assembly system mechanically in parallel to the adjustable element.

C-9. The compression system of C-6,
wherein at least one of the wrap or end units are configured to allow access to and manipulation of the adjustable element.

C-10. The compression system of C-6,
wherein the adjustable element comprises one or more of a screw, a nut, a spring, a hydraulic cylinder, a pneumatic cylinder, a pressure pad, or a pressure shoe.

C-11. The compression system of C-3,
wherein the total quantity of adjustable elements in the stack is proportional to the number of water delivery windows provided in the cells comprising the cell stack.

C-12. The compression system of C-1,
wherein the wrap comprises one or more pieces joined to contiguously surround the cell stack with one or more of a cross pin joint, hinge-pin joint, a hem-hook joint, or a braced hem-hook joint on each of the two flat sides of the wrap, or
wherein the wrap is constructed of one or more layers of flexible sheet material configured to encompass one semi-cylindrical end unit and engage and join a second end unit with one or more cross pins, or
wherein the one or more layers of the wrap are constructed of material of sufficient yield strength and thickness to remain elastic when encompassing the one or more end units.

C-13. The compression system of C-12,
wherein the joint is configured to allow the wrap to be engaged along a z-axis while pre-compressing the cell stack and to complete the assembly of the wrap joint with the stack in a pre-compressed state.

C-14a. The compression system of C-1,
wherein the cell stack comprises cells having a hexagonal shape to enable fully-constrained alignment fixturing from an open end of the wrap.

C-14b. The compression system of C-1,
wherein the wrap is configured to allow one or more cell stack alignment fixtures to penetrate the wrap boundary and touch one or more edges of the cell stack during assembly.

C-15. The compression system of C-1,
wherein the wrap is configured to stretch along a z-axis by less than or equal to 2% of a final length of a cell stack at a final cell stack compressive load.

C-16. The compression system of C-1,
wherein the wrap is configured to provide a spring rate along a z-axis of between 0.1% and 25% of the spring rate of a cell stack at a target cell stack compressive load.

D-1. An electrolyzer stack comprising:
a plurality of electrolysis cells aligned along a z-axis in a stacked configuration,
wherein each cell comprises a membrane, an anode electrode, a cathode electrode, an anode flow field, a cathode flow field and a bipolar plate assembly,
wherein adjacent bipolar plate assemblies at least partially bound one or more water delivery plenums positioned along an edge of the anode flow fields,
wherein each water delivery plenum is sized to maintain a water velocity through the plenum along a z-axis below a target threshold,
wherein each water delivery plenum is associated with a length along a y-axis of the anode flow fields,
wherein the number or sizes of the water delivery plenums are configured to maintain one of a water flow resistance or a water temperature rise or a cell outlet oxygen volume fraction below a target threshold for the electrolyzer stack.

D-2. The stack of D-1,
further comprising oxygen delivery plenums and hydrogen collection plenums,
wherein the combined number of water delivery and oxygen collection plenums is equal to or greater than the number of hydrogen collection plenums.

D-3. The stack of D-2,
further comprising end units at opposite ends of stacked configuration of electrolysis cells,
a scalable, structural wrap compression system, and
at least one fluid manifold included in one end unit,
wherein the fluid manifold facilitates water delivery to the stack along a y-axis and through a freely accessible face of the compression system.

D-4. The stack of D-3,
wherein the fluid manifold is arranged at the top of the stacked configuration of electrolysis cells relative to the gravity vector along a z-axis.

D-5. The stack of D-3,
further comprising a drain or purge manifold arranged at the bottom of the stacked configuration of electrolysis cells relative to the gravity vector along a z-axis.

D-6. The stack of D-3,
wherein the size of a water flow port and manifold connecting the individual cell stack plenums is selected to provide flow distribution to individual plenums with a variation of less than plus or minus 25%.

E-1. A method of manufacturing an electrolyzer stack comprising:
placing a lower wrap element and end unit assembly into a stacking fixture;
placing an upper wrap element and end unit assembly into a stacking fixture;
aligning a freely accessible face of the lower wrap normal to the direction of piece-part flow in a manufacturing line producing scalable electrolysis cells;
placing individual cells into the lower wrap through the freely accessible face;
lowering an upper wrap and end unit assembly along a z-axis to pre-compress the cell stack;
engaging the joint element of the wrap-style compression system to join the lower and upper wraps into an integral structure;
further compressing the cell stack according to a desired compression profile; and
locking the stack under compressive load using an adjustable element of the compression system.

E-2. The method of E-1,
wherein the stack assembly is accomplished using a rotational table at the end of a cell manufacturing line.

E-3. The method of E-2,
wherein the rotational table comprises stations for loading non-repeating components, placing and aligning cells, compressing and quality checking the assembly, and unloading the final stack.

E-4. The method of E-1,
wherein cell alignment fixtures are provided on at least two adjacent edges of the cell stack.

E-5. The method of E-1,
wherein the cells are automatically moved from the end of the cell manufacturing line to the inside of the lower wrap using one of a robotic placement, linear-motion actuator, or gravity.

E-6. The method of E-1,
wherein the cells are moved through a freely accessible face of the lower wrap directly by the conveyer system of the cell manufacturing line.

E-7. The method of E-1,
wherein the lower wrap and end unit assembly is moved downward along a z-axis after each cell is moved into position.

E-8. The method of E-1,
wherein the z-axis of the stack assembly is angled relative to the gravity vector such that cells placed into the lower wrap are directed by gravity toward cell alignment fixtures on one or more edges of the cell stack.

E-9. The method of E-1,
wherein movable cell alignment actuators are engaged on one or more edges of the cell stack such that cells placed into the lower wrap are directed toward cell alignment fixtures on one or more opposite edges of the cell stack.

F-1. A method of manufacturing an internal seal for an electrolysis cell comprising:
selecting a roll of material of a desired roll web width along an x-axis for use as a membrane or a catalyst coated membrane;
directing the web of the roll through a seal application machine along a y-axis;
applying an uncured internal seal to one side of the web using one of a screen printing, stencil printing, or robotic dispensing method;
curing the applied internal seal using one of an ultraviolet light curing, microwave curing, thermal curing, solvent curing, a two-part epoxy curing method or humidity curing method;
cutting the membrane-gasket assembly or catalyst coated membrane-gasket assembly roll into discrete piece parts; and
delivering the resulting individual piece parts to a cell assembly machine.

F-2. The method of F-1,
wherein the web material is a membrane of an acidic, proton-conducting type.

F-3. The method of F-1,
wherein the web material is a membrane of an alkaline, hydroxide-conducting type.

F-4. The method of F-1,
wherein the web material is selected from one of a 1-side continuously coated CCM or a 1-side patch-coated CCM.

F-5. The method of F-4,
wherein the internal seal is applied onto the cathode side of the web.

G-1. A method of manufacturing an integrated electrode flow field for an electrolysis cell comprising:
selecting an electrode substrate of a desired roll web width along and x-axis from one of a foam, a felt, a woven screen, an expanded metal, or a sintered metal frit;
selecting one or more flow field substrates of a desired roll web width along and x-axis from one of a foam, a felt, a woven screen, an expanded metal, or a sintered metal frit;
directing the electrode substrate web along a y-axis through calendering rollers configured to achieve the desired thickness and surface properties of each side of the electrode substrate;
converting the electrode substrate to an active electrode;
directing the one or more flow field substrate webs along a y-axis, adjacent to the electrode substrate web and through a laminating process to adhere the electrode and the flow fields together;
cutting the laminated electrode flow field roll into discrete piece parts; delivering the resulting individual piece parts to a cell assembly machine.

G-2. The method of G-1,
wherein electrode substrate and flow field substrate each independently comprise at least one of carbon, nickel, titanium, iron, chromium, stainless steel, or Inconel, or mixtures or alloys thereof.

G-3. The method of G-1,
wherein one or more of the electrode web and flow field web comprises a rough, patterned, or embossed surface to promote lamination.

G-4. The method of G-1,
wherein the laminating step includes a bonding promoter selected from one of an adhesive, a polymer dispersion, a liquid ionomer solution, or an ionomer dispersion.

G-5. The method of G-1,
wherein the electrode flow field web comprises a foam electrode and a woven screen flow field after lamination.

G-6. The method of G-1,
wherein the electrode conversion occurs before lamination.

G-7. The method of G-1,
wherein the electrode conversion occurs after lamination.

G-8. The method of G-1,
wherein the porosity, basis weight, number of layers and final laminated thickness of the flow field are selected to prevent yielding during assembly, compression and operation of the cell.

G-9. The method of G-1,
wherein the active electrode comprises one or more binders selected from a liquid ionomer solution, an ionomer dispersion, and an inert polymer.

What is claimed is:
1. An electrolysis cell comprising:
a membrane,
an anode electrode,
a cathode electrode,
an anode flow field,
a cathode flow field; and
a bipolar plate assembly comprising a bipolar plate, the cathode flow field, and a fluid distribution frame,
wherein the cathode flow field comprises a porous sheet containing an embedded hydrogen seal such that the porous sheet provides both mechanical reinforcement for the embedded hydrogen seal and an open space for hydrogen gas flow from an active area of the electrolysis cell to one or more hydrogen collection windows,
wherein the embedded hydrogen seal bonds to the cathode flow field, the bipolar plate, and the fluid distribution frame such that these components are bonded together as a physical unit and the cathode flow field is sealed against the environment,
wherein the embedded hydrogen seal and the cathode flow field have the same thickness.

2. The electrolysis cell of claim 1,
wherein the cathode flow field is arranged such that hydrogen flow velocity vectors in the cathode flow field are generally parallel to the leading edge of the anode flow field.

3. The electrolysis cell of claim 1,
further comprising a water seal located between the fluid distribution frame and a bipolar plate adjacent to the anode flow field.

4. The electrolysis cell of claim 3,
wherein at least one of the fluid distribution frame or water seal is configured to permit spreading of water flow in an x-y plane from one or more water delivery windows to a leading-edge of the anode flow field, thereby providing a leading-edge water velocity distribution within plus or minus 50% of the average velocity for the anode flow field.

5. The electrolysis cell of claim 3,
wherein at least one of the fluid distribution frame or water seal is configured to collect water and oxygen flow from a trailing-edge of the anode flow field and impose no greater than plus or minus 50% variation in trailing-edge velocity distribution for the anode flow field.

6. The electrolysis cell of claim 1,
wherein the fluid distribution frame comprises a visible or ultraviolet light transparent material.

7. The electrolysis cell of claim 1,
wherein the bipolar plate assembly is configured to collect a hydrogen flow from one or more trailing edges of the cathode flow field and deliver said flow to one or more hydrogen collection windows.

8. The electrolysis cell of claim 1,
wherein the fluid distribution frame is configured to engage an internal seal between the anode flow field and the cathode flow field, wherein the internal seal is applied to at least one of a membrane, a catalyst coated membrane, an electrode, a sub-gasket border of a membrane-electrode assembly, or the fluid distribution frame itself.

9. The electrolysis cell of claim 1,
further comprising a water seal located between the fluid distribution frame and a bipolar plate adjacent to the anode flow field and wherein the embedded hydrogen seal is positioned between the fluid distribution frame and a bipolar plate adjacent to the cathode flow field,
wherein the fluid distribution frame, water seal, and hydrogen seal, are arranged in a projected view along a z-axis so that there is less than 50% unsupported seal area.

10. The electrolysis cell of claim 1,
wherein the anode flow field is larger than the cathode flow field and the anode flow field facilitates application of compressive load to an internal seal.

11. The electrolysis cell of claim 1,
wherein the bipolar plate assembly comprises a bipolar plate, wherein the bipolar plate comprises a material selected from the group consisting of stainless steel, titanium, nickel, carbon, chromium, iron, and alloys thereof.

12. The electrolysis cell of claim 1, having a cell pitch of less than or equal to 2.0 mm.

13. The electrolysis cell of claim 1,
wherein at least one of the anode flow field or the cathode flow field comprise one or more of a foam, a felt, a woven screen, an expanded metal, or a sintered metal frit.

14. The electrolysis cell of claim 1,
wherein the cathode flow field comprises geometric features in the bipolar plate assembly protruding along a z-axis perpendicular to the y-axis and x-axis.

15. The electrolysis cell of claim 1,
wherein the porous sheet of the cathode flow field is selected from the group consisting of a foam, a felt, a woven screen, an expanded metal, and a sintered metal frit.

16. The electrolysis cell of claim 15,
wherein the porous sheet comprises an alloy of iron, steel, stainless steel, nickel, nickel-chromium, Inconel, Fecralloy, or a combination thereof.

17. The electrolysis cell of claim 1,
wherein the hydrogen seal comprises a cured polymer compound.

18. The electrolysis cell of claim 1,
wherein the cell does not have an approximately circular active area.

19. The electrolysis cell of claim 1,
wherein the anode flow field and the cathode flow field each have a thickness between 0.1 mm to 5.0 mm, wherein the anode flow field has a flow field length between 2 cm and 25 cm.

20. The electrolysis cell of claim 1,
wherein the embedded hydrogen seal is fully embedded in the cathode flow field.

21. The electrolysis cell of claim 1,
wherein the electrolysis cell has a compressed cell height of less than or equal to 5.0 mm.

22. The electrolysis cell of claim 1,
wherein the bipolar plate assembly comprises a plurality of repeating water delivery windows positioned adjacent to a leading edge of the anode flow field aligned with a y-axis, wherein each water delivery window is associated with a window length along a y-axis of the anode flow field.

23. The electrolysis cell of claim 22,
wherein the bipolar plate assembly comprises one or more oxygen collection windows, wherein the combined number of water delivery and oxygen collection windows is equal to or greater than the number of hydrogen collection windows.

24. The electrolysis cell of claim 22,
wherein the effective diameter of each water delivery window (a diameter of a circle whose area is equal to the area of the window) is between 5% and 110% of its associated window length.

25. The electrolysis cell of claim 22,
wherein each water delivery window has a uniform side along an x-axis perpendicular to the leading edge of the anode flow field.

26. An electrolyzer stack comprising:
a plurality of electrolysis cells aligned along a z-axis in a stacked configuration,
wherein each cell comprises a stack compression system having a tensile wrap, a membrane, an anode electrode, a cathode electrode, an anode flow field, a cathode flow field, and a bipolar plate assembly comprising a bipolar plate, the cathode flow field, and a fluid distribution frame,
wherein adjacent bipolar plate assemblies at least partially bound one or more water delivery plenums positioned along an edge of the anode flow fields, wherein the bipolar plate assembly comprises a plurality of repeating water delivery windows positioned adjacent to a leading edge of the anode flow field aligned with a y-axis, wherein each water delivery window is associated with a window length along a y-axis of the anode flow field, wherein each water deliver plenum is sized to maintain a water velocity through the plenum along a z-axis below a target threshold, wherein the electrolyzer stack has a cell pitch (a center-to-center distance between two adjacent electrolysis cells) of less than or equal to 5.0 mm, wherein the cathode flow field comprises a porous sheet containing an embedded hydrogen seal such that the porous sheet provides both mechanical reinforcement for the embedded hydrogen seal and an open space for hydrogen gas flow from an active area of the electrolysis cell to one or more hydrogen collection windows, wherein the embedded hydrogen seal bonds to the cathode flow field, the bipolar plate, and the fluid distribution frame such that these components are bonded together as a physical unit and the cathode flow field is sealed against the environment, wherein the embedded hydrogen seal and the cathode flow field have the same thickness.

27. The electrolyzer stack of claim 26,
wherein the porous sheet of the cathode flow field is selected from the group consisting of a foam, a felt, a woven screen, an expanded metal, and a sintered metal frit.

28. The electrolyzer stack of claim 27,
wherein the porous sheet comprises an alloy of iron, steel, stainless steel, nickel, nickel-chromium, Inconel, Fecralloy, or a combination thereof.

29. The electrolyzer stack of claim 26,
wherein the hydrogen seal comprises a cured polymer compound.

30. The electrolyzer stack of claim 26,
wherein the plurality of cells do not have an approximately circular active area.

31. The electrolyzer stack of claim 26,
wherein the anode flow field and the cathode flow field each have a thickness between 0.1 mm to 5.0 mm, wherein the anode flow field has a flow field length between 2 cm and 25 cm.

32. The electrolyzer stack of claim 26,
wherein the embedded hydrogen seal is fully embedded in the cathode flow field.

* * * * *